United States Patent [15] 3,659,488
Deutsch [45] May 2, 1972

[54] CAPTURE COMBINATION SYSTEM

[72] Inventor: Ralph Deutsch, Sherman Oaks, Calif.
[73] Assignee: North American Rockwell Corporation, Anaheim, Calif.
[22] Filed: Oct. 9, 1970
[21] Appl. No.: 79,614

[52] U.S. Cl. ....84/345, 84/370
[51] Int. Cl. ....G10b 3/10
[58] Field of Search ....84/345, 370

[56] References Cited

UNITED STATES PATENTS

| | | | |
|---|---|---|---|
| 3,213,179 | 10/1965 | Clauson | 84/345 X |
| 3,449,995 | 6/1969 | Sepp | 84/345 |
| 3,498,168 | 3/1970 | Cunningham | 84/345 |
| 3,548,064 | 12/1970 | Oncley | 84/345 UX |

*Primary Examiner*—Richard B. Wilkinson
*Assistant Examiner*—John F. Gonzales
*Attorney*—L. Lee Humphries, H. Fredrick Hamann and Edward Dugas

[57] ABSTRACT

A capture combination system for use in an electronic organ provides rapid reprogramming of the entire combination memory while permitting manual selection of desired stop combinations at any time. Desired stop combinations are selected for each piston and set into the working memory of the system. These combinations, upon command, are transferred from the working memory to a storage or external memory. A full combination of stop settings may be stored on the external memory by transfer from the internal memory, and a number of such external memories corresponding to a number of different full combinations of stop settings thus may be prepared and, subsequently, selectively presented to the system as desired. The combination settings from the external memory are transferred upon command into the internal working memory for establishing the desired combination of stop settings therein. Transfer into or out of the external memory requires but a few seconds. Whenever desired, the working memory may be altered to modify one or more stop combinations, whether set manually, or entered therein from the external memory and, in the latter case, while retaining the combinations recorded in the external memory.

16 Claims, 64 Drawing Figures

INVENTOR
RALPH DEUTSCH

BY Brufsky, Staas, Breiner & Halsey
ATTORNEYS

PATENTED MAY 2 1972 3,659,488

SHEET 02 OF 23

FIG. 3A

| DIV. 1 | | DIV. 2 | | DIV. 3 | | DIV. 4 | |
|---|---|---|---|---|---|---|---|
| 1-10 | 11-20 | 21-30 | 31-40 | 41-50 | 51-60 | 61-70 | 71-80 |
| GENERAL # 1 | | | | | | | |
| GENERAL # 2 | | | | | | | |

FIG. 3B

| DIVISIONAL PISTONS | | | | DIVISIONAL S.R. CHIP (120) |
|---|---|---|---|---|
| D1/P1 | D2/P1 | D3/P1 | D4/P1 | S.R. 1 |
| D1/P2 | D2/P2 | D3/P2 | D4/P2 | S.R. 2 |
| D1/P3 | D2/P3 | D3/P3 | D4/P3 | S.R. 3 |
| D1/P4 | D2/P4 | D3/P4 | D4/P4 | S.R. 4 |
| D1/P5 | D2/P5 | D3/P5 | D4/P5 | S.R. 5 |
| D1/P6 | D2/P6 | D3/P6 | D4/P6 | S.R. 6 |

FIG. 3C

| GENERAL # 1 PISTONS | GENERAL # 1 S.R. CHIP (122) |
|---|---|
| G1/P1 | S.R. 1 |
| G1/P2 | S.R. 2 |
| G1/P3 | S.R. 3 |
| G1/P4 | S.R. 4 |
| G1/P5 | S.R. 5 |
| G1/P6 | S.R. 6 |

FIG. 3D

| GENERAL # 2 PISTON | GENERAL # 2 S.R. CHIP (124) |
|---|---|
| G2/P1 | S.R. 1 |
| G2/P2 | S.R. 2 |
| G2/P3 | S.R. 3 |
| G2/P4 | S.R. 4 |
| G2/P5 | S.R. 5 |
| G2/P6 | S.R. 6 |

| | | | | | | |
|---|---|---|---|---|---|---|
| DIVISIONAL TRACK BITS | S.R. 1 | S.R. 2 | S.R. 3 | S.R. 4 | S.R. 5 | S.R. 6 |
| | 1,2 — 80 | 81,82 — 160 | 161,162 — 240 | 241 — 320 | 321 — 400 | 401 — 480 |
| GENERAL # 1 TRACK BITS | S.R. 1 | S.R. 2 | S.R. 3 | S.R. 4 | S.R. 5 | S.R. 6 |
| | 1,2 — 80 | 81 — 160 | 161 — 240 | 241 — 320 | 321 — 400 | 401 — 480 |
| GENERAL # 2 TRACK BITS | S.R. 1 | S.R. 2 | S.R. 3 | S.R. 4 | S.R. 5 | S.R. 6 |
| | 1,2 — 80 | 81 — 160 | 161 — 240 | 241 — 320 | 321 — 400 | 401 — 480 |
| STROBE TRACK | STROBE | | | | | |
| STROBE PULSES | 1,2 — 80 | 81 — 160 | 161 — 240 | 241 — 320 | 321 — 400 | 401 — 480 |

FIG. 3E

FIG. 7 CARD MODE

PATENTED MAY 2 1972 3,659,488

SHEET 06 OF 23

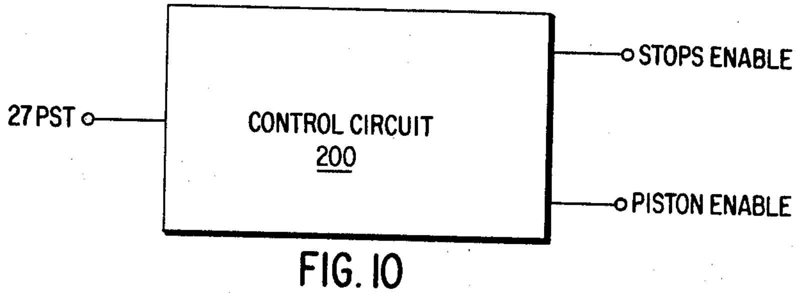
FIG. 10
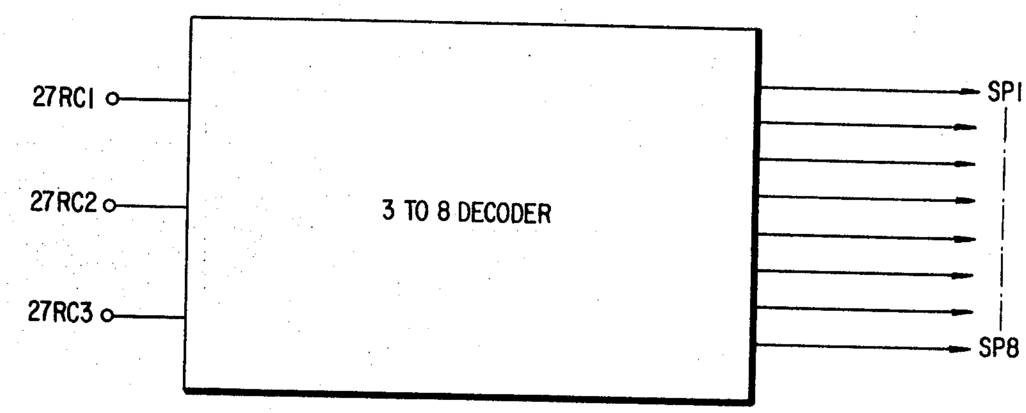
FIG. 11A
| | 27RC3 | 27RC2 | 27RC1 |
|---|---|---|---|
| SP1 | 0 | 0 | 0 |
| SP2 | 0 | 0 | 1 |
| SP3 | 0 | 1 | 0 |
| SP4 | 0 | 1 | 1 |
| SP5 | 1 | 0 | 0 |
| SP6 | 1 | 0 | 1 |
| SP7 | 1 | 1 | 0 |
| SP8 | 1 | 1 | 1 |
FIG. 11B

STOPS ENCODING

| | SP1 | SP2 | SP3 | SP4 | SP5 | SP6 | SP7 | SP8 |
|---|---|---|---|---|---|---|---|---|
| P1 | 1 | 11 | 21 | 31 | 41 | 51 | 61 | 71 |
| P2 | 2 | 12 | 22 | 32 | 42 | 52 | 62 | 72 |
| P3 | 3 | 13 | 23 | 33 | 43 | 53 | 63 | 73 |
| P4 | 4 | 14 | 24 | 34 | 44 | 54 | 64 | 74 |
| P5 | 5 | 15 | 25 | 35 | 45 | 55 | 65 | 75 |
| P6 | 6 | 16 | 26 | 36 | 46 | 56 | 66 | 76 |
| P7 | 7 | 17 | 27 | 37 | 47 | 57 | 67 | 77 |
| P8 | 8 | 18 | 28 | 38 | 48 | 58 | 68 | 78 |
| P9 | 9 | 19 | 29 | 39 | 49 | 59 | 69 | 79 |
| P10 | 10 | 20 | 30 | 40 | 50 | 60 | 70 | 80 |
| | DIV. 1 | | DIV. 2 | | DIV. 3 | | DIV. 4 | |
| | GENERAL # 1 | | | | | | | |
| | GENERAL # 2 | | | | | | | |

PISTON ENCODING

| PISTON | SP 1 | SP 2 | SP 3 | SP 4 | SP 5 | SP 6 |
|---|---|---|---|---|---|---|
| P1 | 1 | 7 | 13 | 19 | 25 | 31 |
| P2 | 2 | 8 | 14 | 20 | 26 | 32 |
| P3 | 3 | 9 | 15 | 21 | 27 | 33 |
| P4 | 4 | 10 | 16 | 22 | 28 | 34 |
| P5 | 5 | 11 | 17 | 23 | 29 | 35 |
| P6 | 6 | 12 | 18 | 24 | 30 | 36 |

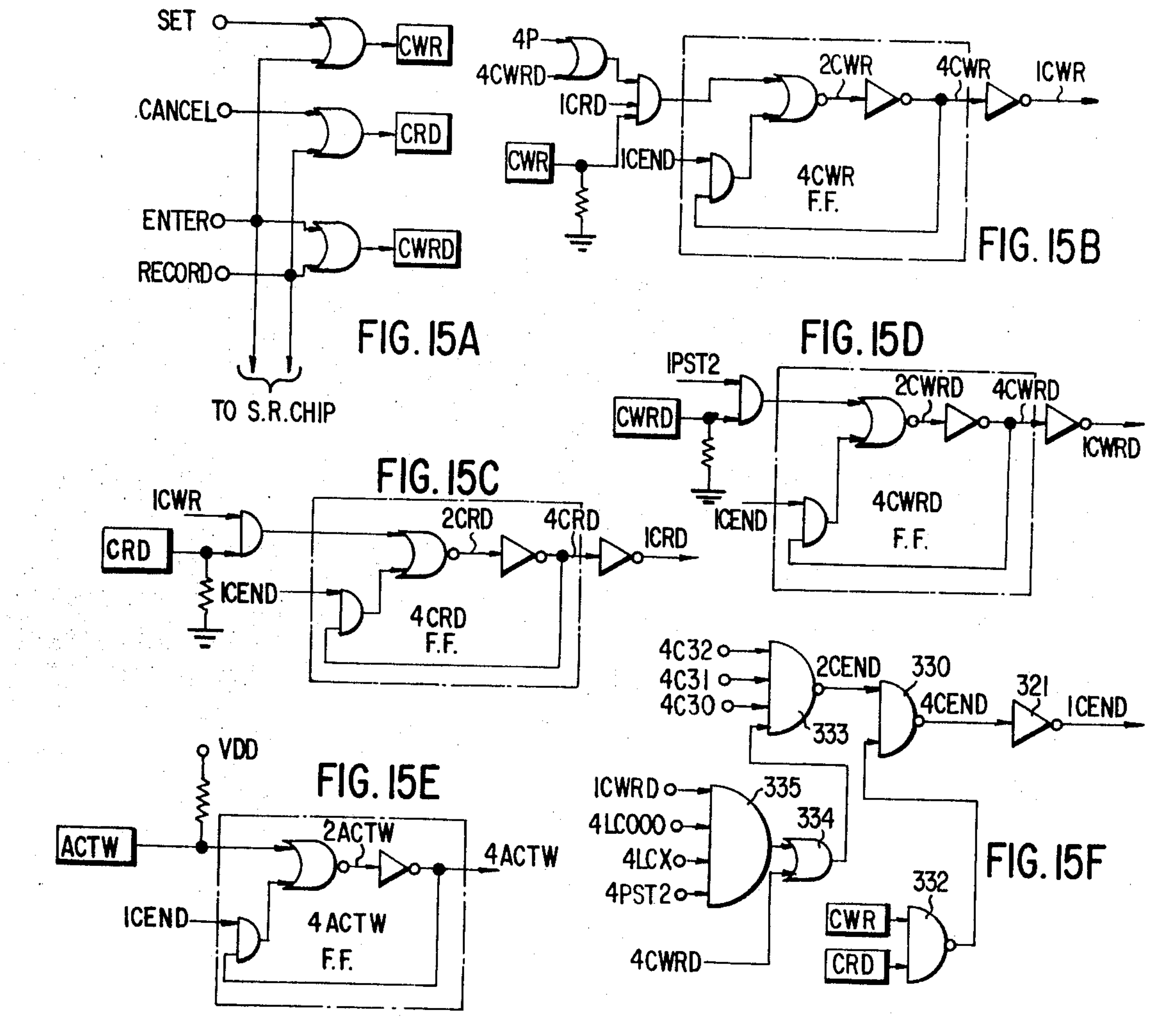
FIG. 15A, FIG. 15B, FIG. 15C, FIG. 15D, FIG. 15E, FIG. 15F
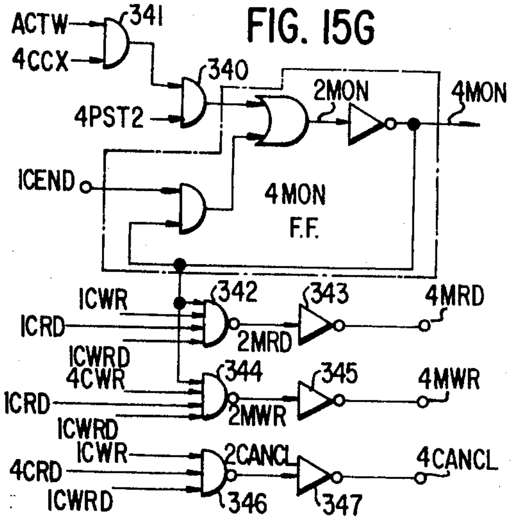
FIG. 15G
FIG. 15H
| CWR (CWR+SET) | CRD (CRD+SET) | CWRD (CRD+CWR) | MANUAL MODE | CARD MODE |
|---|---|---|---|---|
| 0 | 0 | 0 | READ | |
| 1 | 0 | 0 | SET | |
| 0 | 1 | 0 | CANCEL | |
| 1 | 0 | 1 | | ENTER |
| 0 | 1 | 1 | | RECORD |

COUNTER 352

| 4CX13 | 4CX12 | 4CX11 | 4CX10 | STOPS |
|---|---|---|---|---|
| 0 | 0 | 0 | 0 | 1-10 |
| 0 | 0 | 0 | 1 | 11-20 |
| 0 | 0 | 1 | 0 | 21-30 |
| 0 | 0 | 1 | 1 | 31-40 |
| 0 | 1 | 0 | 0 | 41-50 |
| 0 | 1 | 0 | 1 | 51-60 |
| 0 | 1 | 1 | 0 | 61-70 |
| 0 | 1 | 1 | 1 | 71-80 |
| 1 | 0 | 0 | 0 | |
| 1 | 0 | 0 | 1 | |
| 1 | 0 | 1 | 0 | |
| 1 | 0 | 1 | 1 | |
| 1 | 1 | 0 | 0 | |
| 1 | 1 | 0 | 1 | |
| 1 | 1 | 1 | 0 | |
| 1 | 1 | 1 | 1 | (4LCX) |

FIG. 16A

| 27RC3 | 27RC2 | 27RC1 | STOPS | PISTONS | SHIFT REGISTERS |
|---|---|---|---|---|---|
| 0 | 0 | 0 | 1-10 | 1 | 1 |
| 0 | 0 | 1 | 11-20 | 2 | 2 |
| 0 | 1 | 0 | 21-30 | 3 | 3 |
| 0 | 1 | 1 | 31-40 | 4 | 4 |
| 1 | 0 | 0 | 41-50 | 5 | 5 |
| 1 | 0 | 1 | 51-60 | 6 | 6 |
| 1 | 1 | 0 | 61-70 | – | – |
| 1 | 1 | 1 | 71-80 | – | – |
| 4C32 | 4C31 | 4C30 | | | |

FIG. 16B

| PISTON MATRIX LINE | 4SRB3 | 4SRB2 | 4SRB1 |
|---|---|---|---|
| P1 | 0 | 0 | 0 |
| P2 | 0 | 0 | 1 |
| P3 | 0 | 1 | 0 |
| P4 | 0 | 1 | 1 |
| P5 | 1 | 0 | 0 |
| P6 | 1 | 0 | 1 |

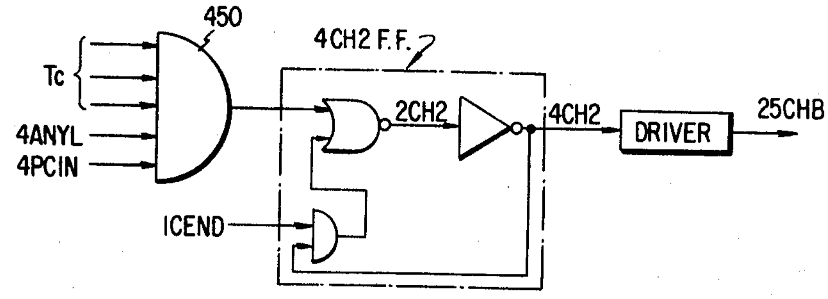
FIG. 18A
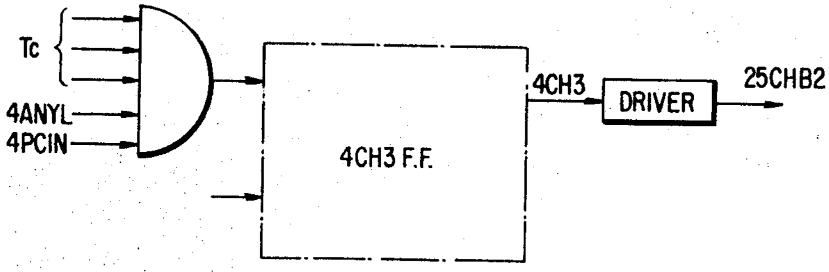
FIG. 18B
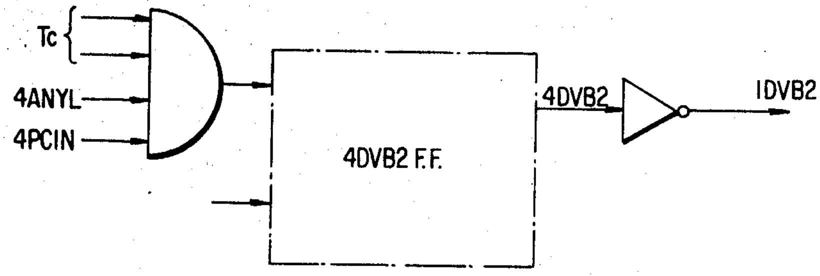
FIG. 18C
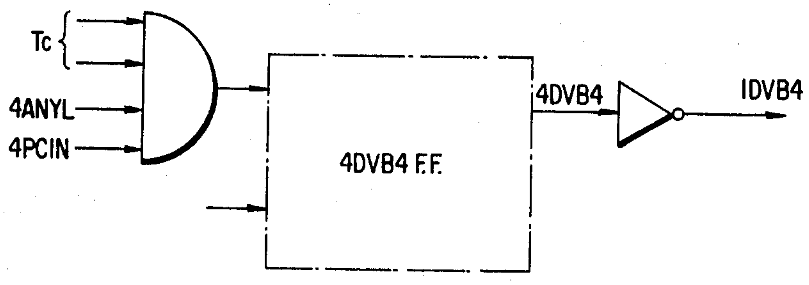
FIG. 18D
| 27RC3 | 27RC2 | 27RC1 | PISTONS |
|---|---|---|---|
| 0 | 0 | 0 | DIVISION 1 |
| 0 | 0 | 1 | DIVISION 2 |
| 0 | 1 | 0 | DIVISION 3 |
| 0 | 1 | 1 | DIVISION 4 |
| 1 | 0 | 0 | GENERAL 2 (25CHB2) |
| 1 | 0 | 1 | GENERAL 1 (25CHB1) |
| | DVB4 | DVB2 | |
FIG. 18E

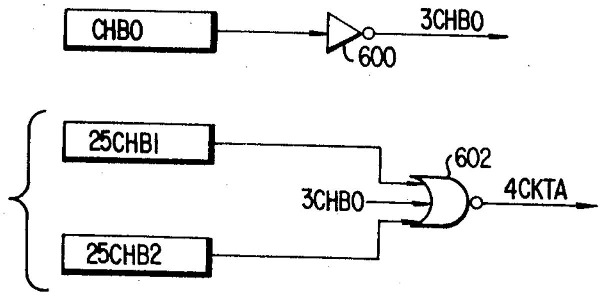
FIG. 21A
| S.R. CHIP | 25CHB1 | 25CHB2 | CHBO |
|---|---|---|---|
| DIVISION | 0 | 0 | VDD |
| GENERAL#1 | 1 GND | 0 → | → |
| GENERAL#2 | 0 | 1 GND | → |
FIG. 21B
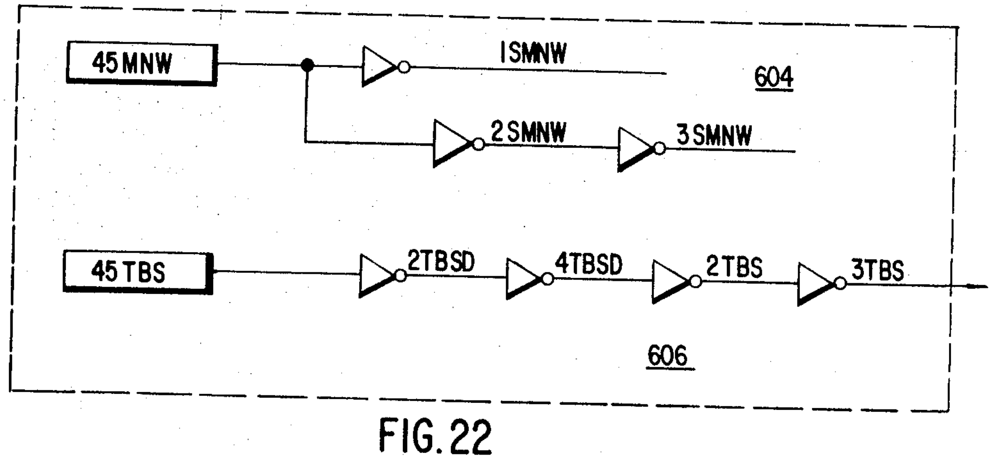
FIG. 22
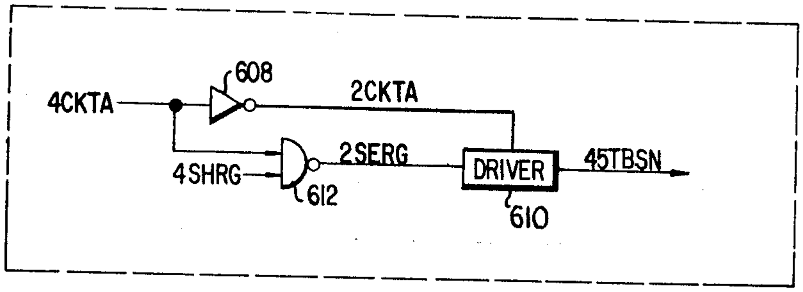
FIG. 23

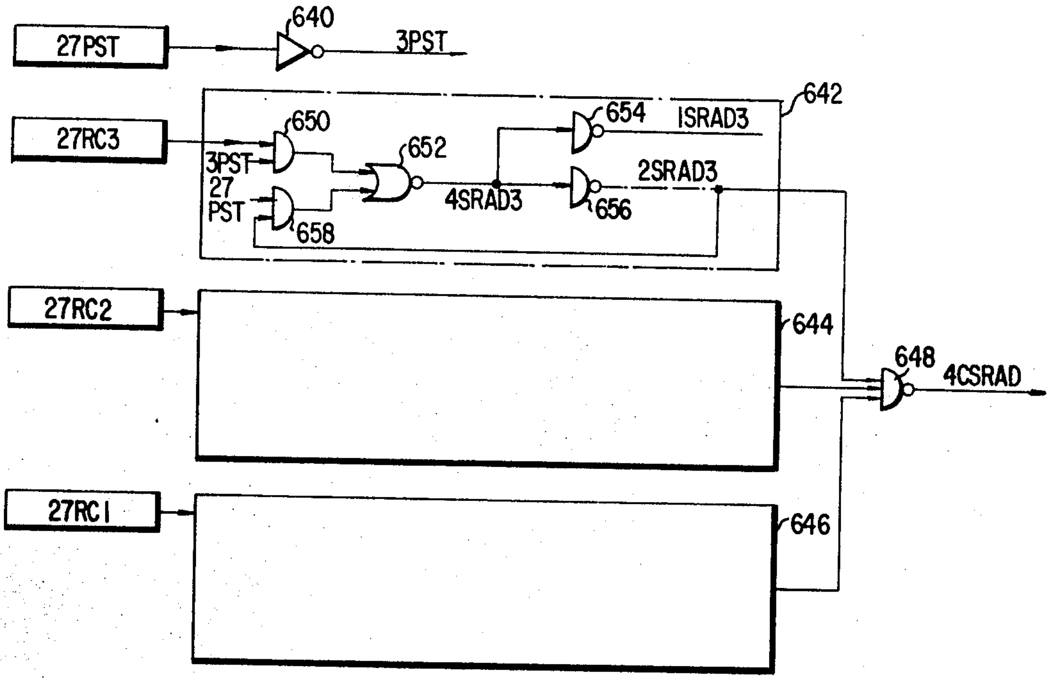
FIG. 25A
| S.R. | 27RC3 | 27RC2 | 27RC1 | 4SRAD3 | 4SRAD2 | 4SRAD1 |
|---|---|---|---|---|---|---|
| 1 | 0 | 0 | 0 | 1 | 1 | 1 |
| 2 | 0 | 0 | 1 | 1 | 1 | 0 |
| 3 | 0 | 1 | 0 | 1 | 0 | 1 |
| 4 | 0 | 1 | 1 | 1 | 0 | 0 |
| 5 | 1 | 0 | 0 | 0 | 1 | 1 |
| 6 | 1 | 0 | 1 | 0 | 1 | 0 |
FIG. 25B
FIG. 27
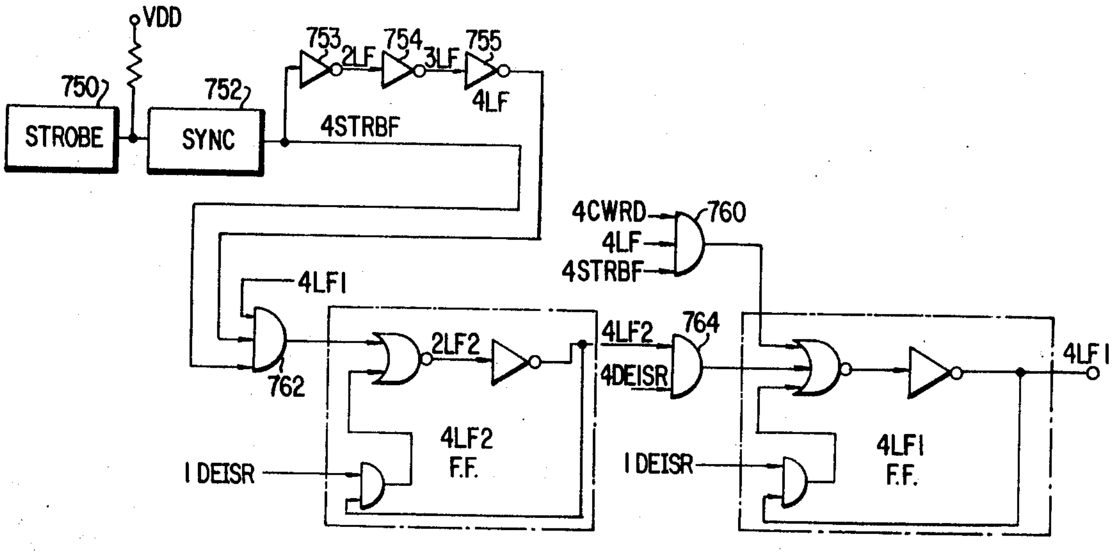

CAPTURE COMBINATION SYSTEM

BACKGROUND OF THE INVENTION

1. Field of the Invention

This invention relates to a capture combination system, such as for an organ, and particularly to such a system affording manual control of an internal working memory for establishing desired stop combinations while having an external memory capable of storing a plurality of pre-established full stop combinations which may be selectively read and entered into the internal memory for permitting rapid setting of any desired full stop combination into the system.

2. State of the Prior Art

Combination systems have been well known heretofore in the prior art for use with organs, whereby the organist may quickly change the combination of desired stops or stop controls, thereby to alter the tonal colors obtained in playing the organ. Typically, a number of pistons or key switches are associated with each division or keyboard of the organ and, in a conventional arrangement, are located directly under a beneath each keyboard. In some instances, certain of these pistons are duplicated by toe studs or key switches permitting operation by the feet of the organist.

Generally, each piston permits actuation of a selected group of the stops when that piston is actuated, thereby permitting selection of any of a number of combinations of stops in accordance with actuation of the corresponding ones of the pistons. The pistons generally are grouped in various categories identified by their control capabilities. Divisional pistons, for example, are associated with, or assigned to, a corresponding division and provide for control of only those voice stops and couplers associated with that same division. Independent general pistons, on the other hand, provide for control of a combination of all of the stops provided in the organ simultaneously regardless of the relationship of groups of those stops to specific divisions. The setting of the independent general pistons is in no way restricted by the selection of stops as established by any of the divisional pistons. Closely related to the independent general pistons are collective general pistons; each of the latter, when actuated, operates a corresponding piston in each group of division pistons.

In general, combination systems include a memory of some type for recording the combination of stops associated with each piston. Upon actuation of a piston, the combination system sets the corresponding stops as indicated by the stored information in memory. Numerous techniques have been employed in the past to afford such combination system memories, including mechanical linkages, electrical bar-switches, and more recently, computer electrical memories. As a result, combination systems have been classified by the means used to code information into their memories.

Preset combination systems are those in which the memory is "hard wired" in the sense that changes can only be made by rewiring a terminal located inside the console. The stop combinations therefore cannot be changed by the organist from the front of the console. In fact, such changes are typically of such a complexity and difficulty that they are considered factory adjustments.

In a setter board system, a wire associated with each stop is connected to a switch which may be, for example, a jumper jack. A row of switches is provided for each divisional piston. The memory is set by moving the switches to the desired on or off positions. A large number of such switches are required in a setter board system and accordingly, independent general pistons are typically not provided with setter board systems, but rather only collective general pistons.

A capture combination system permits the organist to set information into a combination memory by means of the conventional organ controls. For example, with regard to each division, for example the swell division, a combination of stops is selected which produces a desired tonal effect for each of the pistons of that division. The stop combination information is then placed into memory by depressing a set piston, and simultaneously depressing an available piston of that division. Subsequently thereto, such as in playing the organ, whenever that piston is depressed, the stops of the preselected combination captured in the operation with the set piston are captured, or set. A similar sequence is employed to capture stop combinations for each divisional piston as well as the general pistons.

Whereas capture combination systems provide greater flexibility and ease of programming, and thus are the most desirable type of combination action, the prior art capture combination systems nevertheless present various undesirable defects. For example, where more than one organist is to use the same organ, it is reasonably to be expected that each organist will desire a different program of the stop combinations selected by the pistons. Typically, however, these systems are employed with organs having 25 or more pistons, each division furthermore having about 20 stops. Thus, while in theory the prior art capture combination systems provide greater flexibility and ease of programming than other prior art systems in actual use, a substantial delay or interruption is required for resetting the capture combinations. This delay can be particularly annoying since the setting of the stops can generate a succession of switching noises which are very annoying to the audience.

To avoid these delays and annoyances of prior art combination systems, the only solution has been to provide a sufficient number of combination pistons to carry the organist through all selections to be played. The resultant increase in number, however, quickly taxes the player's memory as to what tonal color is on each piston. Further, increasing the number of pistons greatly increases the system complexity and cost. Such an expedient is therefore clearly unsatisfactory. Thus, prior art systems have failed to provide a solution to the problem of affording a capture combination system which may be quickly reprogrammed, and which is not unduly complex and expensive, yet affords adequate memory capacity for storing any desired number of stop combinations.

SUMMARY OF THE INVENTION

The present invention overcomes the foregoing and other defects of prior art systems and affords rapid reprogramming of the entire capture combination system memory. Accordingly, a large number of pistons is not required yet any desired number of different stop combinations may be provided. In accordance with the invention, there is provided an internal, working memory having a capacity for storing the stop combinations of all of the pistons provided in the organ. The system furthermore includes an external memory, preferably a magnetic card, having the capacity to store a full stop combination for the organ. Associated read/write apparatus is provided into which the card is inserted. Any number of cards, and thus full stop combinations may be prepared in advance on corresponding cards.

In use, a desired combination of stops to be called forth by a given piston is initially established. The piston then is depressed in association with a setting piston to set that stop combination information into the internal memory. Preferably, a multiplexing scanning technique is employed for scanning the pistons and the stops in a cyclic, repetitive manner to detect actuation of a piston and the associated combination of selected stops, the detected information thereby being appropriately gated into the working memory which may comprise, for example, high speed recirculating shift registers. The desired stop combinations, up to the full number of combinations possible, are thus set into the internal operating memory. In playing the organ, the desired stop combinations are rapidly established upon actuation of the pistons.

Upon a subsequent command, when it is desired to retain the stop combinations thus set for subsequent use, information thus established in the internal memory is transferred in accordance with appropriate timing and gating functions, and recorded in an external memory. Preferably, the external memory is a magnetic card although any suitable recording medium such as punched paper tape, cassette recorder, or the like, may be employed. A timing or strobe channel is recorded on the card to permit subsequent identification and interpretation of the stored information. Preferably, a single card is employed to store a full stop combination setting although, by suitable coding schemes, any desired number of combination settings may be recorded in a suitable external memory and selectively read out.

After one or more full stop combinations is established on associated cards of an external memory, in subsequent playing of the organ, the card containing the desired stop combination is inserted into the read/write apparatus, the information is read therefrom and entered into the internal memory. This entry does not destroy the recording on the card, however. With the information thus transferred into the internal memory, subsequent actuation of the pistons then provides for deriving from the internal memory the necessary information for setting the stops in response to actuation of the pistons, thereby to establish the desired stop combinations.

The present invention thus affords a dual mode of operation in that, in a manual mode, the stop combinations may be established and recorded in the internal memory for immediate recall and setting up of desired stop combinations in subsequent playing of the organ. Alternatively, the stop combinations may be recorded from the internal memory into an external memory and subsequently entered back into the internal memory, without destroying the stored information of the external memory, for control of the organ. In this latter mode, the information transferred to the internal memory may still be altered at will by the organist without altering the stored combinations of the external memory.

In accordance with a preferred embodiment of the present invention, the combination system operates in a time multiplex manner controlled by a central or internal clock function. The stops as well as the pistons are connected in corresponding matrices such that each, when actuated, produces an output from the matrix when that matrix is scanned in a specific time interval related to the scan rate for the matrix. Conveniently, each row of the stop matrix corresponds to a division or a general, the vertical columns being equal in number to the number of stops in each thereof. In a similar manner, the rows of the stops matrix may correspond individually, or in two or more rows, to the number of stops of each division. The totality of stops of the matrix correspond, of course, to each of the pistons of each of the generals.

A decoding relay matrix is provided for selectively energizing the actuating devices for setting and resetting the stops. In a specific embodiment, each relay controls a number of contacts corresponding to the number of stops in each row of the stops matrix, the number of relays thus corresponding to the number of horizontal rows of the stops matrix. The stop combination from each row of the switching matrix is derived out of the operating memory in timed relationship to the energization of the associated relay; signals corresponding to the specific stops recorded in memory as having been set, provide a power driving signal through the corresponding, closed contacts of that associated relay to drive the actuating mechanisms for the stops.

A feature which affords substantial simplification of the circuit complexity and cost is the technique of generating a reset pulse simultaneously with the set pulses for setting the stops, but of only half the duration thereof, for each of the aforedescribed setting cycles. Thus, in the absence of a set pulse, each stop actuator is returned to a reset condition whereas, for the simultaneous presence of a set pulse, the stop actuator drives the corresponding stop to the set condition due to the longer duration thereof.

A further feature of the invention is the relating of the stop and piston matrices to afford common, shared input and output lines and the selective enabling of the matrices to provide outputs from each thereof independently of the other. In general, the piston matrix is scanned at a high speed until a piston is detected as having been actuated. The time position of detecting of that piston in the piston matrix scanning mode identifies it as associated with a given division or general, and the specific matrix output as a specific piston within that division or general. The system then switches to a low speed scan of the stop matrix and reads out the stop information from each line of the stop matrix in succession. The parallel stop information obtained from each line then is gated into a parallel to serial converter for subsequent insertion into a related one of the aforementioned recirculating shift registers.

In accordance with a specific embodiment of the invention, plural groups of shift registers are provided, one group for each of generals and one group for the combination of all of the divisions. The number of shift registers in each group corresponds to the number of pistons of each division or general, and the number of bits of each shift register corresponds to the number of stops provided in the organ.

In inserting the stop information read out in parallel from the stops matrix, therefore, the aforementioned parallel to serial converter converts that information to serial form. Decoding means identify the proper group of shift registers in relation to the generals or divisions and the specific shift register of that group, in accordance with the time-related identification of the actuated piston as aforedescribed. Gating means responsive to the internal clocking function define a precise window positioned in time in relation to the recirculating time of the shift registers, and specifically to the bit storage positions thereof, to insert in proper timed sequence into the thus selected shift register, the serial outputs of stop data from the parallel to serial converter, for storage. The parallel read out from each such stops matrix line, in accordance with the actuated piston, and the subsequent serial storage thereof in the appropriate shift register and particularly the appropriate bit storage positions thereof, proceeds sequentially through the scan of the stops matrix. By virtue of the timing function of the cyclic scanning operation of the matrices, therefore, each actuated piston is appropriately identified and only those related stops which have been actuated result in the storing of a bit in memory. Storing of the stop combinations in the internal memory for each piston proceeds in sequence until as many or all of the pistons, as desired, have been actuated and the associated stop combination is stored in memory.

Considering first the recording operation, conveniently, the stop combinations of each general occupy a corresponding recording track of the card and the stop combinations of the plurality of divisions are recorded on a common, single track of the card in sequence for the divisions. The data recording tracks thus correspond to the groups of shift registers previously described. Finally, a strobe track is provided for identifying and timing the stored information for subsequent read out.

In the record function, and based on the continuous, cyclical internal clocking function, the system selects, simultaneously and in succession, the corresponding shift registers of the plurality of groups. Time decoding circuits select a bit of information at a time, in a one bit window for each recirculation of the shift registers, for recording on the card. Thus, in a simultaneous manner for the groups of shift registers, the contents of each shift register of a group are read out in succession, and in sequence for the registers of each group, thereby to effect recording on the magnetic card, in parallel for the groups, of a serial track of bit information, and simultaneously, recording of a serial track of timing information in the strobe channel.

Similarly, in entering data from the external memory to the internal, the data tracks are read in serial from the card, and entered into the appropriate bit positions of the respectively corresponding shift registers, in succession for the shift registers of each group in a bit by bit sequence, and in parallel for the corresponding registers of each group. The external memory preferably affords a non-destructive read out and thus retains the stored information. Accordingly, when proceeding to play in a manual mode, the organist may alter the stop combinations of the internal memory without changing the combinations of the external memory.

Having set the desired stop combinations into the internal memory, the organist may proceed in manual operation with playing of the organ. At any time, he can change any stop combination by repeating the foregoing steps. Alternatively, he may elect to store the stop combinations thus established in the external memory in what is termed the record mode.

When proceeding in the manual mode, the scanning of the piston matrix continues at high speed as aforenoted and, as each actuated piston is detected, its position is noted and the appropriate stop combination is read out from the associated shift register and supplied in serial form to the serial to parallel converter. The latter is enabled in proper timed sequence to transmit the stop combination information to the stops decode relay matrix for energizing the stop actuators and thereby setting the thus identified stops. The scanning of the matrices continues in the associated, sequential fashion as above described to effect setting of all the stops thus identified in memory in association with the actuated pistons. Upon completion of each scan sequence, be it for insertion of information into memory or read out for setting of stops, and end of cycle signal is generated to terminate the transfer functions. Similarly, a cancel signal may be generated to reset the stops to a rest or reset position.

In the card mode (termed card mode in accordance with the proposed use of a magnetic card for external storage) the stop combination information established in the operating or internal memory is transferred to the external memory for permanent recording. Alternatively in this same mode, the information from the external memory is read from the card for entry into the internal memory to set up, in an extremely rapid manner, the desired, preselected stop combinations.

Considering first the recording operation, conveniently, the stop combinations of each general occupy a corresponding recording track of the card and the stop combinations of the plurality of divisions are recorded on a common, single track of the card in sequence for the divisions. The data recording tracks thus correspond to the groups of shift registers previously described. Finally, a strobe track is provided for identifying and timing the stored information for subsequent read out.

In the record function, and based on the continuous, cyclical internal clocking function, the system selects, simultaneously and in succession, the corresponding shift registers of the plurality of groups. Time decoding circuits select a bit of information at a time, in a one bit window for each recirculation of the shift registers, for recording on the card. Thus, in a simultaneous manner for the groups of shift registers, the contents of each shift register of a group are read out in succession, and in sequence for the registers of each group, thereby to effect recording on the magnetic card, in parallel for the groups, of a serial track of bit information, and simultaneously, recording of a serial track of timing information in the strobe channel.

Similarly, in entering data from the external memory to the internal the data tracks are read in serial from the card, and entered into the appropriate bit positions of the respectively corresponding shift registers, in succession for the shift registers of each group in a bit by bit sequence, and in parallel for the corresponding registers of each group. The external memory preferably affords a non-destructive read out and thus retains the stored information. Accordingly, when proceeding to play in a manual mode, the organist may alter the stop combinations of the internal memory without changing the combinations of the external memory.

BRIEF DESCRIPTION OF THE DRAWINGS

FIG. 3A through 3E comprise tables illustrating divisional and general pistons and their respectively associated stops in relation to the internal and external memories;

FIG. 10 is a block diagram of a stop and piston enable circuit utilized with the matrices of FIG. 9;

FIG. 11A is a block diagram of a 3 through 8 decoder comprising the addressing means for the matrices of FIG. 9, and FIG. 11B comprises a table illustrative of the addressing functions performed by the decoder of FIG. 11A;

FIGS. 15A through 15G comprise gating and storage circuits associated with the commands and internal control functions performed in the system, and FIG. 15H is a logic table relating these commands and functions;

FIGS. 16A and 16B comprise tables representing count encoding functions for certain of the counter outputs in FIG. 16 for identification of stops, pistons, and shift registers in relation to various control functions performed in the system;

FIGS. 18A through 18D comprise gating and storage circuits for effecting selection of divisional and generals chips in accordance with encoded count outputs as set forth in the table of 18E.

FIG. 21A is a logic block diagram of selection circuits of the shift register chips responsive to outputs of the chip selection identification circuits of FIGS. 18A through 18D, as related in the table of FIG. 21B;

FIG. 22 is a logic block diagram of the input gating and data input functions for inserting information into the shift registers of FIG. 19 in the manual mode;

FIG. 23 is a logic circuit of the gating function for deriving data from the shift registers of FIG. 19 in the manual mode;

FIG. 25A is a logic block diagram of shift register identification circuits provided in each shift register chip, and FIG. 25B is a table identifying the logic conditions for selection of shift registers in accordance with the piston identification;

FIG. 27 is a logic diagram of gating and synchronization control circuits provided in the control chip and responsive to strobe pulses read from a magnetic card of the external storage in the card mode;

DETAILED DESCRIPTION OF THE INVENTION

Figure 1:
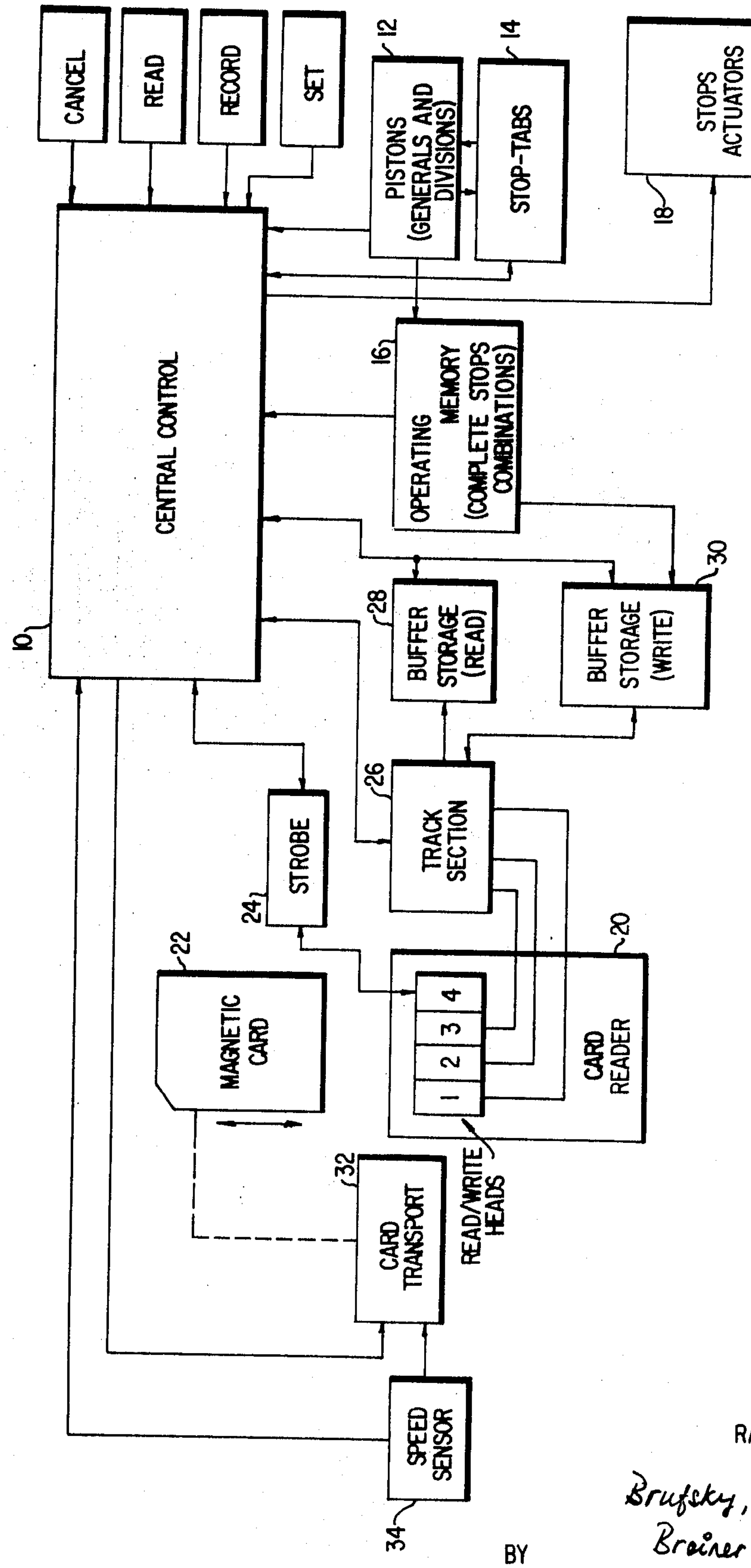
FIG. 1 comprises a block diagram of the capture combination system of the invention.

In FIG. 1 is shown in block diagram form the capture combination system of the invention. The internal operation and processing of commands is controlled by central control 10 which includes various timing and logic gating functions. The pistons for both the generals and the divisions are indicated in block 12 and communicate with central control 10 to indicate the actuation of the piston and the identity thereof. The stops are selected individually and in desired combinations to be captured subsequently by the associated pistons, by actuation of stop tabs 14, representing the stop tab selections for the totality of stops provided in the organ. The stop tabs 14 similarly communicate with the central control 10 which identifies the stops of each combination in association with the related piston for that combination.

An operating memory 16 is controlled by the central control 10 to record the combination of stops selected for each of the pistons, as indicated by the interconnection of the pistons 12 and stop tabs 14 with the central control 10 and of the latter with the memory 16. On subsequent playing of the organ, the central control responds to actuated pistons 12 to read from the memory 16 the associated combination of stops, which information is supplied to the stops actuators 18 which in turn provide for setting the corresponding stops in accordance with the combination called forth by the piston.

The system of the invention is readily adapted for any desired number of divisions and generals, of pistons for each such general or division, and of stops available to be controlled in desired combinations with each piston. As more fully described hereinafter, a specific embodiment of the invention is disclosed in which 80 stops are provided for control by 80 corresponding stop tabs. Four divisions are provided, three of which may relate to the manuals such as the swell manual, the great manual, and the choir manual, and the fourth of which relates to the pedal keyboard. A larger or smaller number of divisions, however, may readily be controlled by the capture combination system of the invention. In addition, two generals are provided, defined as general 1 and general 2 hereinafter. The 80 stops are controlled in groups of 20 by each of the four divisions and are controlled in the entirety thereof by each of the generals 1 and 2. Further, for each division as well as for generals 1 and 2 there are provided six pistons. Each such piston is operable to control a combination of the totality of stops related thereto. Thus, each division piston may control a combination of the associated 20 stops, and each general piston, a combination of the total of 80 stops.

In a manual mode of operation, a combination of stops to be captured by each piston, as desired, is established by actuation of the appropriate stop tabs 14. By actuation of the set button input to central control 10 simultaneously with a piston 12, that related combination is stored in memory 16. Each such piston, up to the total provided, is employed in association with the set button to store a related combination of stops into the operating memory 16.

When operating subsequently in the manual mode in playing the organ, any of the various stop combinations may be immediately recalled from the memory 16 by actuation of the appropriate piston or pistons 12, one for each of the various divisions and generals, under control of the central control 10 to energize the respectively associated stop actuators 18 and thereby call forth the desired tonal colors.

When a previously actuated stop is withdrawn, the associated stops previously set in response thereto are reset automatically. If it is desired to reset the stop tabs on the keyboard, the cancel bottom may be actuated and central control 10 operates the stop actuators 18 to reset the stop tabs.

The present invention furthermore provides for recording in an external recording mechanism the stop combinations set into the operating memory 16, in what is termed hereinafter the card mode. For this purpose, there is further shown in FIG. 1 a card reader 20 and an associated magnetic card 22 for storing the stop combinations established in the operating memory as aforedescribed. Preferably, each card 22 stores one complete set of combinations, although cards having the capacity to store more than one complete set may, of course, be utilized. Further, as will be apparent, although a magnetic card is very convenient for use and thus is preferred, and form of recording or memory element may be employed in lieu thereof, including such conventional recording media as punched cards, punched tapes, magnetic tapes, and optical recording media.

The data to be recorded is, illustratively, the set information for 80 stops in relation to each of two generals, and for those same 80 stops in groups of 20 in relation to the respectively corresponding four divisions. The recording of the stop data conveniently may be performed in three parallel tracks, one of which comprises the stop bit information for the four divisions in succession and the other two of which respectively corresponding to the stop bit data for the generals 1 and 2. A fourth track for strobe or timing pulses is also provided. The associated strobe system 24 responds to timing pulses from central control 10 to record a timing track on the card and, in read operations, responds to the recorded timing track for generating strobe pulses utilized by the central control 10 for synchronizing purposes and for identifying the data read from the three data tracks of the card. Interfaced between the read/write heads of the card reader 20 and the operating memory 16 are a track selection system 26, a buffer storage 28 utilized during the read function, and a buffer storage 30 utilized during the write function, all of which are controlled by central control 10.

In operation, and upon establishing all desired stop combinations, the record button is actuated. Central control 10 causes the operating memory 16 to be read out through buffer storage 30. The information is supplied by track selection system 26 to the appropriate ones of the division and generals tracks 1, 2, and 3 while simultaneously and for each bit position, a strobe pulse is supplied by strobe system 24 to the strobe track. Thus, the stop combination bit information is recorded simultaneously in three parallel tracks in precise timed relation to a strobe pulse train simultaneously recorded in the corresponding strobe track of the magnetic card 22. Any desired number of full stop combinations may thus be recorded on corresponding cards 22.

A card 22 having such information recorded thereon may subsequently be inserted into the card reader 20. In response to actuation of the enter button, central control 10 causes the card to be transported through the card reader 20. The information is read from the various tracks thereof, by the read/write heads and, as identified by the track selection circuit 26, is supplied through buffer storage 28 all under control of central control 10 to the appropriate positions of the operating memory 16. Again, the information preferably is processed in parallel, or simultaneously, for the various tracks and serially for each track, in timed relation to the strobe pulses derived from the strobe track. The stop combination information is thus available in operating memory 16 for use in a manual mode as aforedescribed, when called forth by actuation of pistons 12 to establish the desired stop combinations.

For both the read and write functions, central control 10 controls card transport 32 to transport the card 22 through the card reader 20 at a predetermined speed such that the read/write heads 1–4 simultaneously scan their respectively corresponding recording tracks on the card 22. In addition to the strobe pulse track, and to assure correct synchronization of operations, a speed sensor 34 is provided which responds to the speed of the card transport mechanism 32 to assure that the card 22 is at the proper transport speed for both recording and reading. Since the operating characteristics of the transport mechanism are known, a suitable time interval may be defined by central control 10 subsequent to each start up of the card transport before read/write operations are performed, to assure that the desired transport speed is attained, in lieu of use of apparatus such as speed sensor 34.

The system of the invention further provides that the information transferred from the external storage provided by magnetic card 22 to the operating memory 16 may, after the transfer, be controlled in the manual mode as aforedescribed to make modifications in the combinations established. These modifications, however, will not affect the recorded combinations; thus, substantial versatility is afforded. Further, it will be appreciated that the system is operable, from the standpoint of the organist, in a conventional combination action in the manual mode.

The card mode, however, provides for changing the entire stops combinations of the organ in a matter of seconds. This affords greatly simplified ease of operation of a capture combination action in that any number of complete stop combinations may be prepared well in advance of use of the organ. Thus, the annoyances and interruptions of prior art capture combination systems requiring setting new stop combinations intermediate successive musical selections performed by the organist is eliminated, change of entire stops combination simply requiring change of the magnetic card and actuation of the enter button. As more fully appears hereinafter, the entire system, with the exception of electro-mechanical elements such as an input switches and stop relays, is readily and preferably implemented in solid state logic and operates in a time multiplex control whereby all of the data transfer functions are performed at electronic speeds. The system of the invention thus permits of simplified construction with high speed operation and great versatility in its operating capabilities, and constitutes a substantial advance over prior art combination systems and specifically capture combination systems.

Figure 2:
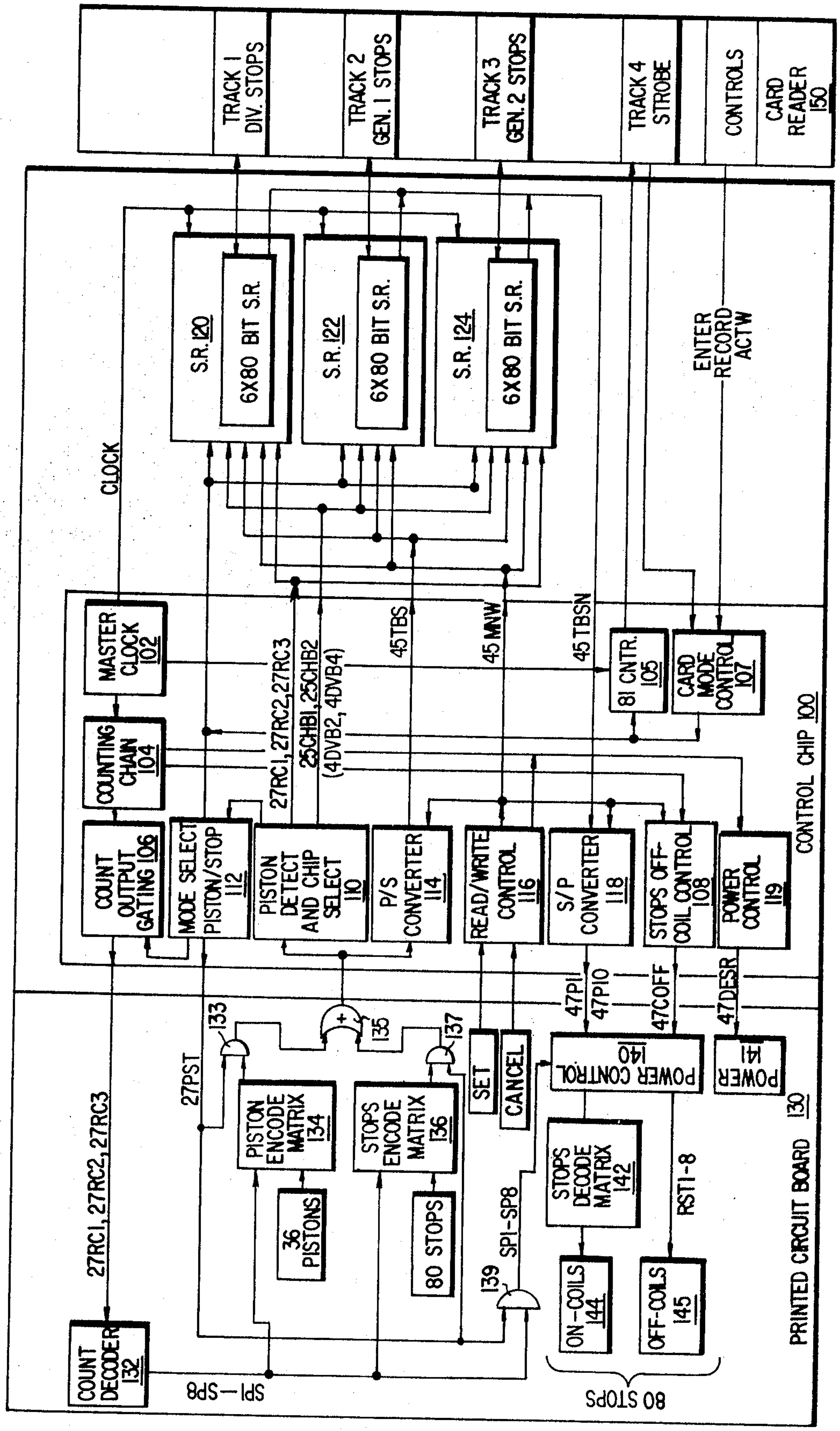
FIG. 2 comprises a more detailed block diagram of the control system and the internal and external memories utilized in the system of FIG. 1.

In FIG. 2 is shown a logic block diagram of the basic components of the system, generally corresponding to the overall system block diagram of FIG. 1. The preferred embodiment of the invention is implemented utilizing advanced solid state technology known as metallic oxide semiconductor (MOS) logic. In general, the central control 10 of FIG. 1 corresponds to the MOS control chip 100 of FIG. 2 and the operating memory of FIG. 1 generally corresponds to the shift register chips 120, 122, and 124 in FIG. 2. The stop tabs 14 and stop actuators 18 of FIG. 1 generally correspond to elements contained in the block 130, the control circuitry of which has been implemented by printed circuit techniques. Finally, in FIG. 2, the block 150 diagrammatically represents the card reader 20 and associated controls, the block 150 further indicating the four recording tracks respectively corresponding to the bit information of the division stops, the general 1 and general 2 stops, and the strobe pulse train.

The internal operations performed by the capture combination system of the invention, and that is to say exclusive of the selections or commands generated by the organist, are performed in a precise cyclical manner under control of an internal clock generator and associated elements and systems, including counters and gating and decoding elements, which provide numerous complex timing functions. As a matter of convenience, the shift register chips 120, 122, and 124 are of identical construction and thus each includes an internal clock oscillator or generator, one shift register chip 120 is used to provide the system clock reference input to the control chip 100, and shift register chips 120, 122, and 124.

As discussed more fully hereafter, the basic bit rate is selected to be 12.5 microseconds, corresponding to an 80 kHz. master, or internal, clock frequency. The master clock 102 in the control chip 100 drives a counting chain 104. The counting chain comprises a number or recycling counters of different counting rates and maximum count values. Selected count outputs of these counters are combined in varying permutations, as required, to provide various different timing and gating functions in the command processing, scanning, and information transfer functions performed in the system. In general, based on the counting rate employed, each piston and each stop of the capture combination system is assigned a specific time slot in a cyclical scan mode related thereto, in accordance with a cyclical counting interval related to the basic clock rate. Thus, within each cycle the appearance of a pulse at a specified count, or time, position serves to identify uniquely a piston or stop which has been or is to be actuated. A count output gating system 106 is selectively controlled in accordance with various different operating modes, to be explained, to produce in response to the output of the counting chain 104 a coded output signal which is applied to a count decoder 132, utilized for both the pistons and the stops, in the printed circuit board 130.

For the disclosed system there are provided six pistons for each division and general; further, the stops are arranged for selection in groups of 10, which, for the 80 stops, provides eight groups of stops. Thus, the gating circuit 106, based on the multiplexing operation, provides three output signals 27RC1, 27RC2, and 27RC3 which in binary code and in accordance with timing and gating functions, identify each of six groups of pistons, and thus the divisions and generals, or each of eight groups of stops. The specific pistons and stops of each group then are identified in a parallel format within the timing interval associated with the group.

In addition to the function of identification, the cyclical counting function is also operable to effect scanning of sets of contacts selectively actuated by the pistons and the various stops to derive therefrom the piston and stop information. Accordingly, in the printed circuit board 130 there is provided a piston encode diode matrix 134 and a stops encode diode matrix 136, an input to the piston matrix 134, labeled 36 pistons and representing the total of six pistons for each of four divisions and two generals as above discussed. Similarly, the input to the stops matrix 136, labeled 80 stops, represents the total of the stops in the system.

The decoder 132 responds to the binary outputs of the count output gating circuit 106 to produce an addressing function of up to eight individual addresses in a repeating cycle. The mode select piston/stop circuit 112 produces an output 27PST for selecting between piston and stop modes of operations. Prior to detecting an actuated stop, the circuit 112 maintains the piston mode. During this time, the cyclically repeating addresses from decoder 132 to be applied to, and to effect a time scan output of the piston matrix 134, and the stop matrix 136, AND gate 133 responds to the enable function 27PST to cause the output from the piston matrix 134.

Scanning of the piston matrix 134 continues in this periodic or cyclical manner until such time as an actuated piston is detected. An output then is supplied through a gate 135 to a detection circuit 110. The detection circuit 110 then actuates the mode select circuit 112 to produce a change in 27PST to a logic state identifying the stop mode of operation. The selection of the stop mode causes the cyclic counting rate of the count output from counter chain 104 and supplied to the gating circuit 106 to change to a different count rate, for a purpose later explained. The mode select output signal 27PST, in the changed logic state, disables gate 133. 27PST is also applied to a second input of each of gates 137 and 139, and now enables these gates. When gate 137 is thus enabled, the stops encode diode matrix 136 output is selected which is scanned for detecting any stop tabs which are actuated and which correspond to the actuated piston 134. The stop tab information is derived for 10 stops at a time and thus 10 parallel bits of stop information are derived from the matrix 136 and supplied through gate 135 to a 10 bit parallel to serial converter 114.

The circuit 110, in addition to detecting the actuation of a piston, identifies the specific general or division with which the piston is associated, based on the cyclic count of the piston mode scan upon detecting the actuated piston. The outputs 25CHB1 and 25CHB2 provide this identification as between the division and generals 1 and 2, and thereby select between the shift register chips 120, 122, and 124 which respectively correspond to the division, general 1, and general 2 stop combinations. Further, 4DVB2 and 4DVB4 identify which one of the four divisions corresponds to the actuated piston. In addition, the detect circuit 110 produces a count coded output 27RC1, 27RC2, 27RC3 at this time which identifies the specific, actuated piston and which is supplied to the shift registers. 27PST, when generated to switch to the stop mode, locks this piston identification into the proper shift register.

The 10 bit parallel information supplied to the converter 114 is supplied thereby as 10 serial bits comprising the output 45TBS to the previously selected one of the shift registers 120, 122, and 124 in this set mode of operation. The supply of the 10 serial bits is controlled by the actuation of the set input to the read/write control 116 which produces the output 45MNW. 45MNW defines a 10 bit window in the time positions of the shift register recirculation cycle assigned to the actuated piston and its associated stops, during which the 10 bits of serial information are inserted, one at a time, into the corresponding 10 bit positions of the appropriate one of the shift registers 120, 122, and 124. It is noted that the shift registers are continuously recirculating at the same rate and in synchronism with one another, and thus the window 45MNW defines the same 10 bit window simultaneously for all the shift registers, but only the selected shift register is enabled to receive the new data. Further, for each divisional piston, two 10 bit windows, and for each general piston, eight 10 bit windows, are defined successively in time in successive transfer cycles by 45MNW.

Continuing in the manual mode, and subsequently to establishing desired stop combinations in the internal memory afforded by the shift register chips, let it be assumed that one or more pistons has been pushed to select or call forth various of the previously established stop combinations now inserted into the shift register memories. The general function here, of course, is to read out the bit information for the stops corresponding to the actuated piston and thereupon supply it in proper form for actuating the desired stops. As above described, the piston matrix 134 is continuously scanned until an actuated piston is identified. Again, the piston detect circuit 110 identifies the actuated piston both in relation to the groups corresponding to one of the four divisions or two generals, as well as the specific piston of that group, and in turn actuates mode select circuit 112 to select the stop mode in accordance with 27PST and selects the appropriate shift register chip 120, 122, or 124 in accordance with the coded signals 25CHB1 and 25CHB2, and the portion of the shift registers of the divisional chip in accordance with 4DVB2 and 4DVB4. The information in the shift register thus selected is gated out and supplied in a 10 bit serial format as signal 45TBSN to the 10 bit serial to parallel converter 118. The latter converts the 10 serial bits to 10 bit parallel format as the signals 47P1 through 47P10 and corresponding to the 10 stops of the group of 20 stops related to a division piston or of the group of 80 stops related to a general piston.

These outputs 47P1 through 47P10 from the control chip 100 are supplied to the circuitry of the printed circuit board 130 and particularly through power control circuit 140 and 141, to be described, to a stops decode relay matrix 142. As previously noted, the individual stops are selectively set by associated stops actuators in groups of 10. By virtue of the cyclic timing sequence, the outputs 47P1 through 47P10 thus are related to a specific group of 10 stops, and that group of 10 is identified as one of eight such groups by the outputs SP1 through SP8 generated by the output decoder 132 and supplied through gate 139 to the matrix 142.

The setting means for the stops, such as set and reset relay devices, are indicated at 144 and 145. The block 144 is labelled "on-coils" and implies the actuating means to set the stops selectively in response to the outputs of the matrix 142. The stops have a self-locking or latching mechanism which permits them, once set, to remain in that condition until reset, or cleared. The block 145 is labelled "off-coils" and implies the actuating means such as reset coils which are energized for returning the set stops to a reset, or cleared, state. Again, since the stops are related in eight groups of 10, it is sufficient to supply a reset signal in common to the 10 stops of each group, in timed relationship to the identification of each of those groups by SP1 to SP8. Accordingly, the signals RST1 through RST8 are supplied from the power circuit 140 to the "off-coils" 145.

Considering again the circuits 140 and 141, the signals SP1 through SP8 designate the relay of the matrix 142 to be energized, and circuit 140 supplies power from the circuit 141 to that relay. Circuit 140 is also responsive to the signals 47P1 to 47P10 which identify the stop to be actuated, to supply power from circuit 141 through the closed ones of the contacts ST1 to ST8 of the energized relay of matrix 142 to energize the thus designated ones of the on-coils 144. Further, circuit 140 responds to SP1 to SP8 to supply power from circuit 141 to the thus designated ones of the off-coils 145.

As more fully described hereinafter, a time multiplexing scheme is employed in effecting the setting and resetting operation to simplify the control circuits for the on and off coils. In general, this technique is effected by the read/write control 116 responsive to both the set and cancel inputs, and controlled in the timing sequence by the counter chain 104 by the circuitry of the logic block "stops off-coil" control 108. In each cycle, in supplying energization to the on and off coils 144 and 145, a reset signal 47COFF is generated simultaneously with 47P1 to 47P10, resulting in simultaneous energization of the on and off coils of the 10 stops in each group currently being processed. The set signals 47P1 through 47P10, however, are of longer duration than 47COFF, and thus the reset signals RST1 to RST8 are correspondingly of shorter duration. The simultaneous energization of the on and off coils 144 and 145 by the set and reset pulses results in resetting the coils for which no set signal is generated and, alternatively, upon termination of the reset signal, setting of the selected stops due to the continuation of energization of their on-coils 144. Preferably, 47DESR is controlled by the counters 104 and the read/write control 116 to provide a short duration between the simultaneous set and reset pulses, and the subsequent continuation of the set pulses to permit the stops to stabilize.

A further feature discussed in detail hereafter is the sharing of common address lines and output lines by the piston matrix 134 and the stops matrix 136. As above noted, these matrices are scanned independently and at different scan rates. To ensure that no extraneous signals are generated that might result in energization of the on-coils 144 through the relay matrix 142, the power supply 141 for the relay drivers 140 is cut off in this mode by the signal 47DESR supplied thereto by the power shutdown control 119 on the control chip 100. The power shutdown control 119 generates the 47DESR output in this mode in response to outputs from the counting chain 104 and to the logic conditions established within the control chip during the high speed scan of the piston matrix.

The term, card mode, is employed herein to identify the operations relating to the external memory such as a magnetic recording card, including both recording of information from the shift registers to the card and reading the information from the card for transfer to and entry into shift registers. As previously noted, the card reader conveniently provides one track corresponding to the four divisions and a separate track for each of the generals 1 and 2. Since each of the shift register chips includes six shift registers, each containing 80 bit positions, each track has the capacity for storing 480 bits of information corresponding to the total information content of the corresponding shift register chip. Further, a fourth track comprising a storage track is generated by the card reader 150 to provide a time reference sequence in reading the recorded information from the card.

The controls on the card reader 150 provide for establishing the command to enter information into the shift registers, or to record information from those shift registers onto the corresponding tracks of the magnetic card. The card reader 150 also provides a speed control signal ACTW which identifies the condition that the card is moving at the proper speed for recording and reading operations.

It will be recalled that, in the manual mode, information is gated into or out of the shift registers in a 10 bit window responsive to the signal 45MNW. Associated parallel to serial, and serial to parallel converters participate in this information flow. In the read operation, however, the information is transferred a bit at a time from the cards to the shift registers, but simultaneously in parallel between the three information recording tracks and the corresponding three shift register chips. This is performed by a progressive gating scheme implemented as follows.

In the control chip, a polynomial counter 105 effects a cyclical count of 81 at the same bit count rate at which the bits are circulating in the shift registers. Upon attaining a count of 81, the counter 105 effects recording of a strobe pulse. Simultaneously, the bit then existing at the output of each shift register is recorded on its corresponding track. Since 80 bits are circulating in the shift registers, each time counter 105 attains the 81 count, the consecutively next succeeding bit is presented at the shift register output. Again, based on the timing control, the six shift registers are selected in sequence, and the bits of each are gated out individually in succession, to effect a serial recording of the totality of information bits from each shift register chip on the corresponding track.

In response to the record command from the card reader 150, and upon receipt of ACTW, the card mode control 107 responds to the recorded strobe pulses from the strobe track of the card and, in the correct time sequence, enables the shift registers, in parallel, for entry of the corresponding information bits.

To clarify the arrangement and relationship of divisions and stops as aforedescribed and the internal and external memories, reference is made to FIGS. 3A through 3E. In FIG. 3A, the 80 stops are indicated as arranged in two groups of 10 in association with each of the four divisions, DIV. 1 to DIV. 4, and in eight groups of 10 in association with each of the generals 1 and 2. Further, as shown in FIG. 3B, six pistons P1 through P6 are associated with each of the divisions, here identified as D1 through D4, and as shown in FIGS. 3C and 3D, six pistons P1 through P6 are associated with each of the generals G1 and G2.

Accordingly, the shift register chips shown in FIG. 2 are arranged as shown in FIGS. 3B to 3D such that the first chip 120 comprises the divisional S.R. chip including shift registers SR1 through SR6 corresponding to the six pistons P1 through P6 and storing the stop information for the divisions D1 through D4 in a successive or serial manner; similarly, the general 1 S.R. ship 122 and the general 2 S.R. chip 124 each include six shift registers SR1 through SR6, corresponding to the respectively associated pistons P1 through P6.

The relationship of the four recording tracks of the card reader 150 of FIG. 2 is shown in more detail in FIG. 3E. The contents of the six shift registers for the divisions and generals are recorded in parallel in the respectively associated tracks, for the six registers in sequence and for the 80 bits of each in succession. The strobe track is coterminous with the information tracks and contains a strobe pulse corresponding to each bit position location of the information tracks, all four tracks being recorded in parallel and read in parallel.

TIMING CHARTS: FIGS. 4 THROUGH 7

Prior to a discussion of the detailed logic and circuitry diagrams that follow, it is instructive to consider the timing functions as shown in the timing charts of FIGS. 4–7 in relation to the general system block diagram of FIG. 2. The techniques by which, and the purpose for which, these various functions are generated are more fully explored in the discussion of the detailed circuit diagrams. Generally, the logic levels employed throughout the system and as used in the timing charts, are logic "0" is zero volts and logic "1" is VDD, typically −20 volts; exceptions are noted.

By way of review, the basic modes of operation have been described as a manual mode and a card mode. The manual mode includes both a piston mode in which, generally, the system responds to actuated pistons, and a stop mode. The stop mode exists during a set operation in which actuated stop tabs are scanned and identified for being entered into the shift registers of the internal operating memory in relation to an actuated piston identified in the piston mode for establishing a stop combination. Continuing in the manual mode, in playing the organ, the piston mode is also established in response to actuation of a piston to set up the desired stops for calling forth the stop bit information from the shift registers and setting the stops.

The card mode includes both the operation of transferring the stop bit information from the shift registers for recording onto the cards, i.e., a record operation, and reading from the cards for entry of the recorded stop bit information into the shift registers of the operating memory, i.e., a read operation. Entry into the shift registers thus occurs in both the manual mode, during a set operation, and in the card mode, during the read operation.

Figure 4B:
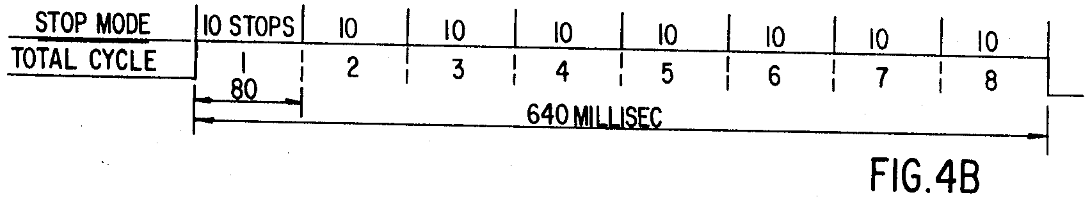
FIGS. 4A and 4B, 5A–5D, 6A–6I and 7A–7M comprise timing charts of the cyclical modes of operation employed in the system of the invention.
Figure 4A:
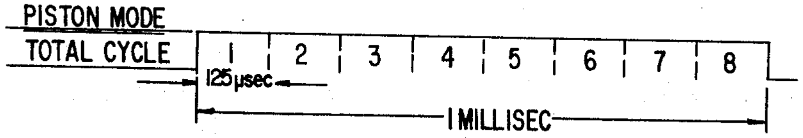

In FIGS. 4A and 4B there are shown the total scan cycles for the piston and stop modes, respectively, these modes being established for scanning the piston and stops encode diode matrices 134 and 136 in FIG. 2. The total cycle of scan in the piston mode occupies 1 millisecond (msec.) and comprises eight successive 125 microsecond ($\mu$sec.) cycles. The bit time of the system is 12.5 $\mu$sec. as established by the basic clocking rate of 80 kHz., and thus each scan cycle of the piston mode is 10 bit times. The eight scan cycles of the piston mode total cycle afford identification and addressing of six lines of the piston matrix of six pistons per line, the matrix lines corresponding to the four divisions and two generals. Obviously up to eight such lines could be separately addressed in the described piston mode total cycle, but two of the lines in the present embodiment are not utilized.

The total cycle of the stop mode is 640 msec. and comprises eight 80 msec. cycles. Similarly to the piston mode, the stop mode total cycle affords selective addressing and identification of eight matrix lines including 10 stops per line for the total of 80 stops in the system. Thus, whereas six pistons are interrogated in the piston mode each 125 $\mu$sec. cycle, 10 stops are interrogated in the stop mode in each 80 msec. cycle.

Figure 5:
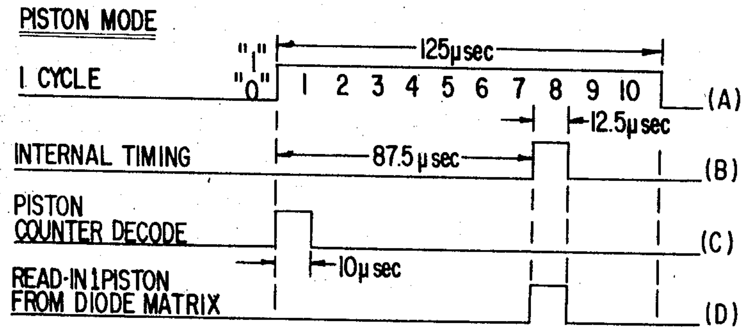

The piston mode is considered more fully in FIG. 5 for a single cycle of 125 $\mu$sec., particularly shown in FIG. 5A. The 125 $\mu$sec. cycle defines 10 intervals each equal to one bit time of 12.5 $\mu$sec.

Responsive to the counter outputs, gating means select the eighth bit time to define an internal coincidence signal or internal timing signal 4PCIN of one bit time (12.5 $\mu$sec.) duration, shown in FIG. 5B. This signal effectively terminates further response to the matrix scan outputs and during the remaining two bit times the piston identification is transferred to storage means. The seven bit times, or 87.5 $\mu$sec., preceding the occurrence of 4PCIN in each piston mode cycle affords time for the system to respond to an actuated piston and identify that piston as a specific one of the six pistons in a given matrix line, and thus for a given division or general. In effect, and as indicated in FIG. 5C, the matrix line of the actuated piston is decoded within the first 10 $\mu$sec. but response to the matrix output identifying the specific piston of that line does not occur until the interval of the coincidence signal 4P-CIN. At the end of the interval, 27PST is generated for locking the piston identification into the appropriate storage means and for initiating the stop mode, as above mentioned and discussed in detail hereafter. The cycle of FIGS. 5A through 5D for the piston mode is repeated eight times, as shown in FIG. 4A.

Figure 6:
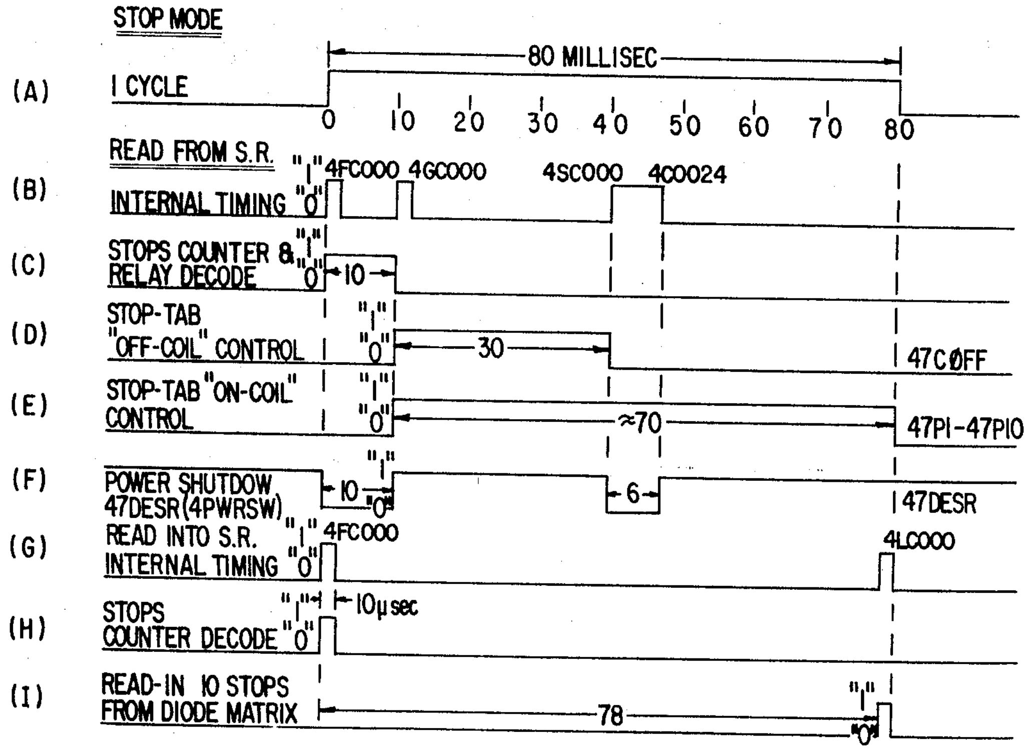

A single cycle of the total cycle of the stop mode of FIG. 4A is shown in the series of timing charts of FIG. 6. FIGS. 6B through 6F relate to functions performed during the manual mode, FIGS. 6D, E and F particularly relating to the operation of setting the stops by energizing the actuating means, in accordance with preselected stop combinations established in the internal memory. Further, FIGS. 6G, H and I relate to the entry operation during the manual mode for entering information into the shift registers from the stops matrix, and also termed the setting operation.

The 80 msec. cycle defines eight 10 msec. intervals, as shown in FIG. 6A. In FIG. 6B are shown certain specific timing pulses generated by decoding of counter outputs, and particularly the pulses 4FC000 and 4GC000 and a pulse extending between 4SC000 and 4C0024. The first two pulses are utilized to define a 10 msec. interval, shown in FIG. 6C, comprising the stops enable interval previously noted and during which 27RC1, 27RC2 and 27RC3 are provided to the 3 to 8 decoder of FIG. 2, labelled decoder 132.

The 4GC000 pulse and the 4SC000 pulse are utilized as shown in FIG. 6D to generate 47COFF defining the energization interval for the off-coils 145 of FIG. 2. 47COFF is on for about 30 msec. during which one of RST1 through RST8 defines the off-coil to be energized. As previously noted, the logic controls provide for simultaneous energization of the off-coils and the on-coils during the first interval. In FIG. 6E is shown the enabling interval for the energization of the stop tab on-coils in accordance with the appropriate ones of the outputs 47P1 through 47P10; this interval is of about 70 msec. duration, and is initiated simultaneously with 47COFF. Comparison of FIG. 6D and E thus illustrates the continuation of the energizing of the on-coils following termination of the energization of the off-coils by 47COFF, whereby the time shared setting and resetting function is accomplished in setting the stops.

In FIG. 6F is illustrated the waveform of 47DESR which defines the period of the power signal 4PWRSW actually supplied to the on and off coils. 47DESR is initiated simultaneously with the on and off coils logic signals, and terminates for a 6 msec. interval prior to being re-established to complete the cycle for the on-coil energization. The 6 msec. interval is defined by 4SC000 and 4C0024 shown in the chart of FIG. 6B. The 6 msec. interval is essentially a rest interval for the power supply 141.

As shown in FIG. 6G, the internal timing pulse 4FC000 also defines, with 4LC000, an 80 msec. interval for the entry operation in the manual mode. As shown in FIG. 6H, the decoding of 27RC1, 27RC2 and 27RC3 for identifying the line of the stops matrix being addressed is performed in 10 $\mu$sec. interval at the beginning of the 80 msec. cycle. Further, as shown in FIG. 6I, during the last 2 msec. of the 80 msec. stop mode cycle, the 10 bits of information identifying the actuated stop tabs, derived from the 10 output lines P1 through P10 of the stops matrix, are converted to serial form and entered into the shift register.

Figure 7:
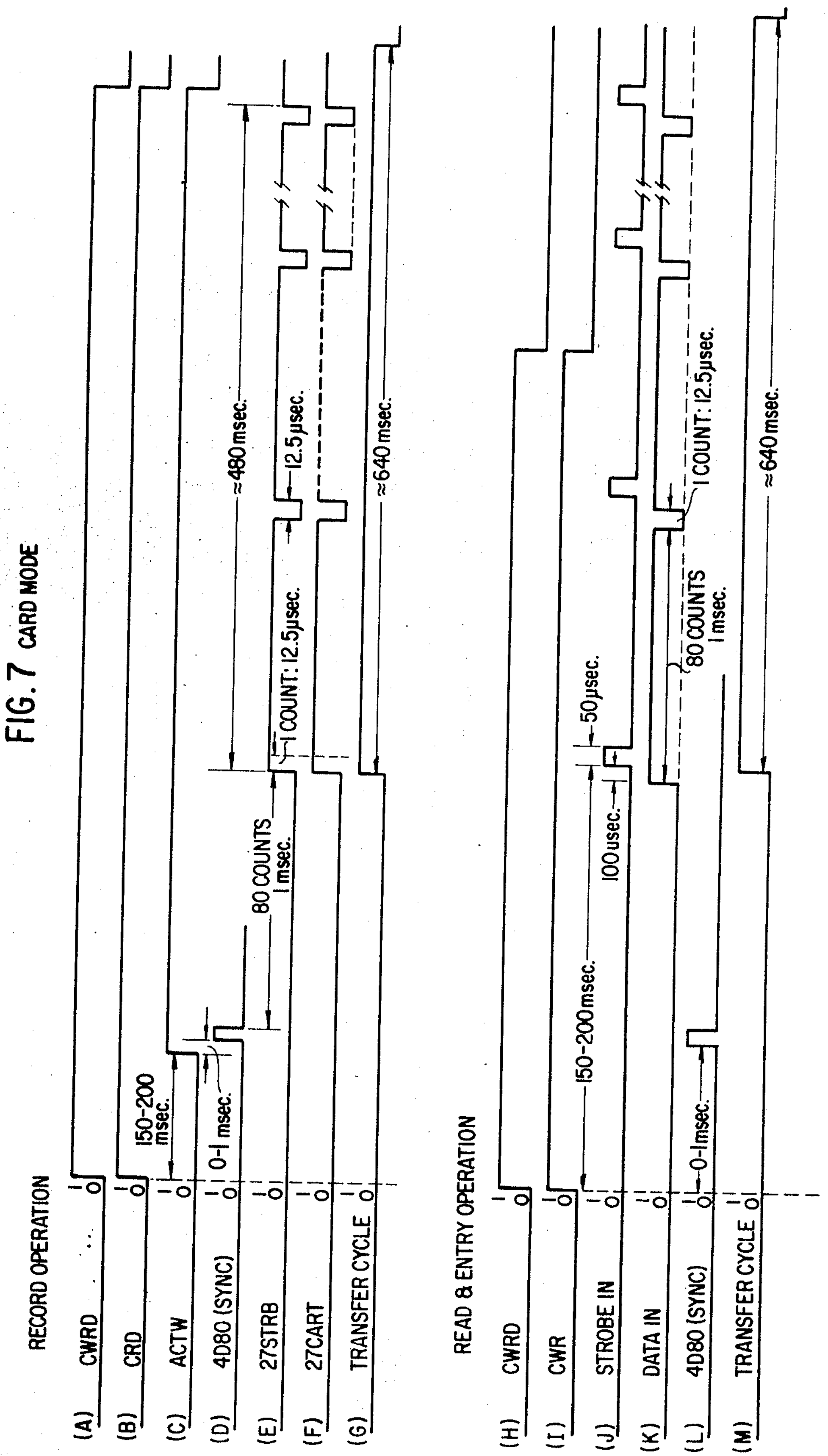

In FIG. 7 are shown the timing functions controlling the primary operations occurring in the card mode, particularly, in FIGS. 7A to 7G are shown those controlling the record operation wherein data is transferred from shift register to card, and in FIGS. 7H to 7M are shown those controlling the read or entry operation involving transfer from card to shift register. The time representation in a horizontal direction is not uniform, to enable simplification of the presentation, but the intervals of significance are clearly identified throughout.

As shown in FIGS. 7A and 7H, the control command CWRD establishes the card mode of operation and the command CRD in FIG. 7B establishes the record or write operation on the card, whereas the command CWR in FIG. 7I establishes the read operation from the card and transfer of the recorded data for entry into the shift registers.

It will be appreciated that in the record operation of FIG. 7A, the card must be accelerated to a proper speed and then advanced at a uniform speed for recording the stop information of each piston, as illustrated by and discussed in relation to the speed sensor 34 of FIG. 1. When that speed is attained, a control signal ACTW is generated as illustrated in FIG. 7C and particularly is generated approximately 200 msec. following initiation of CWRD and CRD. Similarly, in the read operation, the card must be brought to proper speed for the read operation, and accordingly the first recorded strobe on the card is used for this following CWRD and CWR of FIGS. 7H and 7I. The polynomial counter 105 will run as an 80 counter until the first strobe comes in.

Considering now more fully the timing charts of FIGS. 7A to 7G corresponding to the record operation, it will be recalled that data is entered into and read out of the shift registers in progression. Thus, the 81 state polynomial counter 105, operating at the same bit time rate as that of the shift registers, defines at each 81st count, the next successive bit position at the output of the recirculating shift register.

As shown in FIG. 7D, within a time period of from 0 to 1 msec. following ACTW, the 81 state counter 105 is brought into synchronization with the recirculation of the shift registers. In effect, the counter controlling recirculation of the shift registers is decoded at count 80, corresponding to the last bit position in each recirculation cycle and shown as the signal 4D80, and utilized as a sync pulse to initiate counting by the 81 state counter 105.

The 81 state counter counts 80 bits in 1 msec. and during the 81st count, comprising the bit time of 12.5 $\mu$sec., generates the strobe output pulse 27STRB and track, or data bit, output pulse 27CART for recording on the card. The data bit pulse is that information bit now existing in the recirculation loop of a presently addressed shift register. It is understood, of course, that this operation in occurring simultaneously, or in parallel, for three shift register chips and the corresponding three data tracks, as well as in simultaneous time relationship for the strobe track. Each shift register is thus read out in succession, each 81st bit count defining and thereby selecting the next successive bit of the shift registers to be recorded.

In practice, and as indicated by the dotted lines at the first 81st bit time, the strobe and data bits are set into buffer storage circuits at that time, and which are then read out for producing 27STRB and 27CART. 27STRB is logic "1" and becomes logic "0" at each 81st count to define the strobe pulses. 27CART is switched to logic "0" at each 81st count and then set to either logic " " or logic "1" in accordance with the date bit to be recorded.

The waveforms of FIGS. 7E and 7F show only a few cycles of the type just described, it being understood that for each shift register chip, the six shift registers and 80 bits per shift register require 480 such cycles to complete the transfer. Thus, the data transfer shown in FIGS. 7E and 7F requires approximately 480 msec. In fact, due to basic timing functions elsewhere provided, an interval of 640 msec. is provided for the transfer cycle, as shown in FIG. 7G.

Referring now to FIGS. 7H to 7M for the read operation in the card mode, when CWRD and CWR exist as shown in FIGS. 7H and 7I, the recorded strobe and data tracks are read, producing the corresponding strobe in and data waveforms of FIGS. 7J to 7K. Here, again, the 81 counter is brought into synchronization with the recirculation of the shift registers, in a period of from 0 to 1 msec. after detecting CWRD, CWR, as shown in FIG. 7L in accordance with the 4D80 sync pulse. The bits read from the card, in accordance with the data in pulses of FIG. 7K are entered into the shift registers in progression, in accordance with the 81st bit time function produced by the 81 state counter which is now counting in synchronism with the shift registers, for the six shift registers in succession.

By synchronizing and leading edge detection functions, the strobe pulses read from the card generate the strobe-in pulses of FIG. 7J, the data-in pulses being shown in FIG. 7K. The data-in pulses, as well as the strobe pulses, after being read from the card are stored in buffer storage means. Thereafter, at the 81st bit count, the data bit of either logic "1" or logic "0" is entered into the appropriate bit position of the shift register in the progression entry function above described. Since exact synchronization may not be established in a given operation, back-up buffer storage means are provided for storing a second group of related strobe and data pulses read from the card in a given 1 msec. interval.

DETAILED LOGIC CIRCUITS

Figure 8:
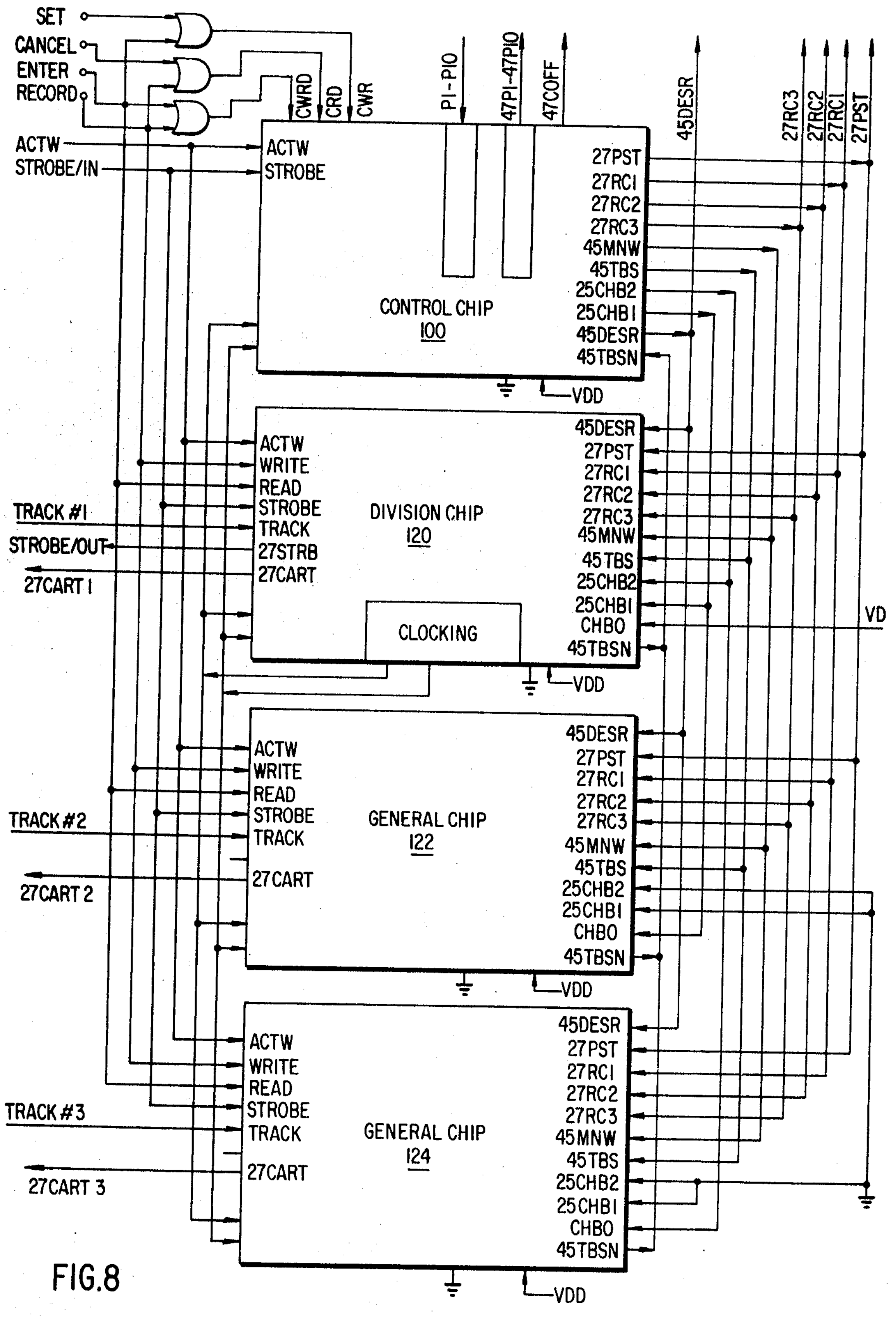
FIG. 8 comprises an interconnection diagram of the control chip and the division and general chips utilized in the system.

FIG. 8 comprises a block diagram of the arrangement of the control system generally corresponding to the control chip 100 and of the shift register chips corresponding to the divisions and generals 1 and 2. The latter three are identical in construction and their functions as division or generals 1 and 2 chips is controlled by the internal decoding logic of these chips. In FIG. 8, the primary control signals, including those discussed in relation to FIG. 2, are indicated as being derived from or applied to the various chips, as well as the common clocking connections which assure synchronous operation of the internal logic processing. Various of the control and information, or data, signals transmitted between the chips shown in FIG. 8 and the card reader and also the printed circuit board 130 of FIG. 2 are also shown. FIG. 8 thus serves to correlate the discussion of the detailed circuit diagrams which follows. Since the division and generals 1 and 2 chips are identical in structure and function, only a representative one thereof is included hereinafter.

Prior to discussing the data transfer and control signal generation in the control and shift register chips of FIG. 8, consideration will first be given to the encoding, decoding, and control functions performed in the system of the printed circuit board 130 of FIG. 2. The primary structures and functions of the board 130 have already been generally discussed in relation to FIG. 2 and they are now considered in greater detail.

Figure 9:
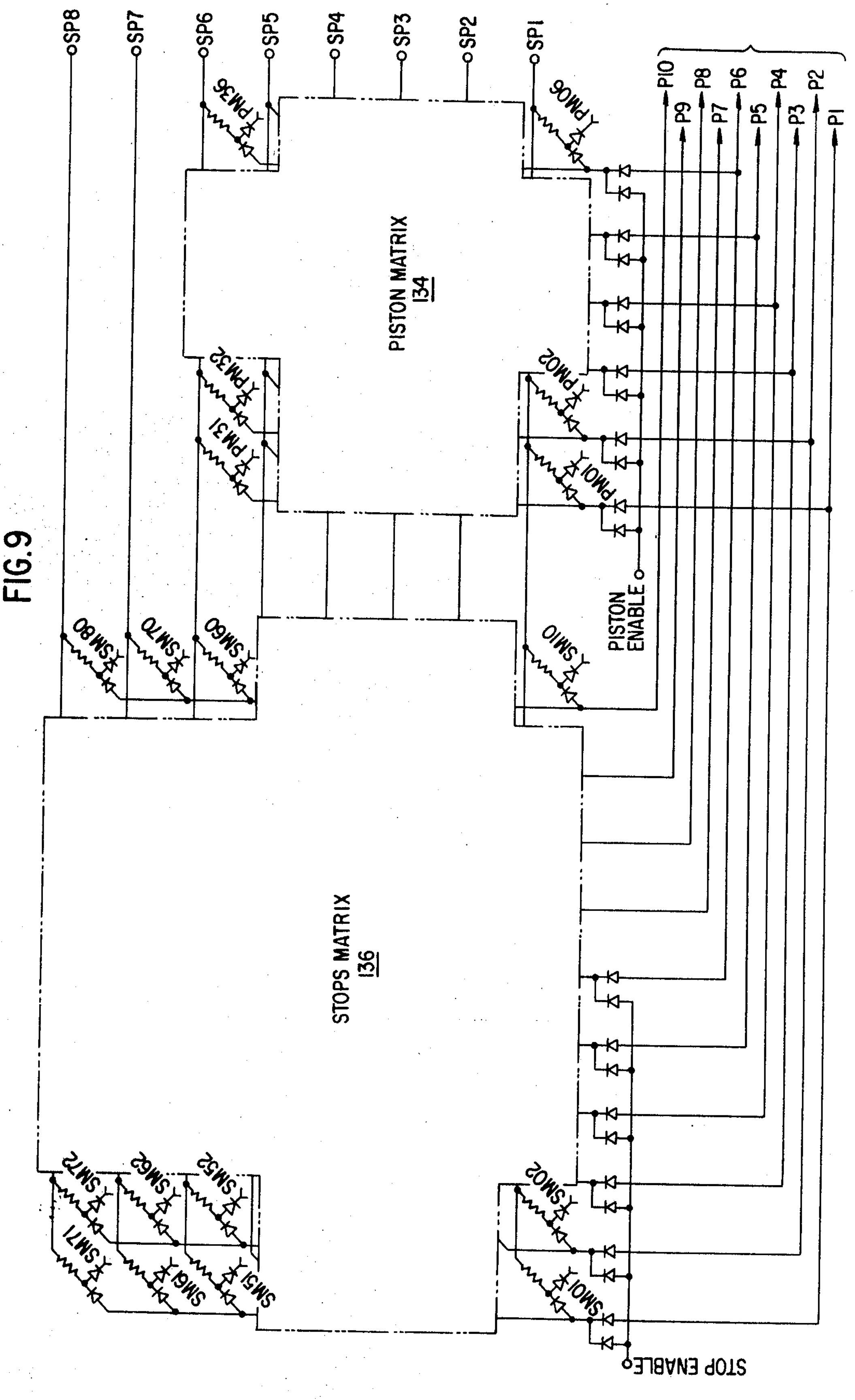
FIG. 9 comprises schematic drawings of the piston and stop matrices providing identification of actuated pistons and stop selections.

In FIG. 9 is shown the piston encode diode matrix 134 and stops encode diode matrix 136. As noted, these matrices share common horizontal access or addressing lines identified in FIG. 9 by SP1 through SP8, the shared lines comprising SP1 through SP6. In addition, the matrices share output lines P1–P6 of the total of 10 output lines P1–P10.

In the piston matrix 134, the horizontal lines SP1–SP6 correspond to divisions 1 through 4 and generals 1 and 2, respectively, and the six vertical lines, labelled P1–P6 and the outputs correspond to the six pistons of each division and general. In the stops matrix 136, the lines SP1–SP8 correspond to the eight groups of 10 stops each, and the lines P1–P10 correspond to the 10 stops of each group.

Since the junctions of both these matrices are of identical construction, only a few are shown in each matrix. In the piston matrix 134, for example, there is shown a conventional matrix junction circuit having an input PM01 and additional such circuits having inputs PM02 . . . PM06 and corresponding to six pistons associated with the line SP1, and thus with division 1. Similar such inputs are provided for each of the succeeding divisions and generals in association with lines SP2 through SP6; as to the latter, PM31, 32, . . . 36 are shown. The labeling thus afforded suggests the 36 pistons of the four divisions and two generals with six pistons each. In some systems, fewer pistons are provided for the generals and thus it is to be understood that the number of pistons inputs in the matrix may be accordingly modified and the size of the matrix itself modified in accordance with the desired capacity of a specific capture combination system.

The stops matrix 136 includes junction circuits identical to those of the matrix 134. As previously discussed, the system processes 10 bits of information in parallel out of the stops matrix and thus 10 stop tabs inputs are associated with each line of the stops matrix 136. For example, stop tab inputs SM01, SM02, . . . SM010 are associated with the SP1 line. For the 80 stops of the system, therefore, the last group of 10, SM71, SM72, . . . SM80 are associated with line SP8. The matrices 134 and 136 also share six output lines P1 through P6 of a group of 10 lines P1 through P10. Selection between the outputs of the matrices 134 and 136 during scanning is effected by the piston enable and stops enable inputs through conventional diode gating to the shared lines P1 through P6.

A control circuit 200 is shown in FIG. 10 which receives as an input the signal 27PST and produces as outputs the control signals "stops enable" and "piston enable," respectively, when 27PST has the values logic "1" and "0." The generation of 27PST is produced by the mode select circuit 112 in FIG. 2.

In FIG. 11A is shown a decoder 210 generally corresponding to the decoder 132 of FIG. 2 and which responds to the binary coded signals 27RC1, 27RC2, and 27RC3 to produce the addressing signals SP1 through SP8, individually and in sequence, and in a repeating cycle. In FIG. 11B is provided a chart showing the decoding performed by decoder 210 and relating the SP1 through SP8 outputs to the values of the 27RC1 . . . RC3 inputs.

Figures 12A, 12B, 14:
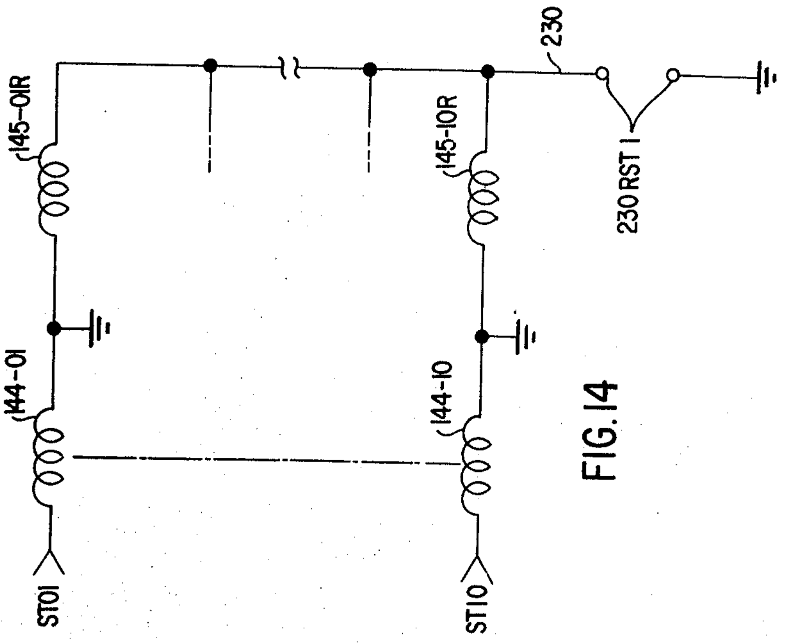
FIGS. 12A and 12B are tables illustrating the encoding performed in accordance with the addressing and output terminals of the matrices of FIG. 9.
FIG. 14 is a schematic illustrating the set and reset coils of the stops actuators in accordance with the on coils 144 and off coils 145 of FIG. 27.

In FIGS. 12A and 12B are shown charts indicating the encoding functions for the pistons and stops in relation to the matrices of FIG. 9 and their accessing by the outputs of the three to eight decoder and addressing circuit of FIG. 11. Reference to FIGS. 12A and 12B indicates that the lines and thus the addressing inputs SP1 through SP6 correspond to the four divisions and the two generals, respectively. By contrast, in the stops encoding during the stop mode, the addressing lines SP1 through SP8 correspond to stops taken in groups of 10, each successive two groups corresponding to a successive one of the divisions, and all thereof corresponding to each of the generals.

With concurrent reference to the systems and charts of FIGS. 9 to 12, therefore, during enable of the piston matrix 135, the time sequential addressing of lines SP1 through SP6 produces a succession of six parallel bits of information on lines P1 through P6. The presence of an output on any one of the lines P1–P6 during any given piston scan interval serves to identify an actuated piston and, as later described, terminate the piston scan operation. Having thus identified the piston, the system enters a different scan rate for the time sequential addressing of lines SP1 through SP8. During the stops enable, the addressing of the matrix 136 thus provides 10 parallel bits of information P1 through P10, each "1" bit output on the lines of the matrix identifying an actuated stop.

The piston and switching matrices thus are scanned in a repeating cycle as aforedescribed for transfer of the stop information in relation to each actuated piston to the appropriate shift registers for storage. As described in FIG. 2, the output lines P1 through P10 provide 10 bit parallel information to the parallel to serial converter 114.

In the manual mode during playing of the organ, the piston matrix is again scanned in the manner as aforedescribed for deriving on the output lines P1 through P6 the identification of the actuated piston, for each division and general in the time sequential manner described. The information derived from the operating memory of the appropriate shift register chips is then provided by the serial to parallel converter 118 of FIG. 2 as 47P1 to 47P10 to the power switching system 140 and a stops decode relay matrix 142 for energizing the on and off coils 144 and 145 of the stops.

Figure 13:
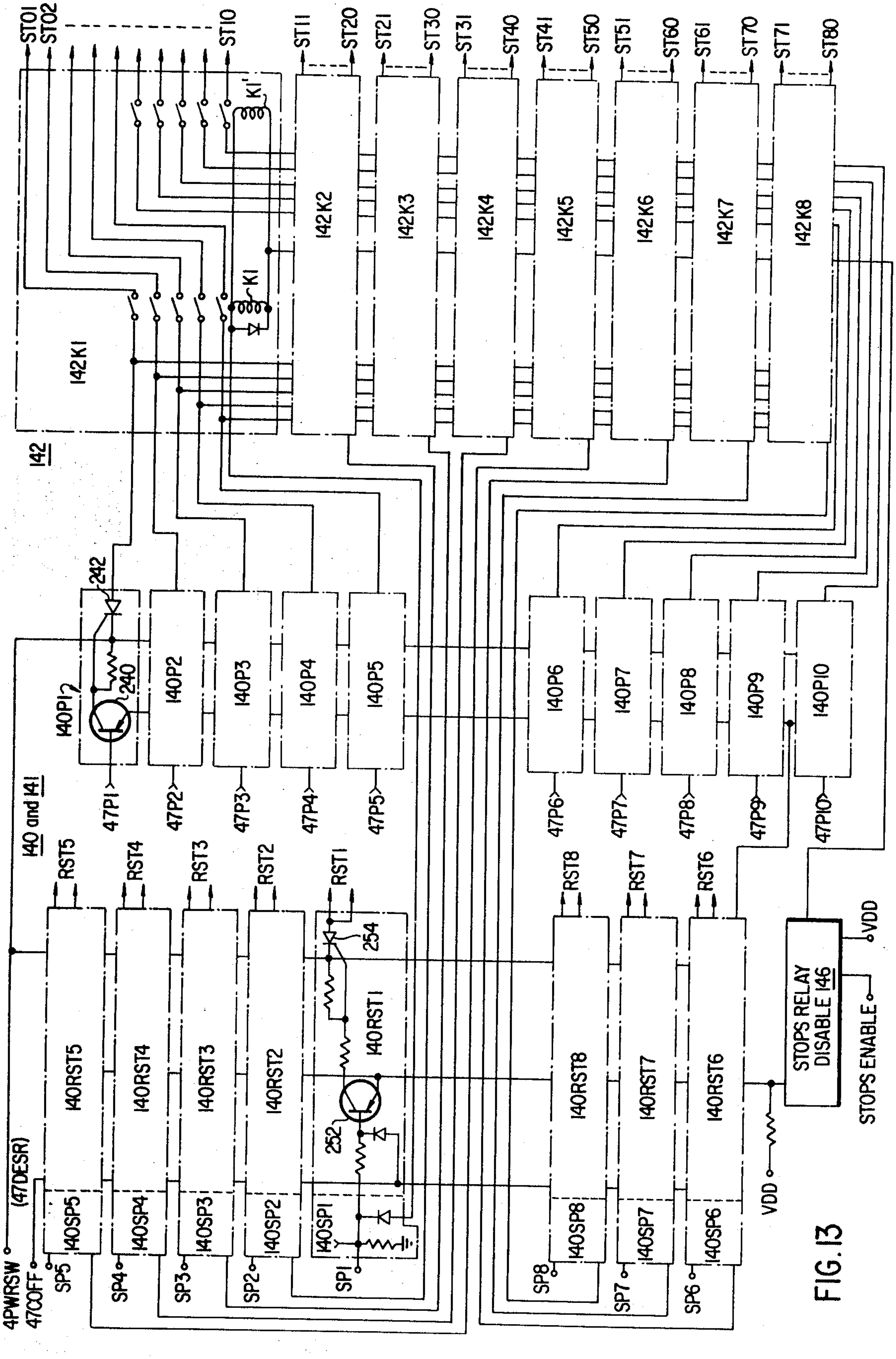
FIG. 13 is a schematic, partly in block diagram form, of the stops decode matrix 142 and the power control circuits 140 and 141 shown in FIG. 2.

In FIG. 13 is shown the stops decode relay matrix 142 and the associated power driving circuits 140 and 141 for energizing the on-coils 144 and the off-coils 145 of the stops shown schematically in FIG. 14, and previously shown in block diagram form in FIG. 2. Considering first the system of FIG. 13, the power system 140 for setting the stops and thus energizing the on-coils is identified by a group of identical circuits 140P1–140P0 receiving the inputs 47P1–47P10, respectively, and the circuits for energizing the off-coils and thus resetting is identified by a group of identical circuits 140RST1–140RST8. CORRESPONDING TO THE BLOCK DIAGRAM OF FIG. 2, there are shown the inputs 47P1 through 47P10 derived from the internal working memory through the serial to parallel converter 118 and applied to the power circuits 140P1–140P10. Similarly, there are shown the inputs SP1 to SP8 provided to the power circuits 140SP1–140SP8 for energizing the relays of the stops decode relay matrix 142, as well as for the reset operation in accordance with the reset enable signal 47COFF. The inputs SP1 through SP8 are selectively energized in succession in accordance with the time scan function previously described, and thus in relation to each group of 10 stops. The outputs of the contacts of each relay are identified as ST01 through ST80 and are associated in groups of 10 as illustrated by the outputs ST01 through ST10 for actuation by a common relay coil K1. There are eight such coils in the decode matrix 142, each coil operating 10 contacts simultaneously. For convenience of reference, the thus identical portions of the matrix 142 are labelled 142K1–142K8. It will be appreciated then, that the signals SP1–SP8 selectively energize the relay coils of the respectively associated sections 142K1–142K8.

Before describing the operation of the system of FIG. 13 in detail, reference is had to FIG. 14 which illustrates representative solenoid stop actuators. Considering the related group of stops energized by the on-coil signals ST01 through ST10, and which are representative of each such group, there is provided for each stop an on-coil 144-01 through 144-10 connected between the associated input terminals receiving the signals ST01–ST10, and a reset or off-coil 145-01 through 145-10 connected between ground and a common lead 230 in turn connected to input terminals 230RST1. The reset signal RST1 is applied to the terminals 230RST1. Each of the on-coils 144-01 to 144-10 thus is adapted for individual and selective energization by the outputs ST01 through ST10. By contrast, the reset coils such as 145-01 to 145-10 are connected in parallel for energization in common by the reset output RST1.

Referring again to FIG. 13, each power circuit 140P1–140P0 includes a control transistor 240 connected at its base terminal to an input terminal for receiving the input signal 47P1 and, when energized thereby, triggers the associated SCR (silicon controlled rectifier) 242 to conduction. The cathode of the SCR242 is connected to a common lead labelled 4PWRSW comprising a power signal corresponding to the signal 47DESR and which is generated during the setting operations in the manual mode by the control chip to provide energization of the on-coils for actuating the stops, as described in relation to FIG. 6F. The signal 4PWRSW (47DESR) when "off," clamps the cathode to ground potential thereby preventing a forward bias from being established, and when "on" ties the cathode to VDD of −20 volts for establishing a forward anode to cathode bias for rendering the SCR's conductive.

Considering first the energization of the on-coils, and with regard to the timing circuit of FIG. 6, and particularly FIG. 6C, during the initial 10 msec. interval identified as stops counter and relay decode, the three to eight decoder 132 (FIGS. 2 and 11) produces an output SP1 through SP8 identifying the group of 10 stops then being processed. The decoder 210 essentially clamps the selected one of the outputs SP1 through SP10 to the bias source VDD, typically −20 volts. There is thereby established a circuit through the diode 250 to effect energization of the coil K1 (and the associated parallel coil K1') of the first section 142K1 of the relay decode matrix 142. The energized coil then closes its respectively associated 10 contacts. Although a split coil relay comprising the parallel coils K1 and K1' is shown, it is apparent that any suitable relay may be employed for effecting closure of the contacts to complete a circuit to the outputs ST01 through ST10.

Having established closure of those contacts, and with reference to the timing charts of FIG. 6C and FIG. 6E, following the 10 msec. interval there are generated simultaneously 47COFF and the selected ones of the signals 47P1–47P10. Assuming the first cycle of operation, SP1 is supplied to the circuit 140RST1, and renders the transistor 252 conductive. 47COFF is supplied to the cathode of SCR 254 at this time, which is thereby triggered into conduction producing a VDD potential at its anode and constituting the output RST1. Thus, with reference to FIG. 14, each of the reset coils 145-01R to 145-10R is energized in common for a 30 msec. interval. Any stop solenoid previously in a set position is returned thereby to a reset position.

Simultaneously with the signal 47COFF, one or more of the conditions 47P1 through 47P10 may also be true again constituting a VDD signal level. In the case of the 47P1 condition being true, transistor 240 in circuit 140P1 then is rendered conductive; 4PWRSW (47 DESR) is supplied to the cathode of SCR 242 at this time, which is thereby triggered into conduction. VDD is thereby produced at the anode of SCR 242 and supplied through the associated closed relay contact to produce the power output ST01. Thus, the on-coil 230 in FIG. 14 is simultaneously energized with the off-coil 145-01R. Since the on-coil control of FIG. 6C extends for some 40 msec. beyond the off-coil control of FIG. 6D, there remains a 40 msec. interval in which ST01 continues energization of the on-coil 230 and, as a result, switching of the stop solenoid to the on condition of the stop. As noted, 47DESR causes a 6 msec. power off interval following reset and prior to continuation of the power on signal 4PWRSW in each cycle.

Thus, as the time scan successively supplies the inputs SP1 through SP8, the relays in the sections 142K1–142K8 of the relay matrix 142 are successively energized and the corresponding reset outputs RST1–RST8 are produced. In each of the eight cycles defined by SP1–SP8, the stop information corresponding to the input signal conditions 47P1 through P10 is simultaneously supplied to the circuits 140P1–140P10 for supplying the on-coil energization of the stop actuators. Thus the stops are set in successive groups of 10 and, within each group, are set individually and selectively, but are reset in common.

In a cancel operation, for resetting the previously actuated, or set, stops, the signal 47COFF is again generated, independently of the 47P1–47P10 signals. 47COFF thus operates in an exclusive reset function to energize the off-coils 145, in the succession of SP1–SP8 as before, as thus 10 stops at a time.

A further control circuit 146 labelled Stops Relay Disable is provided in FIG. 13 which controls the supply of VDD to the relay coils of the relay decode matrix 142, as shown in relation to coils K1 and K1'. Circuit 146 is enabled by the stops enable signal generated by the control circuit 200 of FIG. 10 in response to 27PST, thereby to supply VDD to the relay coils only in the stop mode. Thus, the relay coils are not energized in response to the signals SP1–SP8 generated in the high speed scan of the matrices in the piston mode.

CONTROL CHIP 100 AND SHIFT REGISTER CHIPS 120, 122, 124

There will now be considered the detailed circuit diagrams of the control chip 100 and the shift register chips 120, 122, and 124 in association with the external commands or control inputs produced form the printed circuit board 130 of FIG. 2. In the following discussion, it is to be understood that internal clocking is performed such that the gates and other logic elements as well as counters and the like are driven in relation to a master clock rate. Thus, clocking pulse trains are not indicated as such. Various of the encoded counter outputs utilized in the system for establishing timing and gating functions are generally indicated by the notation Tc. These encoded counts are derived by selecting appropriate outputs of the counters of the counting chain 104 in the control chip 100, and represent the occurrence of a specific time position within the basic cycling rates established in the system.

Reference is first had to FIGS. 15A through 15G which relate to logic circuits for establishing various commands and the resultant internal logic conditions which are thereby established for controlling the internal operations of the system. It should be recalled that the basic functions to be performed, and thus the commands to be made by the organist, are, in the manual mode, to set stop combinations into the internal memory in association with each piston, as desired, to cancel those set combinations for entering new combinations, and to call forth the combinations when playing the organ simply by actuating the appropriate piston. In the card mode, the commands are to record the full stop combinations established in the internal memory in the external memory of the card reader for subsequent use, and to enter the information recorded in the external memory into the internal operating memory.

There are thus five basic commands or requests presented by the organist to the combination system (see FIG. 15H). In FIG. 15A, there are indicated the four inputs SET, CANCEL, ENTER and RECORD.

These four input commands or controls are processed by OR gates 300, 301 and 302 to produce three internal commands, or command conditions CWR, CRD and CWRD. With reference to the table of FIG. 15H, therefore, the manual mode corresponds to a logic "0" for the condition CWRD and thus the absence of an input command of either ENTER or RECORD. In the converse, either of the ENTER or RECORD inputs produces condition CWRD as a logic "1" for the card mode. In the manual mode, the SET input corresponds to actuation of a set piston with a piston for which stop tab selections have been made for setting that stop tab information into the internal operating memory. Thus in the manual mode in which CWRD is logic "0," actuation of the SET button produces a logic "1" value for CWR. Similarly, in the manual mode, actuation of the cancel button produces logic "1" for CRD. For the card mode, in which CWRD is logic "1," actuation of the ENTER button producing CWR with CWRD, produces reading of the external memory and entry of the information into the internal memory. Finally, in the card mode, actuation of the RECORD button produces logic "1" for both CRD and CWRD for transfer from the shift register and recording onto the cards.

In FIGS. 15B–15G, various logic conditions more fully explained hereafter are combined to produce control signals used extensively throughout the system. Essentially, the signals produced in each of these logic circuits establish timing or recognition of required operating conditions, such as sensing of an actuated piston or completion of a transfer cycle, or certain timing effects such as the occurrence of a precise time in the cyclic operation at which enabling conditions are to be established. These will best be understood as the various subsystems are discussed in detail.

It is pertinent to note now, however, that the circuits of FIGS. 15B, C, D, and E each comprises a storage element in the nature of a flip-flop with associated gating circuits. Generally, however, these flip-flops serve to store the command conditions until the operating cycle of the system generated in response thereto is completed. Particularly, the condition CWR is stored in the 4CWR flip-flop of FIG. 15B, CRD is stored in the 4CRD flip-flop of FIG. 15C, CWRD is stored in the 4CWRD flip-flop of FIG. 15D and the speed control signal ACTW is stored in the 4ACTW flip-flop of FIG. 15E. Each of these flip-flops is reset by a reset signal 1CEND produced by the logic circuit of FIG. 15F in a manner described more fully hereinafter.

Figure 16:
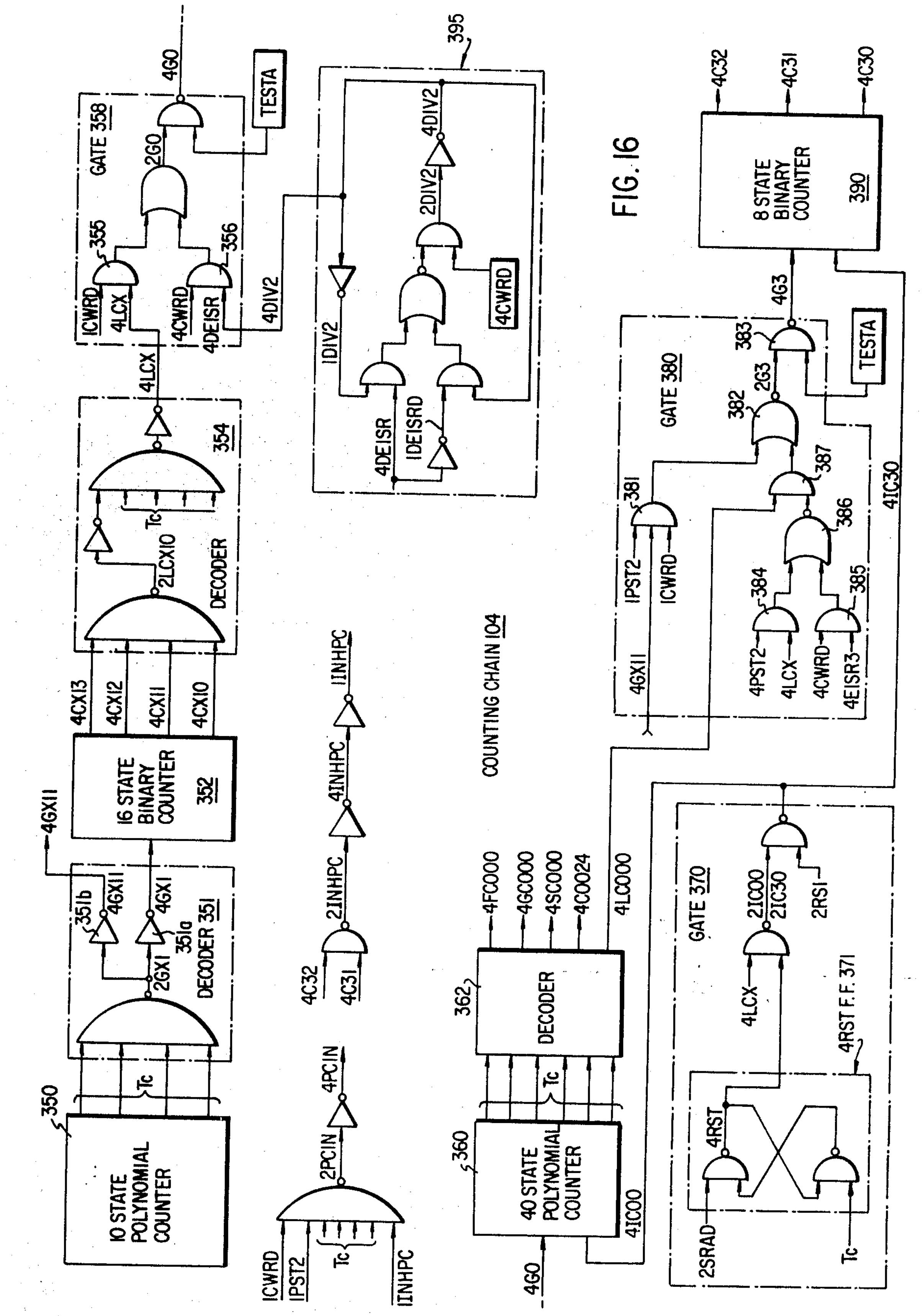
FIG. 16 comprises a logic block diagram of the counting chain 104 of FIG. 2.

In FIG. 16 the counting chain 104 of FIG. 2 and associated decoding circuits are shown substantially in diagrammatic form to afford an indication of the source of time intervals and cyclic control functions utilized throughout the system. Generally, the symbol Tc as seen in FIG. 16 is used throughout the detailed logic diagrams and discussion to denote specific counter outputs of the counters in the counting chain, taken individually and in various combinations. Decoding of the counts to define the prescribed intervals, cycles of operation, and relative time positions in the cyclic operation is, of course, well known to those skilled in the art.

Ten state polynomial counter 350 counts at the basic bit time rate of the internal 80 kHz. clock and thus at a bit time of 12.5 $\mu$sec. Selected count outputs are supplied to a decoder 351 which in turn drives a 16 state binary counter 352. The 4GX11 output is the recycle count of counter 350, and thus is produced after each 10 bit times, and thus at 125 $\mu$sec.

Counter 352 is utilized as the reference counter for the shift registers. As shown in the table of FIG. 16A, it generates eight encoded outputs 4CX10, 11, 12 and 13 for defining eight time divisions corresponding to 10 stops each. This register counts at the 125 $\mu$sec. rate of 4GX1 from decoder 351, and thus from 0000 to 0111 in 1 msec.; in the subsequent eight encoded counts from 1000 to 1111, another 1 msec. elapses, giving a total recycle time of 2 msec.; corresponding to a count of 160 at which 4LCX is generated.

The output 4LCX of decoder 354 is supplied to the input gate 358, including the gates 355 and 356 to be explained. The thus controlled and timed output of gate 358 is supplied to a 40 state polynomial counter 360 which also receives a control input 4ICOO from a gating network 370 for a purpose to be subsequently described. The counter 360 counts to an 80 msec. rate, and, among other functions, produces through decoder 362 the recycle count 4LC000 at the 80 msec. rate for advancing the eight state binary counter 390.

Note that the output 4GX11 from decoder 351 is also supplied to the gating network 380 and forms an alternative path for controlling the eight state binary counter 390, substantially directly from the outputs of the 10 state polynomial counter 350. Under conditions to be explained, 4G3 is produced at the 125 $\mu$sec. rate of 4GX11 in accordance with the control gates there provided. These alternative paths are provided to establish two different count rates, one being the 125 $\mu$sec. rate utilized in the piston mode, and the other being the 80 msec. rate utilized in the stop mode, as aforedescribed.

The binary outputs of the counter 390 are identified as 4C30, 4C31, and 4C32. As later described in detail, these signals produce the 27RC1, 2, and 3 signals previously discussed in relation to FIG. 11B for addressing the piston and diode matrices, and also for addressing the shift registers in the transfer functions related thereto. The table of FIG. 16B relates these various count identifying functions.

A control circuit 395 driven in response to a signal 4DEISR, to be described, is associated with decoder 358 and, by supply of that signal to the gate 356 of gating circuit 358, to produce 4G0 only for every other 4DEISR, and thus causes the 40 state counter 360 to count effectively as an 80 state counter. The circuit 370 generally provides reset of the 40 state counter 360 and the eight state binary counter 390 to establish synchronization, as later described.

Figure 26:
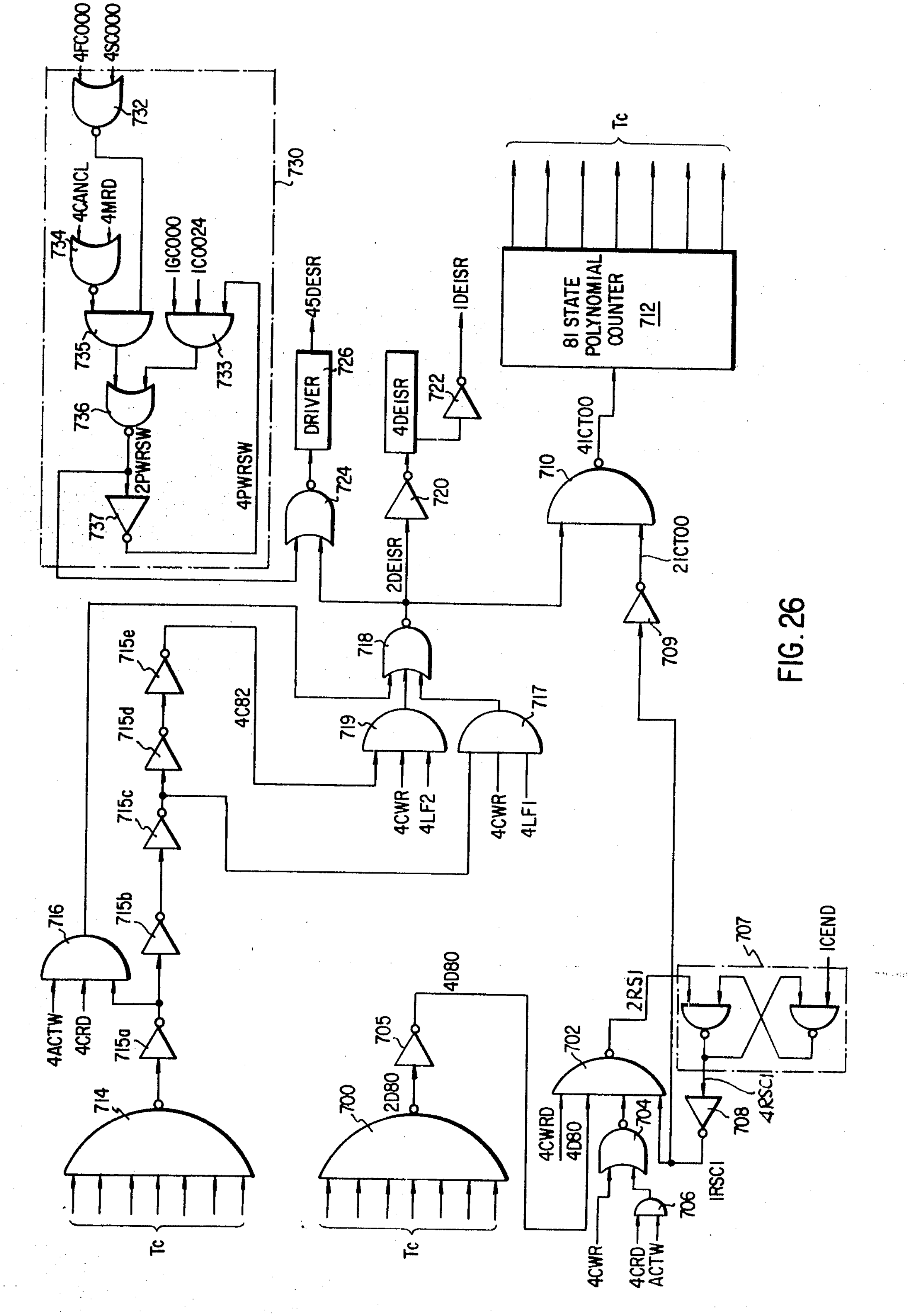
FIG. 26 is a logic block diagram of counting and gating functions performed in the card mode.

An 81 state polynomial counter 105 of FIG. 2 is shown at 712 in FIG. 26, since it is used in the card mode, discussed in regard to FIG. 26 and related figures. That counter controls, by its coded outputs, the gating of information from the shift registers of the internal memory for transfer to the card reader or the reverse.

Figures 17A, 17B:
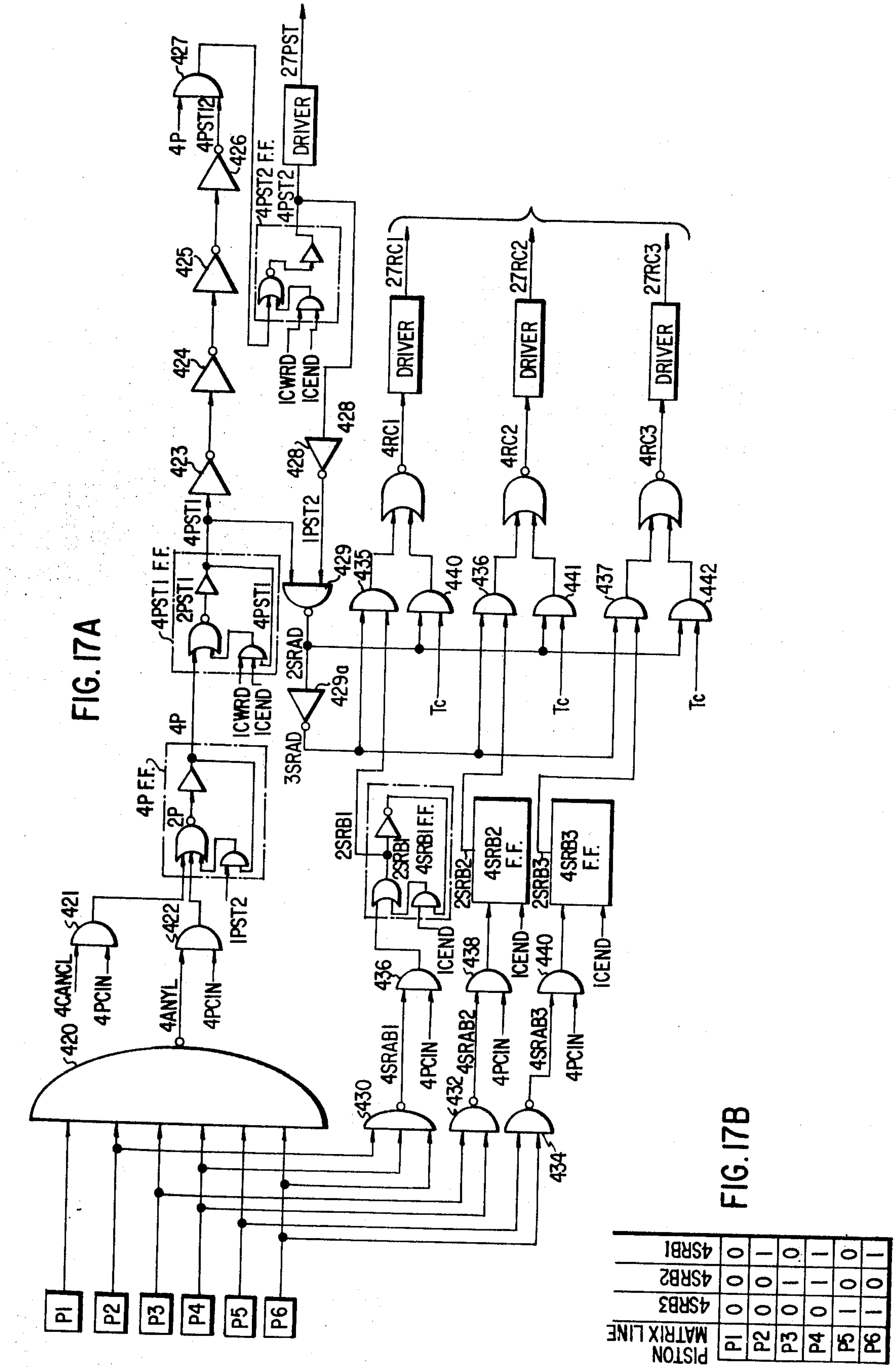
FIG. 17A is a logic block diagram of gating and timing functions for piston identification and FIG. 17B is a table relating the logic conditions established in the diagram of FIG. 17A to the piston identification.

In FIG. 17A is shown the piston/stop mode select circuit 112 of FIG. 2. The inputs P1 through P6 to NAND gate 420 represent the piston outputs from the piston matrix 134 of FIG. 9. In response to one of P1 through P6 being received, NAND gate 420 produces a logic "1" as the output 4ANYL. When a piston is recognized, and in accordance with the timing signal 4PCIN, AND gate 422 is enabled and the flip-flop labelled 4P F.F. is set, producing the 4P output as logic "1." The 4P output in turn sets flip-flop 4PST1, the output of which supplies an input to AND gate 429. The 4PST1 output is also supplied through inverters 423, 424, 425, and 426 which introduce a two bit time delay, to AND gate 427 which receives at its second input the 4P signal from the flip-flop 4P F.F. and sets, when enabled thereby, the 4PST2 flip-flop. The 4PST2 output energizes a driver which produces the 27PST signal. The signal 27PST is a logic "0" in the piston mode, and thus when a piston P1 through P6 has been recognized, and a logic "1" in the stop mode during scanning of the stops. The 4PST2 output is supplied through an inverter 428 to the second input of AND gate 429 to interrupt the 2SRAD output, and to produce the output at inverter 429a 3SRAD.

The piston conditions input P1 through P6 are also supplied to associated NAND gates 430, 432, and 434, the outputs of which are connected through timing gates 436, 438, and 440 respectively, which also receive the 4PCIN signal as the second input to each, to the set inputs of flip-flops (F.F. labelled 4SRB1, 4SRB2, and 4SRB3. As indicated in the table of FIG. 17B, the states of these flip-flops identify in binary code the identification of the actuated piston as represented by P1 through P6.

Each of the aforedescribed flip-flops includes an input 1CEND which is generated at the end of each of the operating cycles and resets the flip-flop. The logic circuit for generating that signal is shown in FIG. 15F.

At this point, it is instructive to consider the generation of the reset signal 1CEND in accordance with FIG. 15F. In relation thereto, it will be appreciated that the use of 1CEND as a reset signal, such as for the flip-flop 4SRB1 in FIG. 17, requires that it normally be a logic "1" to enable the circulation mode to be maintained for storing a signal. Reset of the flip-flop then occurs when the AND gate to which 1CEND is applied is disabled, and thus the recirculation mode is temporarily disrupted. That function occurs if 1CEND is logic "0."

Thus, returning to FIG. 15F, and considering first NAND gate 330 and inverter 331, 4CEND is normally logic "0" since the input from NAND gate 332 is always logic "1" and the other input, 2CEND is usually logic "0." Thus 1CEND produced from 4CEND through inverter 321 is typically logic "1."

The output of NAND gate 332 is always logic "1" since the input conditions of CWR and CRD thereto never occur simultaneously and thus one or the other or both is logic "0" at all times.

Considering now the inputs 4C30, 4C31 and 4C32 to NAND gate 333, these will be recalled to be the count outputs of the eight state binary counter 390 in FIG. 16. These inputs are all logic "1" only at the eight count and thus normally maintain NAND gate 333 disabled to produce a logic "1" output. When the eight count is established, NAND gate 333 is in a condition to be enabled and produce a logic "0" for 2CEND. Thus, in examining the inputs to OR gate 334, when 4CWRD is true for the card mode, and thus during either an ENTER command or a RECORD command, NAND gate 333 receives OR gate 334 in logic "1." Thus, at the eighth count 2CEND becomes logic "0" and NAND gate 330 produces logic "1" for 4CEND and inverter 331 produces logic "0" for 1CEND.

When either ENTER or RECORD commands are received, the reset condition must be satisfied in accordance with the input to AND gate 335 such that a logic "1" is produced at the output for supply through OR gate 334 to the NAND gate 333 in accordance with the above described sequence. Examining the inputs to AND gate 335, therefore, all of these conditions must be logic "1" for a logic "1" output to be produced. 1CWRD is the inverse of 4CWRD and thus, consistently, 1CWRD is logic "1" since the system is not in the card mode when AND gate 335 is to be enabled.

4LC000, it will be recalled, is the end of cycle output generated at the 80 msec. time slot by decoder 362 responsive to the completion of count by the 40 state polynomial counter 360. 4LCX is the inverse of 2LCX generated at the 160th bit time by decoder 354, responsive to the count outputs of the 16 state binary counter 352 which provides the shift register reference.

4PST2 is generated in the piston response circuits of FIG. 17 and particularly by the 4PST2 flip-flop. 4PST2 is logic "1" when generating 27PST at the termination of the piston mode for establishing the stop mode.

Thus, to summarize, when the system is not in the ENTER or RECORD operations of the card mode (1CWRD) and it has concluded an 80 msec. cycle time (4LC000) and, in addition, the cycle time of the shift register recirculation has been completed and the end of the shift register has been reached (4LCX), and furthermore the system is in the stop mode (4PST2), AND gate 335 produces a logic "1." 1CEND then becomes logic "0" as a reset signal.

The timing and enabling input 4PCIN is identified in FIG. 5B and is produced during the eighth bit interval in the piston scan. As shown in FIG. 5C, in the piston mode, and in each 125 μsec. cycle, the count output of the piston counter is decoded during the first 10 μsec.. This is the function performed by the decode gates 430, 432, and 434. When 4PCIN is true, AND gates 436, 438 and 440 are enabled and the flip-flops 4SRB1, 4SRB2, and 4SRB3 are set to identify the actuated piston. The outputs of these flip-flops then are supplied to AND gates 435, 436, and 437 which are enabled, when 2SRAD is false, 3SRAD is true to produce through the associated NOR gates and drivers, the outputs 27RC1, 2, and 3.

By the circuitry shown, the signal 3SRAD is generated one bit time after the signal 4P as a result of 4PST1 and is maintained until 4PST2 is generated and thus provides a three bit time interval comprising the eighth, ninth, and 10th bit times of the piston mode cycle. During this time, through inverter 429a, 2SRAD produces 3SRAD which enables AND gates 435, 436, and 437 to produce 27RC1, 27RC2, and 27RC3. As shown in the gating circuit 370 of FIG. 16, 2SRAD sets the flip-flop 371, also labelled 4RST.

Before proceeding with the successive operations after identification of the actuated piston, it is instructive first to relate the signal 27PST, the source and generation of which has now been explained, to the piston matrix and stops matrix of FIG. 9 and particularly with regard to the control circuit of FIG. 10 wherein that signal 27PST is employed to generate the stops enable and piston enable signals. Particularly, it is now seen that 27PST is normally in the logic "0" state corresponding to the piston mode and therefore normally is generating the piston enable signal. Thus, with respect to the matrices of FIG. 9, the piston matrix 134 is normally being scanned until such time as an actuated piston is recognized. By the foregoing operations, 27PST then switches to logic "1" for enabling the stops matrix.

Continuing with the processing of the binary coded signals identifying the actuated piston, it has been noted that the timing signal 4PCIN initiates the three bit times at the end of the piston mode cycle, as shown in FIG. 5B, in which this piston information is transferred to suitable storage means. Further, it will be recalled that each line of the piston matrix corresponds to one of the divisions or the generals and that, in addition, the divisions and each of the generals is assigned to a corresponding shift register chip. The noted storage means for the piston identification information are provided both in the control chip for identification of the shift register chip to be selected, and in the shift register chips for identification of the piston. The storage means are actuated in response to decoding, or gating circuit, responsive to the count output of the eight state binary counter 390 of FIG. 16 which identifies the line of the piston matrix then being scanned which resulted in the production of a piston recognition signal 4ANYL.

In particular, in FIG. 18 are shown the decoding circuits on the control chip which serve to select the shift register chips for the divisions or the generals corresponding to the identification of the piston that has been detected. For example, in FIG. 18A, AND gate 450 receives a timing input Tc from the eight state binary counter 390, the 4ANYL input and the 4PCIN input and when enabled thereby, sets the 4CH2 flip-flop which in turn produces, through an associated driver, the output condition 25CHB1. By virtue of the count of counter 390 at which the piston actuation is recognized, therefore, and in accordance with the decoding functions of the AND gates such as 450, setting of the associated flip-flops 4CH2, 4CH3, 4DVB2 and 4DVB4 thus serves to select the appropriate shift register chip. For example, and as summarized in the table of FIG. 18E, the 4CH2 flip-flop of FIG. 18A producing the 25CHB1 output identifies the piston actuated as relating to the general 1 and thus the general 1 chip is selected. Similarly, 25CHB2 selects general 2 chip, and the absence of either of 25CHB1 and 2 selects the divisional chip, with 4DVB2 and 4 identifying the division as 1, 2, 3 or 4. The table of FIG. 18E also notes 27RC1, 2, and 3 in relation to the chip selection, these values providing further the identification of the piston of each division and general. It will be recalled that these signals are generated in FIG. 17.

In general, therefore, the systems of FIGS. 17 and 18 respond to the scanning operation to identify an actuated piston, to store a binary coded output 27RC1, 2, and 3 to identify which of six pistons was pushed, and by virtue of the outputs 25CHB1 and 2 and 4DVB2 and 4 to select the chip and the division with which that piston is associated. This information then is employed in the shift register chips to provide gating for entry of stop information into appropriate shift registers or read out therefrom to set up stops in a play operation.

To conclude on the operation of transferring the piston identification information into storage during the defined interval previously discussed, reference is now made to the select logic provided in each shift register chip and indicated in FIG. 25A. Adjacent FIG. 25A is a table of FIG. 25B identifying the shift registers of the chip in accordance with 27RC1, 2 and 3 and indicating the logic conditions of the flip-flops 642, 644, and 646 of FIG. 25A which result in response to those input signals 27RC1, 2, and 3 for storing the identification of the pistons P1 to P6 and thus the corresponding shift registers 1 through 6 of the chip.

A detailed discussion of the storage circuits of FIG. 25A is postponed until the shift register chips themselves are discussed. It suffices here, however, to note that the 27PST signal is supplied to each of the storage circuits 642, 644, and 646 and, particularly, as illustrated for the circuit 642 as an input to AND gate 658 in the recirculation loop of that storage circuit. In addition, the signal 3PST derived from 27PST through inverter 640 is applied to AND gate 650 at the set input of the storage circuit. 27PST and 3PST serve to lock the identification of the piston in the noted storage circuits. When a piston is identified, the time relationship of 3PST and 27PST causes the recirculation loop to be cleared in accordance with 27PST returning to logic "0" for the piston mode from logic "1" during the stop mode and for a brief interval 3PST becomes logic "1" to gate in the new identification in accordance with 27RC1, 2, and 3. As soon as a piston is identified, 27PST again becomes logic "1" and 3PST, logic "0," since the stop mode is now entered, and thus the identification is locked into the storage circuits 642, 644, and 646.

As previously noted, the counting chain of FIG. 16 provides for two different cycling times of the eight stage binary counter 390 in accordance with the piston mode and the stop mode. Particularly, the piston mode time is 125 $\mu$sec. and thus a 1 msec. recycle time. In the stop mode, however, the counter 390 counts at an 80 msec. rate and thus has a recycle time of 640 msec. The foregoing discussion now provides the background to appreciate the manner in which the counter 390 is switched between these two count rates.

Referring again to FIG. 16, decoder 351 includes an NAND gate decoding the outputs from the counter 350 and producing 2GX1. Inverter 351*a* supplies 4GX1 to the 16 state counter 352. However, inverter 351*b* supplies 4GX11 to AND gate 381 in the gate 380 at the input to the counter 390. AND gate 381 also receives 1PST2 from the output of inverter 428 in FIG. 17 and 1CWRD from the 4CWRD flip-flop of FIG. 15D. 1CWRD is the inverse of 4CWRD and thus in the card mode is logic "0," disabling the AND gate 381. However, in the manual mode with which we are presently concerned, 1CWRD is logic "1." The input 1PST2 is the inverse of 4PST2 and thus is a logic "1" in the piston mode. AND gate 381 is thus enabled in the piston mode to supply 4GX11 through the NOR gate 382 and NAND gate 383 to produce 4G3 for controlling the count rate of counter 390. In the piston mode, therefore, 4G3 is generated for each recirculation of the 10 state polynomial counter and thus at the 125 $\mu$sec. rate, causing it to advance one count for each 125 $\mu$sec.

When the system switches to the stop mode, 1PST2 becomes logic "0," AND gate 381 is disabled and the signals for driving the binary counter 390 are produced through the decoder 362 and the gates 384 through 387 connected to the second input of NOR gate 382. Here, in the stop mode, 4PST2 derived from FIG. 17 is logic "1" and 4LCX, to be described, is also logic "1" whereby AND gate 384 is enabled and the output gated through OR gate 386 to enable AND gate 387 which then supplies the output from decoder 362 to OR gate 383 for driving the counter 390. The decoded output from decoder 362 is the full count, or recycle count output, of the 40 state polynominal counter 360. 4G3 at this time thus comprises a pulse train having an 80 msec. pulse repetition rate for driving counter 390 in the stop mode.

Returning now to FIG. 17, it will be recalled that in the piston mode the 27RC1, 2 and 3 outputs are derived from the conditions of flip-flops 4SRB1, 2, and 3 through the AND gates 435, 436, and 437, respectively. When 27PST is generated, however, and 3SRAD thereupon becomes logic "0," those AND gates are disabled. Conversely, AND gates 440, 441 and 442 previously disabled by 2SRAD are now enabled. The three outputs of the eight state binary counter 390 are supplied to the second inputs of the AND gates 440, 441 and 442 which now produce, through the associated NOR gates and drivers, the outputs 27RC1, 2, and 3.

Referring again, now, to the stops matrix of FIG. 9 and the decoder of FIG. 11A, it will be appreciated that the inputs 27RC1, 2, and 3 to the decoder are changing at the 80 msec. rate for addressing lines SP1 through SP8 of the matrix. Further, 27PST is now logic "1" producing a stops enable output for receiving the outputs from the vertical lines of the stops matrix and particularly P1 through P10. The processing of the information derived from the stops matrix comprising 10 parallel bits will now be explained.

Figure 19:
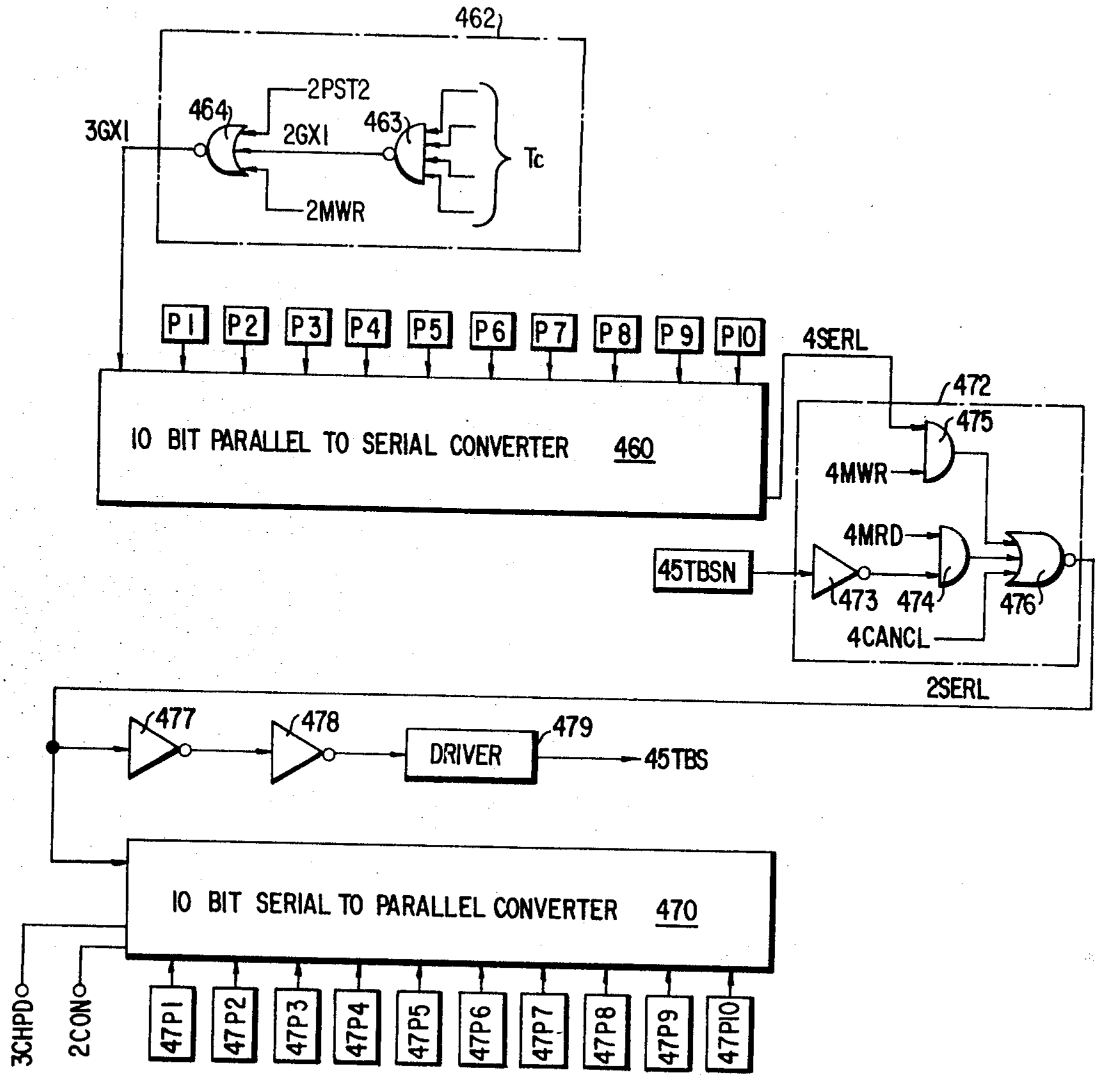
FIG. 19 is a more detailed logic block diagram of the parallel to serial converter and the serial to parallel converter as shown in FIG. 2, and associated gating circuitry.

In FIG. 19 are shown a 10 bit parallel to serial converter 460 and a 10 bit serial to parallel converter 470, each of which may be of conventional circuit configuration and thus is shown only in a block diagram. The converter 460 receives the 10 bit parallel input P1 through P10 from the output lines of the matrix 136 during the stops mode and as a result of the stops enable control. Input gate 462 produces the output 3GX1 during the 10th bit time of each stop mode cycle, and is of a duration of one bit time. Here, the cycle is now 80 msec., and the bit time is 12.5 $\mu$sec., as shown by the internal timing pulse 4GC000 in FIG. 6B. Thus, 3GX1 causes the inputs P1 through P10 to be gated in parallel into the corresponding stages of the converter 460. The converter 460 then responds to the internal clock of the control chip at the bit time rate of 12.5 $\mu$sec. to shift the 10 bit parallel information out of the converter and simultaneously clear the stages of the converter in succession during the shifting, producing the 10 bit serial output 4SERL.

Generation of the 3GX1 output of gate 462 is produced in response to both timing and control functions. Particularly, NAND gate 463 responds to selected time coded inputs Tc derived from the counting chain to produce the output 2GX1 supplied as an input to NOR gate 464, also receiving the inputs 2PST2 and 2MWR. The 2PST2 input is derived from the 4PST2 flip-flop in FIG. 17. It will be appreciated that 2MWR identifies the set operation in the manual mode and 2PST2, the stops mode as against the piston mode during the set operation, to produce 3GX1 only when the data of P1–P10 is to be entered from the stops matrix into the parallel to serial converter 460. The signal 2MWR is the output of the NAND gate in FIG. 15G receiving 4CWR, 1CRD, and 1CWRD as well as the control signal 4MON from the 4MON flip-flop. The 4MON flip-flop of FIG. 15G will now be considered.

The 4MON flip-flop is connected at its set terminal to the output of AND gate 340, receiving at one input 4PST2 and at the other input thereof the output of OR gate 341. OR gate 341 receives as inputs ACTW and 4LCX. 4PST2 is a logic "1" for the stop mode and presents a first enabling input to AND gate 340. ACTW, however, is logic "0." 4LCX is also logic "0" at this time. Thus the 4MON flip-flop is not set and 4MON is a logic "0." During the set operation, the 4CWR flip-flop of FIG. 15B is set and therefore 4CWR is logic "1." 1CWR is the inverse of 4CWR which is logic "1" during cancel and read operations and logic "0" during set operations, and thus 1CRD is logic "1." By a similar analysis, 1CWRD is likewise logic "1." As a result, 2MWR is logic "0." As a result, in FIG. 19, when 2GX1 becomes logic "0," NOR gate 464 produces the 3GX1 output. At other times, NOR gate 464 blocks or is disabled from producing 3GX1 and thus blocks the parallel inputs to the parallel to serial converter 460, thereby preventing any entry of erroneous information.

The 4SERL output of the parallel to serial converter 460 is applied to a further gate 472, the output 2SERL of which is applied to the input of the serial to parallel converter 470. The 2SERL output of gate 472 is applied through inverters 477 and 478 and driver 479 to produce 45TBS comprising the 10 bit serial pulse train of stop bit information supplied to the shift register chips in the manual mode operation. Generally, the convention is that a signal, when "on," is logic "1" and, when "off," is logic "0." 45TBS, however, is reversed and is logic "1" when "off" and logic "0" when "on."

Gate 472 also receives the 10 bit serial stop information derived from the shift registers in the manual mode operation, as the signal input 45TBSN. That signal is supplied through inverter 473 as input 1TBSN to AND gate 474, the other input of which is a signal 4MRD derived from the gating circuit of FIG. 15G. 4SERL and 4MWR are applied to AND gate 475, and the outputs of AND gates 474 and 475, along with 4CANCL are applied to NOR gate 476 to produce the 2SERL output of gate 472.

With reference to FIGS. 15B and 15G, the 4MWR input to gate 475 is the inverse of the 2MWR signal previously described and thus the AND gate 475 is enabled only during the read mode for supplying the 10 bit serial train 4SERL through NAND gate 476 to produce 2SERL and ultimately 45TBS. Conversely, 4MRD applied to AND gate 474 derives from the NAND gate 342 and inverter 343 of FIG. 15G. As contrasted to the AND gate 344 and inverter 345 producing 4MWR, the input to NAND gate 342 is 1CWR, rather than 4CWR. Since 1CWR is the inverse of 4CWR, 4MRD is effectively the inverse of 4MWR in that it is generated during the read operation in the manual mode for enabling AND gate 474. Thus, 45TBSN, inverted to provide 1TBSN, is gated through the enabled AND gate 474 and NAND gate 476 to produce 2SERL as a serial input to the serial to parallel converter 470.

Figure 20:
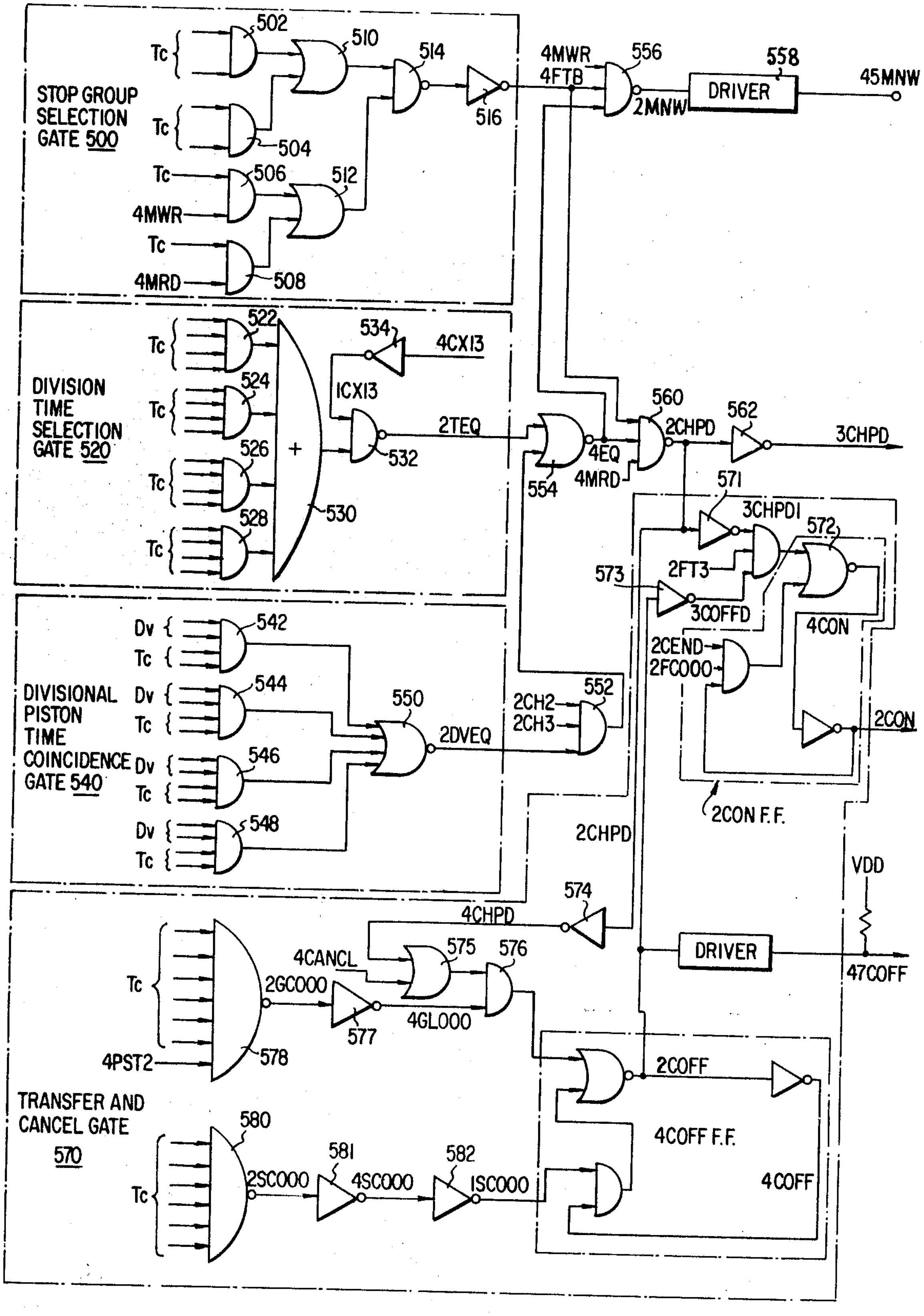
FIG. 20 is a logic block diagram of gating circuits responsive to timing and control functions for controlling various data transfer and stop actuation operations.

Closely associated with the converters 460 and 470 of FIG. 19 is the gating system of FIG. 20. In general, the system of FIG. 20 functions to establish windows of precise bit time duration at specified times in the operating cycles for permitting various transfer functions between the converters and the shift registers as well as between the converters and both the stops matrix and the stops decode relay matrix. Generally, signal 45MNW controls the transfer from the parallel to serial converter to the shift register. 45MNW is logic "0" for establishing an entry operation into the shift register and logic "1" during the operation of deriving an output from the shift registers, and particularly establishes a 10 bit window at the precise time interval for entering the 10 bits of serial information from the parallel to serial converter into the shift register during a set operation.

The signal 3CHPD controls the transfer in the opposite direction, i.e., from the shift register to the serial to parallel converter. 3CHP is produced for each of the specific 10 bit times, as required corresponding to the piston which is pushed, for transferring the proper bit information from the shift registers to the serial to parallel converter 470 and ultimately to the stops relay matrix. Signal 2CON is turned on after 2CHPD ends, and particularly is produced on the sixth count of the transfer cycle, and enables the serial to parallel converter 470 to produce the outputs 47P1 through 47P10. This signal assures that the serial information has been shifted into the converter and is in the proper positions for being shifted out to actuate the stops.

Finally, the signal 47COFF which is a logic "1" in the off state and a logic "0" in the on state, comprises the off-coil control and thus controls the cancel process for resetting the actuated stop relays. 47COFF is also on in response to the cancel command and serves to reset all stops.

The gate circuit 500 producing 4FTB is labelled Stop Group Selection, provides for distinguishing between the first and second groups of 10 stops each, such as are associated with each divisional piston. The circuit also functions for general pistons and in that instance performs the same function of identifying successive groups of 10 stops each, e.g., which may be considered the odd and even lines of the stops matrix, and thus produces successive 10 bit windows for the entire 80 bits of each shift register.

The gate circuit 520, labeled Division Time Selection, functions to divide each shift register into four equal time divisions, and thus a group of 20 stops per time division. This is performed in accordance with the divisional pistons, as each is actuated and recognized. It will be recalled that the four divisions share four successive sections of the six shift registers of the divisional shift register chip. The same time division is effected, however, also for the general chips.

The gate circuit 540 is a time coincidence detection circuit for identifying the division of an actuated divisional piston. As to the divisional pistons, however, the gate 540 assures that transfer functions are performed only in the corresponding bit position sections of the shift register allocated to the pistons of a specific division.

Finally, gate 570, as more fully explained hereinafter, includes timing circuits for producing 2CON following termination of 3CHPD, and particularly is turned on at the sixth count and maintained through the end of the cycle for transferring information from the serial to parallel converter to the stops decode relay matrix.

Returning again to the generation of 45MNW, NAND gate 556 produces logic "0" for 2MNW and thus produces 45MNW through driver 558 only for the condition that each input is logic "1." As will be recalled, 4MWR is logic "1" from the circuit of FIG. 15G in response to an SET command (see FIG. 15A).

The signal 4FTB is logic "1" from gate 500 as produced by inverter 516 when 2FTB is logic "0." NAND gate 514 thus requires logic "1" at each input from the OR gates 510 and 512 and thus a logic "1" from either or both of the AND gates 502 and 504 as well as logic "1" from either or both of the AND gates 506 and 508.

As indicated, AND gate 506 is enabled by 4MWR establishing the ENTER command and the timing signal 4LC000; from FIG. 6G, it will be recalled that 4LC000 defines the 2 msec. interval of FIG. 61 during which the 10 bits of information are read from the parallel to serial converter into the shift register in each 80 msec. cycle of the stop mode. Similarly AND gate 508 receives 4MRD (FIG. 15G), generated when setting preestablished stop combinations upon recognition of a piston actuation, as well as 4GC000. From FIG. 6B, it will be recalled that 4GC000 defines a 2 msec. interval beginning at the 10th msec. of each 80 msec. stop mode cycle, during which transfer from the shift register into the serial to parallel converter is performed.

AND gates 502 and 504 each receives count inputs Tc from the shift register reference counter 352 and from the eight state binary counter 390 to define at their outputs, for the successively addressed lines of the stop matrix, alternating first and second 10 bit intervals in each of the four groups of 20 bit intervals of the shift registers.

As a result, depending on whether the command is to enter information into the shift register, or, alternatively, to read from the shift register, 4FTB is generated during the last 2 msecs., or for the 2 msecs. beginning at the 10th msec., of the 80 msec. stop mode cycle; further, depending upon whether an odd or even matrix line is being addressed, 4FTB generates an earlier or later 10 bit window to select the first or second 10 bit positions in each of the four groups of 20 bit pistons of each shift register corresponding to the four time divisions.

The Division Time Selection gate 520, in cooperation with NOR gate 554 must produce a logic "1" value of 4EQ for effecting production of 45MNW. This implies a logic "0" for the 2TEQ output of the gate 520. Thus, the inputs to NOR gate 532 must both be logic "1," which therefore must be satisfied by the timing function input 1CX13 from inverter 534 or by the output of OR gate 530.

From the table of FIG. 16A, it will be appreciated that 4CX13 is logic "0" for the entire interval of eight transfer cycles for the groups of 10 stops and is logic "1" during the second millisecond of the transfer cycle to disable NAND gate 532 and prevent extraneous signals being gated through the NAND gate 532. Correspondingly, 1CX13 is logic "1" and logic "0," satisfying the enabling requirement for NAND 532. Thus 2TEQ is a logic "0" or false for each of the divisions in the appropriate 20 windows of 1 msec. each, and for four groups of 20 such windows for the generals in the successive 80 msec. stop mode cycles.

Thus, gate 520 serves to relate the 80 stops of each shift register—whether assigned to divisions or generals—into four sections or divisions. Each of the AND gates 522, 524, 526 and 528 therefore, receives inputs Tc from the eight state binary counter 390 and from the shift register reference counter 352. Thus, based on the matrix line of the stop matrix being addressed, and during the interval when the 10 bits of the corresponding section of the shift register are recirculated in the external path, these AND gates serve to produce, in succession, windows of the required bit lengths.

As thus far explained, it will therefore be appreciated that 4FTB and 4EQ are combined in NAND gate 556 in accordance with the ENTER command of MWR to produce, during the 2 msec. interval of 4LC000, the 10 bit window 45MNW.

45MNW is thus produced when the 10 bit positions of a shift register that are recirculating in the external path correspond to the 10 bits in the parallel to serial converter 460 (producing 4SERL) which are to be entered therein; those 10 bits, furthermore, correspond to the 10 bits P1 through P10 derived from the horizontal line of the stop matrix currently being addressed. It will further be understood that this 10 bit window is generated in each of the eight 80 msec. cycles of the stop mode, as thus far explained.

Whereas the foregoing explains the case of general pistons, divisional pistons control only 20 bits and thus the signal 45 MNW is only to be generated in two of the 80 msec. cycles (i.e., 10 bits each). This function is achieved by gate 540. Gate 540 includes OR gate 552 which, for generation of either 45MNW or 3CHPD, must produce logic "0" at its output. OR gate 552 receives 2CH2 and 2CH3 which, from FIGS. 18A and 18B, are normally logic "1" in the absence of a general piston being actuated.

2DVEQ must therefore be logic "0" to produce a window in the case of a divisional piston actuation. If a general piston is actuated, one of 2CH2 and 2CH3 becomes logic "0" and accordingly the output OR gate 552 is logic "0" for the entire eight cycles. If no division or general piston is actuated, no transfer functions are to be performed and, appropriately, the output of OR gate 552 is logic "1" and no windows are generated.

Considering further the divisional piston actuation, however, each of AND gates 542, 544, 546 and 548 receives inputs labeled DV and derived from the divisional piston recognition circuits of FIGS. 18C and 18D for enabling the NOR gate 550 when an actuated piston is identified as a divisional piston. Then, during the stop mode, the inputs Tc derived from eight state binary counter 390 complete enabling of the associated AND gates, in accordance with addressing either of the lines of the stops matrix which correspond to the respective divisional pistons. Thus, NOR gate 550 produces logic "0" for the signal 2DVEQ during each of the two 80 msec. intervals in which two adjacent horizontal lines of the stops matrix associated with an actuated divisional piston are successively addressed.

The generation of 3CHPD is then readily understood. Particularly, NAND gate 560, when receiving the command 4MRD and further the enabling inputs 4EQ and 4FTB, generates logic "0" for 2CHPD and, through inverter 562, logic "1" as the signal 3CHPD. Thus, 3CHPD is logic "1" for the appropriate 10 bit window in which 10 serial bits are read out from the shift register and transferred into the serial to parallel converter 470. That input, as will be recalled, is 2SERL derived from gate 472 and, particularly, in response to command 4MRD applied to AND gate 474 in FIG. 19.

Finally, gate 570 produces 2CON when the correspondingly labelled flip-flop 2CON is set. This is achieved by 2CHPD through inverter 571, producing 3CHPD1 at AND gate 572. 2FTB is derived from gate 500, as shown therein, and 3COFFD is produced by inverter 573 from the flip-flop 4COFF. 2CHPD is also applied through inverter 574 as 4CHPD to OR gate 575. OR gate 575 also receives 4CANCL and supplies an input to AND gate 576 for setting 4COFF. AND gate 576 is enabled by either of the inputs to OR gate 575 when the timing input 4GC000 is generated. From FIG. 6B, it is recalled that 4GC000 is generated at the 10th msec. of each 80 msec. stop mode cycle. In particular, 4GC000 is produced by NAND gate 578 and inverter 577, the latter receiving inputs Tc from the 10 state polynomial counter 350 as well as the signal 4PST2 identifying the stop mode.

Flip-flop 2CON thus is set at the sixth count during the transfer function from the shift registers and is reset when both 2FC000, comprising the initiation of a second 80 msec. stop cycle (see FIG. 6B) and the reset signal 2CEND (from FIG. 15F) are received.

Finally, the 4COFF flip-flop is set at the 10 msec. position by 4GC000 in either the cancel operation or the transfer operation (by the inputs to OR gate 575) and remains set until the 40th msec. in accordance with 4SC000, as provided by the time decode NAND gate 580 and inverters 581 and 582, to provide the 30 msec. reset interval of 47COFF of FIG. 6D.

Associated with the gating circuits of FIG. 20 is a power latching circuit shown at 730 in FIG. 26. The circuit 730 is included in FIG. 26 since it shares a common power driver 726 through OR gate 724 with the output 2DEISR of the timing circuit of FIG. 26 to be discussed. The common output 45DESR of driver 726 has dual, mutually independent roles. The present consideration is its use in conjunction with the stops power signal 4PWRSW (45DESR) discussed also in connection with the stops relay decode matrix in FIG. 13, as well as regarding the power control circuits 119 and 141 in FIG. 2. Its other function arises in the card mode, in accordance with the timing and control functions of other portions of FIG. 26.

More specifically, the power control latching circuit 730 is responsive to various time coded inputs received through gates 732 and 733, as well as the inputs 4CANCL and 4MRD at OR gate 734, and which are combined at gate 735 with the timing function of gate 733 for controlling NOR gate 736 to establish 2PWRSW. Inverter 737 responds thereto to supply 4PWRSW to AND gate 733 and thus establish a latching function. With reference to FIG. 15G, 4MRD is generated when the system is in the manual mode as represented by one of the conditions 1CWR, 1CRD, or 1CWRD obtaining, as well as in being in the cancel mode as represented by 4MON obtaining. Conversely, 4CANCL is produced when the conditions 1CWR, 4CRD, and 1CWRD do not obtain.

Thus, the system 730 produces 2PWRSW and thus 4PWRSW (47DESR) in accordance with 4FC000 and 4SC000, and reset with 1GC000 and 1C0024, the latter comprising the complements of 4GC000 and 4C0024, as shown in FIG. 6B. As a result, the wave form 4PWRSW (47DESR) as shown in FIG. 6F, is produced.

SHIFT REGISTER OPERATION: MANUAL MODE

In accordance with the foregoing, there has been described the source of timing controls for synchronizing and coordinating the operation of the entire system in the manual mode. Prior to considering the controls generated for the card mode, there will next be considered the completion of the manual mode including selection of shift registers and the transfer of data into and out of the shift registers in the manual mode. As previously noted, the output signals 25CBH1 and 25CBH2 of FIGS. 18A and 18B identify the generals 1 and 2 chips, and in the absence of both thereof, the divisional chip. The shift register chips also include select logic responsive to 25CHB1 and 25CHB2 (note also in FIG. 18), and particularly as shown in FIG. 21A, the table of FIG. 21B identifying the logic combinations for the select operation in each shift register chip. CHBO, as shown in the table, is VDD, comprising the power source level of the system. Selection of the divisional chip corresponds to logic "0" for each of 25CBH1 and 25CBH2, whereas generals 1 and 2 are selected by 25CBH1 and 25CBH2, respectively. CBHO is provided for each of the division and the generals 1 and 2 chips. As shown in FIG. 21A, the CHBO signal is inverted by inverter 600 to produce 3CHBO. 3CHBO, 25CHB1 and 25CHB2 are combined in a logic NOR gate 602 to produce 4CKTA which thus distinguishes a division as against generals chips.

FIG. 22 comprises diagrams of logic circuits provided in the shift register chips and which are responsive to the 45MNW and 45TBS signals derived from the control chip as aforedescribed. Each of the logic circuits 604 and 606 comprises inverter elements, as indicated, for producing the time delayed sequence of signals related to the noted inputs, as there identified, each inverter introducing approximately one-half a bit time delay. Again, the 45MNW signal is a logic "0" during the entry operations for entering data into the shift registers and a logic "1" for withdrawing data, or reading out from the shift registers and maintaining the recirculation thereof. These derived logic signals are utilized in the control gates of the shift registers as later explained.

In FIG. 23 is shown a block diagram of a further logic circuit utilized in the manual mode with the shift registers. This circuit includes an inverter 608 responsive to the 4CKTA output to produce 2CKTA which disables driver 610. NAND gate 612 responds to both 4CKTA and 4SHRG, which is the common output of the shift registers as later described, to produce 2SERG and, through driver 610, 45TBSN. As discussed in FIG. 19, 45TBSN is the serial output from the shift registers supplied through gate 472 to the serial to parallel converter 470. The function of the logic circuit of FIG. 23 thus is to enable the gating of the shift register outputs from the correct one of the division and generals chips in accordance with 4CKTA and to supply that serial output to the control chip.

Figure 24:
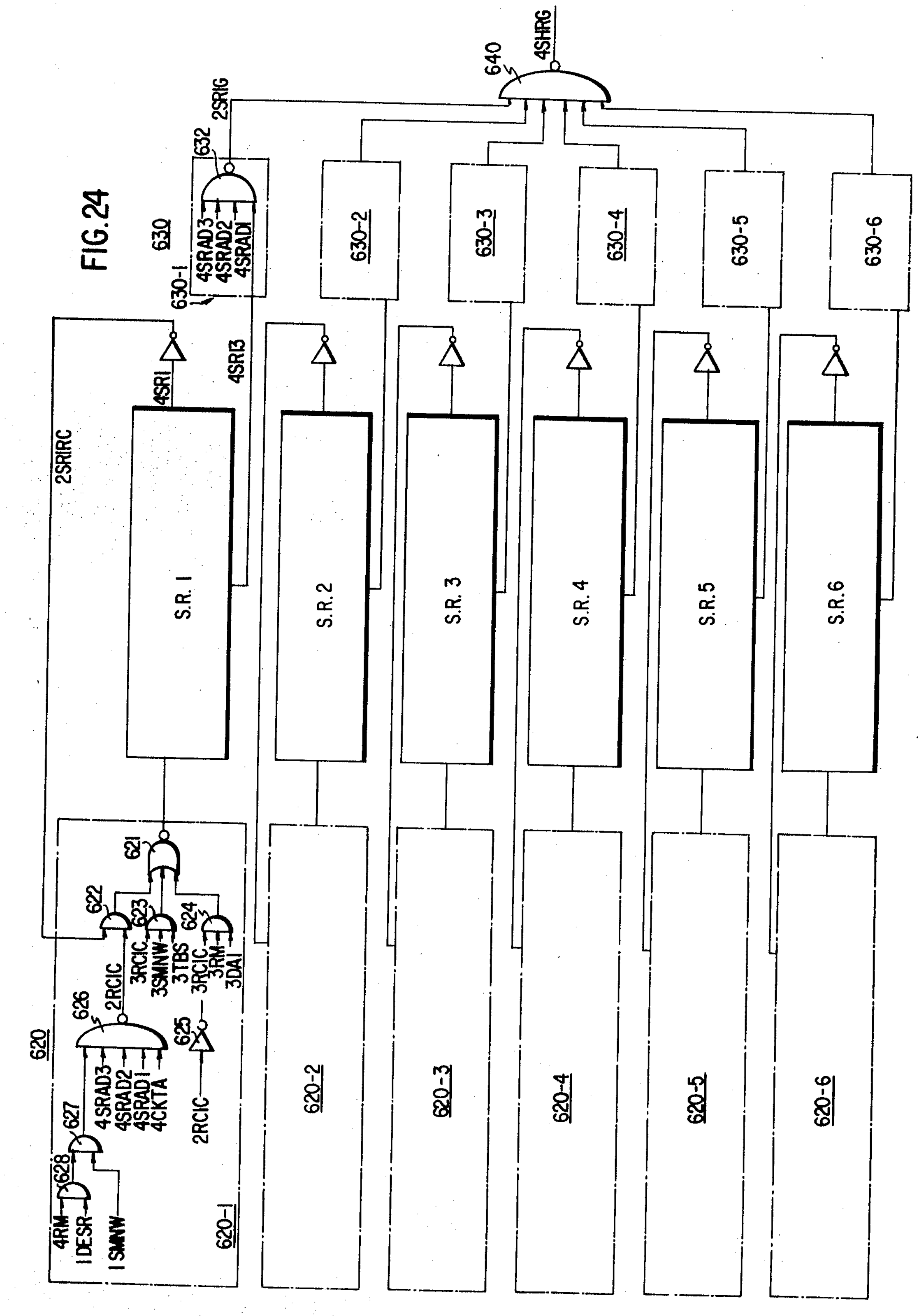
FIG. 24 is a block diagram of the shift registers and associated input and output gates of the shift register chips.

In FIG. 24 is shown the arrangement of the shift registers and the control gating therefor. Again, the shift registers are considered first in the manual mode.

Each of the division and generals shift registers chips includes six shift registers, indicated in FIG. 1 as SR1 through SR6. EAch of these is identical, and of conventional construction, and thus only one is shown in illustrative detail. Further, each shift register includes an input gating system 620 (shown as 620-1 to 620-6) and an output gating system 630 (shown as 630-1 to 630-6), and which are identical for the six shift registers in circuit configuration. Detailed indications of the inputs to the gates 620 and 630 are indicated only for shift register 1 and accordingly it will be understood that the appropriate modifications of the coded gating inputs serve to control operation of the respectively corresponding, remaining ones of the shift registers. The outputs of the gate 630 from each of the shift registers are combined in NAND gate 640 to produce 4SHRG, previously noted in FIG. 23 as producing 45TBSN supplied to the control circuit.

The shift registers are of the continuously recirculating type and are clocked by the internal clock of the chip to effect recirculation on a 1 msec. rate. Each sift register contains 80 bit positions, corresponding to the 80 stops. In the case of a division chip, the 80 bits are defined in groups of 20 and in a generals chip, the entire 80 stops are controlled by a single piston, as shown in the table of FIGS. 3A to 3D.

The logic inputs to the gate 620 for selecting a given one of the six shift registers on a chip, as well as the logic inputs to the output gate 630 for enabling the output gating of information from the shift register are derived in part form the shift register select logic of FIG. 25A, the table of FIG. 25B serving to relate the logic signals producing the selection of the six shift registers. The logic of FIG. 25A was previously discussed and is now considered in more detail. From FIG. 17, it will be recalled that 27PST is a logic "0" for the piston mode and a logic "1" for the stop mode. In FIG. 25A, 27PST is inverted by inverter 640 to produce 3PST. The three bit binary piston and stop count signals 27RC1, 27RC2, and 27RC3, discussed in FIG. 17, are supplied to three identical logic gates 642, 644, and 646, the outputs of which are combined in NAND gate 648 to produce 4CSRAD. The gates 642, 644, and 646 are identical and reference is made to the gate 642 for a brief description. 27RC3 is supplied to AND gate 650 which also receives 3PST, the converse of 27PST. When 3PST is logic "1" corresponding to 27PST being logic "0," the piston mode is identified and AND gate 650 is enabled to pass when present. NOR gate responds to the output of AND gate 650 to produce 4SRAD3; 4SRAD3 is supplied to NAND gates 654 and 656, the latter having their inputs coupled to operate effectively as inverters and respectively produce 1SRAD2 and 2SRAD3. 2SRAD3 is supplied through the recirculating loop to one input of AND gate 658, the output of the latter being applied to the second input of NOR gate 652. Gates 652, 656, and 658 cooperate to provide a sample and hold circuit and thus, in the piston mode, the gates 642, 644 and 646 respond to the 27RC3, 27RC2, and 27RC1 inputs to store the logic coding for shift register selection within the chip during the ensuing stops mode. The cooperation of 27PST and 3PST in locking the piston identification, and thus the shift register identification, in the storage circuits 642, 644, and 646 was previously discussed.

Referring again to FIG. 24 and particularly the gates 620 and 630, the 4SR1C input to shift register 1 produced by gating system 620 is derived from NOR gate 621 as a combined function of outputs of AND gates 622, 623, and 624. AND gate 622 receives 2SR1RC, the inverted form of the output of shift register 1 and supplies it through NOR gate 621 in accordance with the recirculation of the shift register. AND gate 623 receives 3SMNW derived from 45MNW in FIG. 22 and comprising logic "0" for writing into the shift register and logic "1" for read and recirculate of the shift register. 3RC1C is the inverted form of the 2RC1C signal to be explained, and 3TBS comprises the multiple inverted and delayed output of the chain of inverters 606 in FIG. 22 responsive to the 45TBS serial output from the parallel to serial converter 460 of FIG. 19. 3TBS thus comprises the 10 bits of information to be entered into the shift register in the appropriate window, when defined. AND gate 624 is used in the card mode and will be explained later.

NAND gate 626 receives selected ones of the signal conditions produced in the select logic of FIG. 25A to effect selection of the shift registers in accordance with the logic states as identified in the table of FIG. 25B. Particularly, these inputs are 4SRAD1, 4SRAD2, and 4SRAD3. In addition, NAND gate 626 receives 4CKTA in accordance with selection of a general or division chip to correspondingly enable or disable the gate. A further input to NAND gate 626 comprises the output of OR gate 627, which in turn receives as inputs 1SMNW produced by inverting 45MNW in the inverter chain 604 in FIG. 22, and the output of AND gate 628.

Thus, in the manual mode, 1SMNW is supplied through OR gate 627 to AND gate 626 and correspondingly enables or disables the latter to in turn enable AND gate 622 for the recirculation and read functions, or disables the latter for the write or entry function. In the entry operation, therefore, the shift register, here SR1, is selected in accordance with the inputs to NAND gate 626; and further, AND gate 623 is enabled in accordance with 3SMNW for the entry function, and thus the 10 serial bits of data are entered as the signal 4SR1C.

As previously discussed in FIG. 20, of course, the serial output gating of 45TBS is performed in the correct 10 bit window in accordance with 45MNW and 3SMNW whereby the 10 bits are entered into the corresponding 10 bit positions of the shift register in its recirculation cycle.

Output gating system 630 comprises a single NAND gate 632 receiving the signal 4SR13 comprising the immediate output of the shift register, and various shift register select signals from the shift register select logic of FIG. 25A. Particularly, NAND 632 receives 4SRAD1, 4SRAD2, and 4SRAD3 for this selection function, corresponding exactly, of course, to those same select signals applied to NAND 626 in the input gate 620. The NAND gate 632 is thus enabled to pass 4SR1G as the signal 2SR1G to the common NAND gate 640. NAND gate 640 then produces 4SHRG as above described, as the common serial output of the six shift registers. Thus, 10 bits at a time are derived as the signal 4SHRG for gating through the circuit of FIG. 23 to produce the 10 bit serial train 45TBSN. As previously described, 45TBSN is supplied to the serial to parallel converter and ultimately gated as the 10 parallel bits 47P1–47P10 to the stops decode relay matrix for setting the thus identified preselected combination of stops.

CARD MODE

To briefly review, the card mode is established either for a write operation in which information is transfered from the shift registers and recorded on the card, or for a read operation in which information is read from the card and entered into the shift register. With reference to FIG. 15A, the RECORD command establishes the condition CWRD to be true, and thus a logic "1." The RECORD command also renders the condition CRD true. By contrast, actuation of the ENTER control establishes the conditions CWRD and CWR to be true. Note that the flip-flops of FIGS. 15B, 15C, and 15D are set in response to these conditions to maintain signals indicative of these commands, and particularly, 4CWRD for the card mode generally, in FIG. 15D, 4CWR for the read operation in FIG. 15B, and 4CRD for the record operation in FIG. 15C.

Before considering the response of the card reader mode logic to these input controls, reference will first be made to various logic control and timing functions provided in the control chip which are called into operation in the card mode.

With reference to FIG. 26, there will first be considered the generation of the signal 4DEISR and also 45DESR which establishes a one bit window approximately every millisecond for reading out a bit of information from a shift register for supply to a card reader output logic circuit, and generates a strobe pulse synchronized with that window for timing purposes, including recording of the strobe track on the magnetic card. It is noted that 45DESR is logic "0" when on and logic "1" when off.

NAND gate 700 receives a plurality of inputs Tc including inputs derived from the 16 state binary counter 352 of FIG. 16, which, as previously noted, is the shift register reference counter. The count coded Tc inputs to the NAND gate 700 are decoded thereby to produce 2D80 which is inverted to produce 4D80 at the input to NAND gate 702. 4D80 corresponds to the last bit position of the shift register prior to a new cycle of recirculation, and to the next to last count of the 81 state counter 712 which is employed to effect the progression for read out off and entry into the shift registers.

The other inputs to NAND gate 702 include 4CWRD derived from the corresponding flip-flop of FIG. 15D in response to the command CWRD establishing the card mode of operation, as well as an input from OR gate 704 and an input from a sample and hold circuit or flip-flop 708. The inputs to OR gate 704 includes input 4CWR and the output of AND gate 706 having inputs 4CRD and 4ACTW. The function of these inputs will be explained later.

In the card mode, and for the record function 4CWRD is provided to NAND 702, and 4CRD is provided to AND gate 706. When the card reader is up to speed, at approximately 150 to 200 msec. following initiation of the card mode, (i.e., after 4CWRD), 4ACTW is generated as previously discussed, and AND gate 706 is enabled, producing an output to OR gate 704 and thereby supplying a third input to NAND gate 702.

The output 2RSI of NAND 702 is normally logic "1," but when the aforedescribed input conditions to NAND gate 702 obtain, the output 2SR1 is produced as logic "0." Sample and hold circuit 708 is normally producing 4RSC1 at logic "0" and thus inverter 708 normally supplies 1RSC1 as logic "1" to the NAND gate 702. Inverter 709 responds to 1RSC1 to normally supply 2ICT00 as logic "1" NAND 702. Thus 4ICT00 from NAND 710 is normally logic "1," maintaining counter 712 disabled.

When 2RS1 becomes logic "0," therefore 4ICT00 becomes logic "0" and enables the 81 state counter 712 to initiate counting. Circuit 708 responds to 2RS1 at logic "0" to produce a set condition to which 1RSC1 now becomes logic "0," disabling NAND 702 and whereby 2RS1 again becomes logic "1." Circuit 708 remains thus set until the 1CEND reset signal is received, and correspondingly NAND 710 remains disabled so that the 81 state counter 712 continues operation until reset takes place.

It will be understood that the shift registers recirculate at 1 msec., but that the interval established by the reference counter 352 is 2 msec. and thus the next bit received can be accepted without disturbing the synchronized operation. In fact, the eight state counter 390 which is at this time addressing the shift registers in succession is reset by 2RS1 through the reset circuit 370 in FIG. 16.

NAND gate 714 receives selected outputs of the 81 state counter 712 to produce an output 2C80 supplied to an inverter chain 715*a*–715*c* providing, as indicated, by its delay function, 4C80, 4C81 corresponding to the 81st count, and 4C82 corresponding to effectively an 82nd count of counter 712. 4C80 is combined with 4ACTW and 4CRD, which at this point has already been established in AND gate 716, to produce an output which corresponds to issuance of a command to write, or record onto the card, The output of AND gate 716 is supplied to NOR gate 718, thereby producing logic "0" for 2SEISR at its output and, through inverter 720, the output 4DEISR as logic "1" and through a further inverter 722, the output 1DEISR as logic "0."

The 2DEISR output if further supplied through OR gate 724 and through driver 726 to produce the output 45DESR as logic "0," corresponding to its "on" state.

The circuit of FIG. 26 also participates in the timing and synchronization functions for reading from the cards and entering data into the shift register, again in the card mode. In this operation, the input 4CRD to AND gate 706 does not obtain, but rather 4CWR to OR gate 704 is established.

When OR gate 704 is thus enabled, the same conditions obtain as aforedescribed for generating 2RS1 as logic "0" and ultimately enabling AND gate 710 to release the counter 712. The 712 counter is run as an 80 state counter in synchronism with the shift registers until the first strobe input 4LF1 is received from the card. Proceeding to NAND gate 714, which decodes the count output of counter 712, it will be recalled that AND gate 716 produced an output establishing the condition of recording on the card from the shift register. AND gate 717, on the other hand, when enabled, produces an output commanding entry of a bit of data read from the card into the shift register. The window is produced for a one bit interval during the 81st count in accordance with 4C81 and in timed relationship with the leading edge of the strobe pulse (4LF1) and, of course, for the enter command condition (4CWR). Again, NOR 718 is thereby enabled to produce 2 DEISR for that bit time.

As more fully explained in relation to FIG. 27, if the card reader is proceeding too rapidly with respect to the control circuitry, two strobe pulses can be received in a single cycle of the counter 712, i.e., within a 1 msec. interval. To assure that data is not lost when this occurs, the circuitry of FIG. 27 permits establishing an appropriate window responsive to the leading edge of the second received strobe, identified as 4LF2. In FIG. 26, the 4LF2 input is applied to AND gate 719 along with 4CWR and additionally 4C82 comprising effectively an 82nd count of counter 712. The output of AND gate 719 thus corresponds to that of AND gate 717 but is generated one bit time later to catch the second bit of data from the card when received, with its corresponding strobe, within the 1 msec. interval.

A further counting function is performed in the card mode, briefly alluded to in the earlier discussion of FIG. 16. Particularly, during the card mode, the toggle circuit 395 is rendered operative by the 4CWRD input to NAND gate 396 enabling recirculation in the loop of the circuit 395. The input 4SEISR and its inverted form 1DEISRD cause the output 4 DIV2 to be generated for every other 4DEISR pulse, and thus, through gating circuit 356, to cause the 50 state polynomial counter 360 to respond to only every other 4DEISR pulse. The 40 state counter 360 thus becomes an 80 state counter effectively. Thus, it is assured that 80 bits of information have either been entered into or taken from a given shift register in the card mode when the counter 360 attains its maximum count. At that time of course, the maximum, count is decoded by decoder 362 as 4LC000 to gate 380 and thus to generate 4G3 to advance the eight state binary counter 390 to the next count. At that next count, of course, the next shift register is addressed and the input and output gates put into an enabled condition for processing 80 bits of information in either the enter or record operations of the card mode.

Before considering the response of the card reader logic and the operations obtaining between the card reader and shift registers, certain controls produced from the control ship in the card mode in response to reading of strobe pulses from a card will first be considered with respect to FIG. 27. The strobe pulse input from reading the card is represented at 750 and synchronized at 752 to produce 4STRBF. This signal is supplied through three inverters 753, 754, and 755 to produce the delayed signals 2LF, 3LF and 4LF, as shown. 4LF is thus delayed by approximately one bit from 4STRBF. 4LF and 4STRBF are applied to AND gate 760, and which produces an output in response to the leading edge of a strobe pulse to set the flip-flop 4LF1. 4LF and STRBF are further applied to AND gate 762 which, when enabled by 4LF1, produces an output for setting flip-flop 4LF2. Since each of flip-flops 4LF1 and 4LF2 is reset by 1DESIR, it will be understood that setting of 4LF2 results only when a second strobe, and thus corresponding second bits of data are received from the card during a single cycle of the enter operation in the card mode. This, furthermore, is the result of the card and the control system not always being in perfect synchronization during the reading from the card.

In FIGS. 28A through 28D, FIGS. 29A through 29C, and FIGS. 30A through 30G are shown various logic processing and condition recognition and maintaining circuits utilized in the card mode and which may be included variously on the card reader board and the shift register chips. The circuits of FIG. 28 include various specific condition recognition and mode or operational control function. The circuits of FIG. 29 control the recording function from the shift registers to the cards. Finally, the circuits of FIG. 30 control the operation in transferring data from the card to the shift register.

Figure 28A:
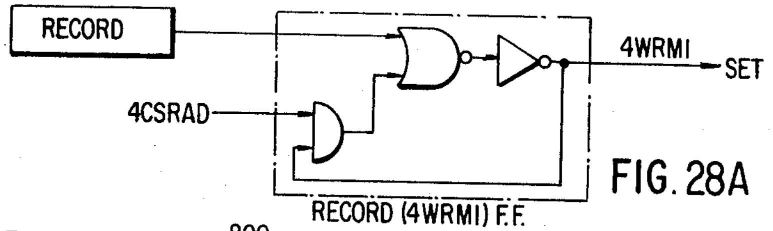
FIGS. 28A through 28D are logic block diagrams of circuits mode responsive to control and command conditions in the card mode.

Considering first the condition controls, FIG. 28A shows the card reader logic circuit for responding to the record operation and thus for causing the transfer of data from the shift register to the card. As previously noted, the RECORD command corresponds to CWRD and CRD of the control chip. The RECORD command sets the record flip-flop 4WRM1 in FIG. 28A, which then maintains the output 4WRM1 at logic "1." These flip-flops are reset by 4CSRAD from FIG. 25A, as previously discussed, when the eight state counter is reset upon completion of the 480 bit transfer function in the card mode.

Figure 28B:
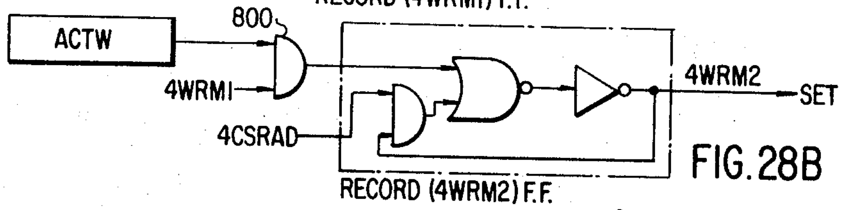

The signal representing that the card reader is up to speed, ACTW, is processed in the logic circuit of FIG. 28B. AND gate 800 receives ACTW and the 4WRM1 output of the record flip-flop of FIG. 28A to provide a set input to the record (4WRM2) flip-flop. When set, 4WRM2 is a logic "1" and establishes the control to effect recording on the card.

Figure 28C:
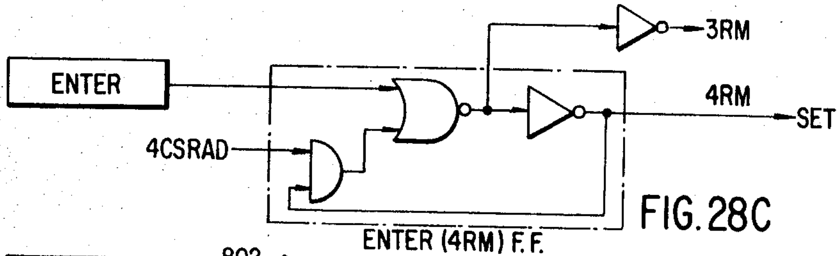

The ENTER command, for reading the data from the card for entry into the shift register, is processed by the logic circuit of FIG. 28C. The ENTER command corresponds to CWRD and CWR in the control chip. The ENTER command sets the 4RM flip-flop to produce the logic "1" output 4RM and, from the circulating path of the flip-flop providing 2RM, and through the associated inverter, a logic "1" output 3RM.

Figure 28D:
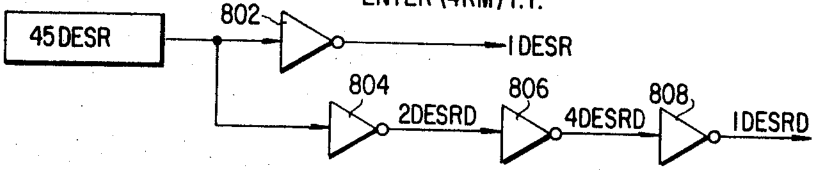

A further general control is afforded by the logic circuit of FIG. 28D which receives the aforedescribed 45DESR signal from the circuit of FIG. 26 in the control chip. As previously noted, 45DESR is logic "0" when on and logic "1" when off. The 45DESR signal is processed by inverter 802 to produce 1DESR and by inverters 804, 806, and 808 to provide the sequence of time delayed signals 2DESR, 4DESRD and 1DESRD, as shown in FIG. 28D.

Figure 29A:
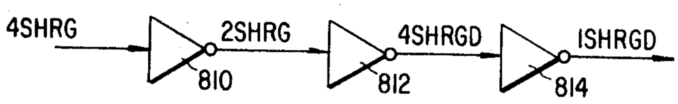
FIGS. 29A through 29C are logic block diagrams of circuits in the card reader mode for recording data on a card of the external memory from the shift registers of the internal memory.
Figure 29B:
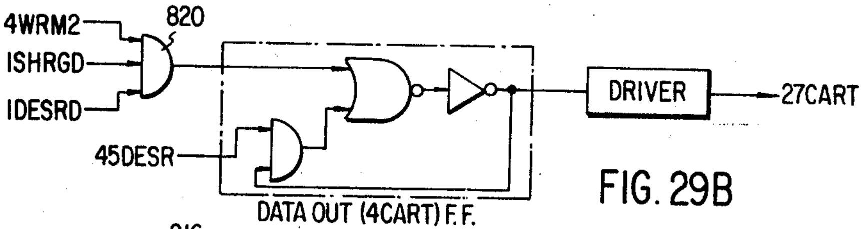
Figure 29C:
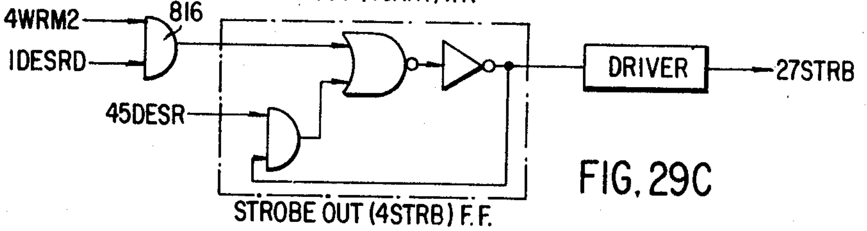

Considering first the record function in relation to FIGS. 29A through 29C, and with respect to the shift registers of FIG. 24, the combined shift register output 4SHRG is processed in FIG. 29A by inverters 810, 812, and 814 to provide the delayed and inverted, corresponding pulse trains 2SHRG, 4SHRGD, and 1SHRGD. The circuit of FIG. 29B comprises the data processing channel including a DATA OUT flip-flop 4CART which is set by and holds one bit of information at a time for recording on the card. There is further shown in FIG. 29C a STROBE OUT flip-flop 4STRB for holding one strobe pulse at a time for recording in the strobe track. Since there are three data tracks but only one strobe track per card, it will be appreciated that only one strobe out flip-flop is required in a given system. Since in MOS technology it is more convenient to reproduce the circuits of FIGS. 29A through 29C identically, it is clear that the circuit of FIG. 29C may be physically provided but not employed in the chips associated with the generals, for example.

Considering first the recording of the strobe channel, and thus FIG. 29C, when the RECORD command is received and the card is up to speed, the signal 4WRM2 is generated from FIGS. 28A and 28B and supplied to AND gate 816 in FIG. 29C at the input to the strobe out flip-flop. That input is maintained and upon further receipt of 45DESR from the control chip, the circuit of FIG. 28D produces, approximately one bit time later, 1DESRD to enable AND gate 816 in FIG. 29C. The output of AND 816 thereby sets the strobe out flip-flop which produces 4STRB and, through a driver, the strobe pulse 27STRB supplied to the read/write head for the strobe track. The next successive 45DESR then resets the strobe out flip-flop 4STRB.

It will be recalled that the data bits are entered into the appropriate tracks of the card in parallel from the corresponding shift registers in accordance with the selection schemes as previously described. Thus, for each shift register chip, and as shown in FIG. 29B, AND gate 820 receives the serial output 1SHRGD from its associated shift register chip and, when the conditions 4WMR2 and 1DESIR obtain, the data output flip-flop (4CART) is set. The output 4CART is then supplied through the associated driver to produce 27CART which is supplied to the read/write head for the associated track of the card. Again, a subsequent 45DESR signal resets the data output flip-flop 4CART.

Figure 30A:
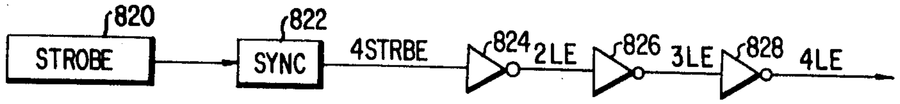
FIGS. 30A through 30G are logic block diagrams of circuits in the card reader mode, including circuits responsive to control and command conditions, for reading data from magnetic card of the external memory for entry into the shift registers of the internal operating memory of the capture combination system of the invention.
Figure 30B:
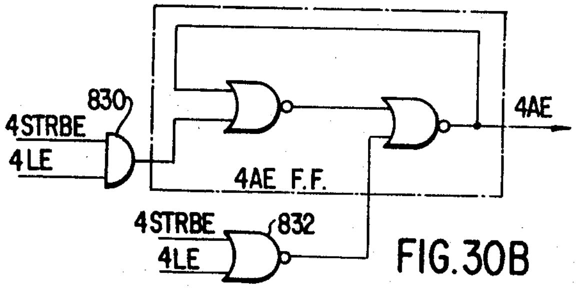

The final basic function in the card mode is that of the ENTER operation, wherein data is read from the cards and entered into the shift registers for the automatic setting of the stop combinations. In the following description it is assumed that a card has previously been recorded with the desired information and a strobe track. In FIG. 30A and corresponding to the circuitry of FIG. 27, the strobe input 820 is processed through synchronizer 822 to produce 45STRBE (corresponding to 45STRBF in the control chip), and which is in turn processed through a series of inverters 824, 826, and 828 to produce inverted and time delayed, corresponding functions, 2LE, 3LE, and 4LE (corresponding to 2LF, 3LF, and 4LF in the control chip).

The synchronized strobe signal 4STRBE and the delayed signal 4LE cooperate to enable AND gate 830 on the leading edge of the strobe pulse to set the 4AE flip-flop, and to enable NOR gate 832 on the trailing edge of the strobe pulse to reset the 4AE flip-flop. Thus, 4AE which is normally logic "0," becomes logic "1" when set, for substantially the duration of the strobe pulse.

Figure 30C:

In FIG. 30C is a logic representation of the synchronized output signals from the data track with which the related group of shift registers is associated, and producing 4TRACK as the output.

Figure 30D:
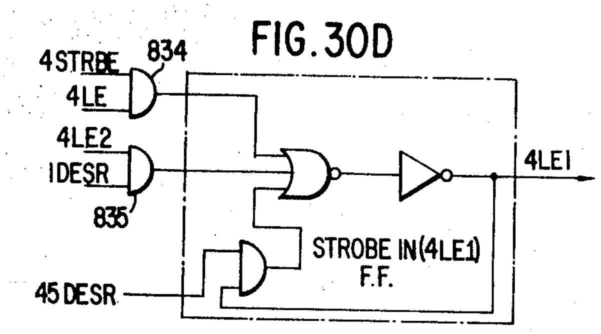
Figure 30F:
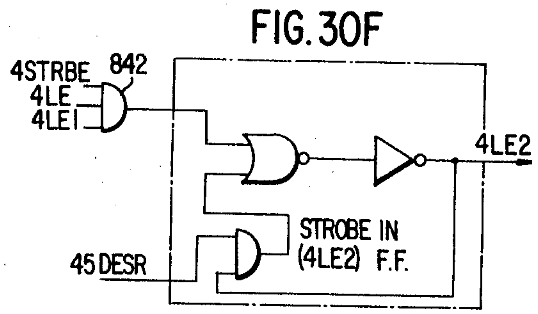
Figure 30E:
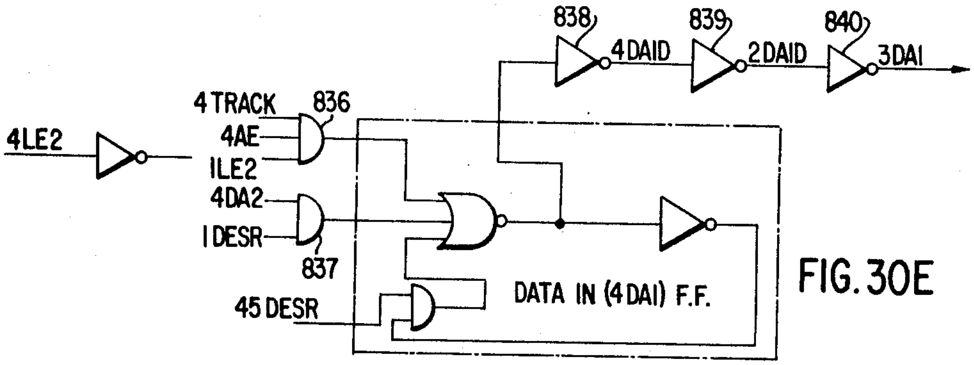

Turning now to FIGS. 30D through 30G, there is shown the logic processing circuits by which outputs comprising both data and strobe pulses derived from reading the cards are held and inserted into the proper bit positions in the recirculating shift register. In FIG. 30D, flip-flop 4LE1 is set by the leading edge of a strobe pulse in accordance with 4STRBE and 4LE being received at AND 834. 45DESR maintains the recirculation loop of the flip-flop as logic "1" when "off," and when subsequently received, becomes logic "0" and this is used to reset the flip-flop 4LE1. 45DESR is used in a similar manner to reset the flip-flops of FIGS. 30E–30G. In FIG. 30E, flip-flop 4DA1 is the data-in flip-flop, and is set upon receipt of a data bit in accordance with 4TRACK and 4AE which is logic "1" during a strobe, and 1LE2 which is normally logic "1," as will be explained 45DESR is again the reset.

Figure 30G:
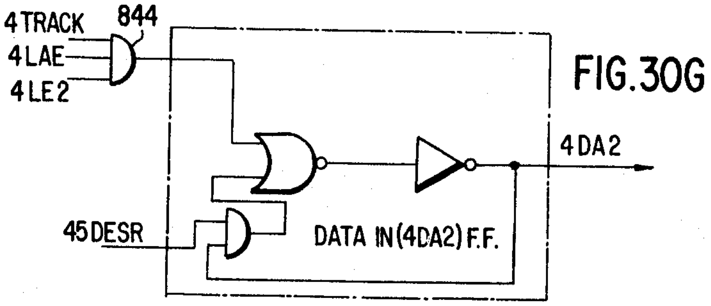

The strobe-in flip-flop 4EL2 in FIG. 30F and data-in flip-flop 4DA1 in FIG. 30G are utilized for the receipt of a second strobe pulse and data bit under the condition that the card reader is not synchronized with the system and is producing a second strobe and data bit within the 1 msec. interval cycle required for inserting bits into the shift registers, as earlier noted in relation to FIG. 27 in the control chip operation. They thus act as back-up storage flip-flops, as will now be explained. Thus, if flip-flop 4LE1 is set, AND 842 is enabled by 4LE1 at logic "1" and the leading edge of a subsequent strobe pulse in accordance with 4LE and 4STRBE produced thereby. 4LE1, of course, normally is at logic "0" and disables AND 842. Reset is again afforded by a subsequent 45DESR. However, 4LE2 is maintained for a brief interval longer, and thus upon 45DESR occurring, which transfer the held bit from the data-in flip-flop 4DA1 to the shift register, 4LE2 and 1DESR (from FIG. 28D) produce a new set input through gate 835 to the strobe in flip-flop 4LE1. The foregoing thus continues in the successive card read out and enter cycles of operation.

Substantially the identical operation occurs in the back-up date-in flip-flop 4DA2 of FIG. 30G. Considering first flip-flop 4DA1, if strobe-in flip-flop 4LE2 is set, 4LE2 is logic "0," and 1LE2 is logic "0," disabling AND 836 from setting 4DA1, but 4LE2 now enables AND 844 to set the 4DA2 flip-flop. A subsequent data bit occurring during a subsequent strobe in that same cycle thus enable AND 844 in accordance with 4AE and 4TRACK, respectively, to set back-up data-in flip-flop 4DA2. Again, on 45DESR, 1DESR and 4DA2 enable AND 837 to gate that held data bit through as a set pulse to set the data in flip-flop 4DA1.

Continuing in FIG. 30E, the 4DA1 condition is logic "1" when set. The outputs utilized in the system which are derived from the data in flip-flop 4DA1, however, are taken from the internal condition 2DA1 through a chain of inverters 838, 839, and 840 which produce the delayed output indications there identified. Of particular significance is the output 3DA1 supplied as an input to AND gate 624 in the gating circuitry 620 at the input of each of the shift registers SR1 through SR6 in FIG. 24. 3DA1 thus comprises the bit which is inserted into the appropriate shift register at the precise bit position of the recirculating shift register bit positions in accordance with the timing windows previously discussed.

With reference to the shift register logic of FIG. 24, the entry of the bit information read from the card into the shift registers is now considered. From FIG. 28C, 4RM established the ENTER command at AND gate 628 which is enabled by 1DESR upon generation of 45DESR in FIG. 28D (Note that 45DESR is logic "0" when "on," and that 1DESR thus affords logic "1" for the entry function to enable AND gate 628.) At AND gate 624, 3RM is also logic "1" identifying the ENTER operation and the bit information is presented at 3DA1. As previously described, the shift register chip selection is defined by 4CKTA and NAND gate 626 and the specific shift register of the six shift registers per chip by the inputs such as 4SRAD1, 4SRAD2, and 4SRAD3 (which, by the coding sequence, are of modified form at the input to the corresponding NAND gates of the gating circuitry for the other shift registers). Thus, having established the entry mode (4RM and 3RM) the specific shift register chip and shift register of that specific chip (NAND gate 626) and the data bit to be entered (3DA1), upon the occurrence of 1DESR which comprises a one bit window, that bit of information 3DA1 is entered into the appropriate bit position of the shift register.

With regard to the one bit window of 1DESR, recall that the circuit of FIG. 26 produces 45DESR for each complete recycling of the 81 state counter and that the counter therefore recycles at the rate of the shift registers plus one bit time. Thus, a progressive entry into the shift registers is provided, in that each occurrence of 1DESR corresponds to the next successive bit position of the register, into which the bit 3DA1 is correspondingly entered. Thus, as the recycling of the 81 state counter 712 continues, the 80 bit positions of the shift register are successively filled with bit information. Further, the counting chain of FIG. 16 advances the eight state binary counter to address the remaining shift registers in succession, and the foregoing entry procedure continues.

After entry of the bit information from the card into the shift registers, the system is immediately available for use in the manual mode in the subsequent playing of the organ.

As is apparent from FIG. 7, each of the record and entry operations in the card mode is completed in less than 1 second of time. The speed with which the system operates may be more fully appreciated if it is realized, furthermore, that each of the record and entry operations requires the processing of 1,440 bits of stop information in accordance with the desired stop combinations afforded by a system of 80 stops controlled by 36 pistons, as herein illustratively described.

Numerous modifications and adaptations of the system of the invention will be apparent to those skilled in the art, and this it is intended by the appended claims to cover all such modifications and adaptations as fall within the true spirit and scope of the invention.

I claim:

1. In a capture combination system having a plurality of pistons, each piston, when actuated, being operable to set a pre-selected combination of stops of a group of stops associated with that piston, the improvement comprising:

an operating memory for storing each combination of stop settings as pre-selected for an associated piston, means for accessing said memory in response to actuation of a piston for deriving therefrom the pre-selected combination of stops associated with that piston, external storage means, and control means for transferring from said operating memory and recording in said external storage means, the pre-selected combinations of stop settings stored in said operating memory in a record operation, and for reading the stop setting information recorded in said external memory for transfer and entry into said operating memory.

2. The improvement in a capture combination system as recited in claim 1 wherein:

said plurality of pistons are arranged in groups, each including a number of pistons, and each group of stops is associated with a corresponding group of pistons.

3. The improvement in a capture combination system as recited in claim 2 wherein:

certain of said groups of pistons are associated with respectively corresponding keyboards of organ and the respectively associated groups of said stops are correspondingly associated with said keyboards and, at least one of said groups of pistons is associated with the totality of the plurality of stops.

4. The improvement in a capture combination system as recited in claim 1 wherein:

said external storage means comprises a read/write apparatus for recording said stop combination information on a recording medium.

5. The improvement in a capture combination as recited in claim 4 wherein:

said recording medium comprises magnetic card.

6. The improvement in a capture combination system as recited in claim 4 wherein said external recording medium has a capacity for storing the full stop combination.

7. In a capture combination system as recited in claim 2 for use with an organ having plural keyboards, the improvement wherein;

said groups of pistons include divisional piston groups, each such divisional group being associated with a corresponding keyboard and said group of stops associated with each group of divisional pistons is correspondingly associated with the related keyboard, and at least one of said groups of pistons comprises general pistons associated with the group of stops including the totality of stops provided in the system, and said operating memory includes at least two sections, one of said sections being assigned to store the identity of the pre-selected stop combinations associated with said divisional pistons and at least another of said sections being assigned to store the pre-selected stop combinations associated with said general pistons.

8. The improvement in a capture combination system as recited in claim 7 wherein:

said external memory includes separate storage sections corresponding to said sections of said operating memory.

9. The improvement in a capture combination system as recited in claim 8 wherein:

said external storage means includes plural read/write means respectively corresponding to said sections of said external memory for effecting parallel writing of the stop combination information into the sections thereof from said sections of said operating memory and for reading the stop combination information recorded in said sections thereof simultaneously for entry in parallel into the respectively corresponding sections of said operating memory.

10. The improvement in a capture combination system as recited in claim 9 wherein:

said external memory comprises read/write apparatus for reading information from and writing information onto a magnetic card transported through said apparatus, said apparatus including a plurality of transducing means corresponding to the sections of said operating memory and said external storage to effect, selectively, reading and writing of the pre-selected stop combinations in respectively corresponding recording tracks of a magnetic card transported through said read-write apparatus.

11. The improvement in a capture combination system as recited in claim 7 wherein said external storage means further includes: buffer storage means responsive to the stop combination information stored in said plural sections of said opening memory to effect recording thereof in parallel in respectively corresponding sections of said external memory, and further buffer storage means responsive to the stop combination information read from said sections of said external memory for effecting entry of the stop information in parallel into the respectively corresponding sections of the operating memory.

12. A capture combination system for use with an organ having a plurality of stops and a plurality of pistons, each piston having an associated group of stops to be set in preselected combinations thereof in response to actuation of that associated piston, comprising:

means for selecting the combination of stops to be set upon actuation of the associated piston, central control means for responding to and identifying an actuated piston and the stops of the group associated therewith and selected to be set in combination upon actuation of the piston, an operating memory addressed by said central control means for entry of information therein and readout of information previously entered therein in accordance with an assignment of a portion of said memory for each said piston and of positions in that portion to the associated group of stops, said central control means being responsive to a set command to enter into said operating memory the stop combinations selected for each actuated piston in accordance with the identification of that piston and of the associated selected combination of stops, said central control means further being responsive to actuation of a piston to address said operating memory to read out a pre-selected stop combination associated with the actuated piston and previously stored therein, for setting the thus identified stops in combination in playing of the organ, an external memory having storage locations corresponding to the storage location of said operating memory, and said central control means being operable in response to a record command to record the information, previously entered into said operating memory for identifying the pre-selected stops combinations, into said external memory for storage therein and being operable, in response to an enter command, for reading out the information recorded in said external memory and entering that information into said operating memory in accordance with said assigned storage positions thereof for establishing pre-selected stop combinations in said operating memory for selection by actuation of the associated pistons in subsequent playing of the organ.

13. A capture combination system as recited in claim 12 wherein:

said central control means is responsive to a set command to clear from said operating memory previously selected stop combinations and to enter new stop combinations for the group of stops associated with an actuated piston in response to a set command, while maintaining the stop combination information previously recorded in said external memory.

14. A capture combination system as recited in claim 12 wherein:

said pistons are arranged in a plurality of groups respectively corresponding to the keyboards of the organ, each such group including a number of divisional pistons, and at least one group associated with the totality of stops of the organ and including a number of general pistons, said operating memory including a plurality of sections corresponding to said groups of pistons and a plurality of portions within each section corresponding to the plurality of pistons of that associated group, each portion having positions assigned to the group of stops associated with the piston corresponding to that portion of the memory, and each of said divisional and general pistons is operative when actuated, to cause said central control means to address the respectively corresponding section and portion of the memory to enter the stops information defining the preselected combinations into the assigned positions of the corresponding memory portions.

15. A capture combination system as recited in claim 14 wherein:

said operating memory includes a section for storing the stops information for the plurality of groups of divisional pistons and a further section for storing the stops information for each of said groups of general pistons.

16. A capture combination system as recited in claim 15 wherein:

said external memory includes a recording medium having the capacity to store the total stops combinations which can be set in the system and includes parallel recording tracks, one of said tracks recording the stops information for said groups of divisional pistons and another recording track recording the stops information for each said group of general pistons.

* * * * *

PO-1050
(5/69)

UNITED STATES PATENT OFFICE
CERTIFICATE OF CORRECTION

Patent No. 3,659,488 Dated May 2, 1972

Inventor(s) Ralph Deutsch

It is certified that error appears in the above-identified patent and that said Letters Patent are hereby corrected as shown below:

Claim 11, column 40, line 3, "opening" should be --operating--.

Signed and sealed this 31st day of October 1972.

(SEAL)
Attest:

EDWARD M.FLETCHER,JR.
Attesting Officer

ROBERT GOTTSCHALK
Commissioner of Patents